United States Patent
Zheng et al.

(10) Patent No.: US 10,911,175 B2
(45) Date of Patent: Feb. 2, 2021

(54) UPLINK INFORMATION TRANSMISSION METHOD, RELATED DEVICE, AND COMMUNICATIONS SYSTEM

(71) Applicant: Huawei Technologies Co., Ltd., Shenzhen (CN)

(72) Inventors: Juan Zheng, Beijing (CN); Lei Guan, Beijing (CN); Zhiyu Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/231,556

(22) Filed: Dec. 23, 2018

(65) Prior Publication Data
US 2019/0132080 A1 May 2, 2019

Related U.S. Application Data

(63) Continuation of application No. PCT/CN2016/088040, filed on Jun. 30, 2016.

(51) Int. Cl.
*H04L 1/00* (2006.01)
*H04L 1/18* (2006.01)
(Continued)

(52) U.S. Cl.
CPC .......... *H04L 1/0026* (2013.01); *H04L 1/003* (2013.01); *H04L 1/0003* (2013.01);
(Continued)

(58) Field of Classification Search
CPC ..... H04L 1/0003; H04L 1/009; H04L 1/0026; H04L 1/027; H04L 1/003; H04L 1/0031;
(Continued)

(56) References Cited

U.S. PATENT DOCUMENTS

2008/0318578 A1* 12/2008 Worrall .................. H04W 36/02
455/437
2010/0120423 A1 5/2010 Awad et al.
(Continued)

FOREIGN PATENT DOCUMENTS

| CN | 102014509 A | 4/2011 |
| CN | 102468933 A | 5/2012 |

(Continued)

OTHER PUBLICATIONS

Nokia et al., "UCI transmission on LAA SCells," R1-164920, 3GPP TSG-RAN WG2 Meeting #85, Nanjing, China, May 23-27, 2016, 4 pages.
(Continued)

*Primary Examiner* — Stephen J Clawson
(74) *Attorney, Agent, or Firm* — Slater Matsil, LLP

(57) ABSTRACT

Embodiments of the present invention provide an uplink information transmission method, a related device, and a communications system. The method includes: receiving, by a terminal device, uplink scheduling information sent by an access network device; determining, by the terminal device based on aperiodic channel state indication information and modulation and coding indication information that are included in the uplink scheduling information, whether to transmit feedback information on an uplink resource indicated by the uplink scheduling information; and if determining to transmit the feedback information on the uplink resource, transmitting, by the terminal device, the feedback information on the uplink resource.

23 Claims, 12 Drawing Sheets

(51) Int. Cl.
*H04W 72/12* (2009.01)
*H04W 72/04* (2009.01)
*H04W 16/14* (2009.01)

(52) U.S. Cl.
CPC .............. *H04L 1/0009* (2013.01); *H04L 1/18* (2013.01); *H04L 1/1861* (2013.01); *H04W 72/0413* (2013.01); *H04W 72/12* (2013.01); *H04W 72/1231* (2013.01); *H04W 72/1284* (2013.01); *H04W 16/14* (2013.01)

(58) Field of Classification Search
CPC ........ H04L 1/18; H04L 1/1861; H04W 16/14; H04W 72/0413; H04W 72/12; H04W 72/1231; H04W 72/1284
See application file for complete search history.

(56) References Cited

U.S. PATENT DOCUMENTS

| | | | |
|---|---|---|---|
| 2011/0002290 A1* | 1/2011 | Kim | H04L 1/0026 370/329 |
| 2011/0092240 A1* | 4/2011 | Aiba | H04L 1/0025 455/509 |
| 2012/0327884 A1* | 12/2012 | Seo | H04L 5/0057 370/329 |
| 2013/0295946 A1* | 11/2013 | Panchal | H04W 16/14 455/452.1 |
| 2015/0085794 A1* | 3/2015 | Chen | H04W 72/042 370/329 |
| 2015/0223235 A1 | 8/2015 | Hwang et al. | |
| 2017/0126368 A1 | 5/2017 | Aiba et al. | |
| 2017/0311337 A1 | 10/2017 | Mo et al. | |
| 2017/0359746 A1* | 12/2017 | Lee | H04L 5/00 |
| 2017/0359811 A1 | 12/2017 | Yamada et al. | |

FOREIGN PATENT DOCUMENTS

| | | |
|---|---|---|
| CN | 103716893 A | 4/2014 |
| CN | 105356967 A | 2/2016 |
| JP | 2013128202 A | 6/2013 |
| JP | 2014060772 A | 4/2014 |
| KR | 20100005232 A | 1/2010 |
| WO | 2011124127 A1 | 10/2011 |
| WO | 2016072389 A1 | 5/2016 |

OTHER PUBLICATIONS

NTT DOCOMO INC. et al., "Remaining aspects of UCI transmission on PUSCH," R1-157232, 3GPP TSG RAN WG1 Meeting #83, Anaheim, USA, Nov. 15-22, 2015, 4 pages.

Texas Instruments, "UCI Transmission on PUSCH for Carrier Aggregation," R1-103694, 3GPP TSG RAN WG1 #61bis, Dresden, German, Jun. 28-Jul. 2, 2010, 6 pages.

"3rd Generation Partnership Project; Technical Specification Group Radio Access Network; Evolved Universal Terrestrial Radio Access (E-UTRA); Multiplexing and Channel Coding (Release 13)," 3GPP TS 36.212, V13.1.0, Mar. 2016, 129 pages.

"3rd Generation Partnership Project; Technical Specification Group Radio Access Network; Evolved Universal Terrestrial Radio Access (E-UTRA); Physical Layer Procedures (Release 13)," 3GPP TS 36.213, V13.1.1, Mar. 2016, 333 pages.

Nokia, "Clarifications on HARQ ACK Feedback," MFA-TSG Meeting #5, Jun. 13-17, 2016, 14 pages, Beijing, China.

* cited by examiner

| Uplink-downlink configuration | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 1A

| Uplink-downlink configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7, 6 | 4 | - | - | - | 7, 6 | 4 | - |
| 2 | - | - | 8, 7, 4, 6 | - | - | - | - | 8, 7, 4, 6 | - | - |
| 3 | - | - | 7, 6, 11 | 6, 5 | 5, 4 | - | - | - | - | - |
| 4 | - | - | 12, 8, 7, 11 | 6, 5, 4, 7 | - | - | - | - | - | - |
| 5 | - | - | 13, 12, 9, 8, 7, 5, 4, 11, 6 | - | - | - | - | - | - | - |
| 6 | - | - | 7 | 7 | 5 | - | - | 7 | 7 | - |

FIG. 1B

UPLINK INFORMATION TRANSMISSION METHOD, RELATED DEVICE, AND COMMUNICATIONS SYSTEM

CROSS-REFERENCE TO RELATED APPLICATIONS

This application is a continuation of International Application No. PCT/CN2016/088040, filed on Jun. 30, 2016, the disclosure of which is hereby incorporated by reference in its entirety.

TECHNICAL FIELD

The present invention relates to the field of communications technologies, and in particular, to an uplink information transmission method, a related device, and a communications system.

BACKGROUND

A Long Term Evolution (LTE) system supports two duplex modes: frequency division duplexing (FDD) and time division duplexing (TDD). FDD means that uplink transmission and downlink transmission are performed on different carrier frequency bands, and both a terminal device and an access network device are allowed to simultaneously receive a signal and send a signal. TDD means that uplink transmission and downlink transmission are performed on a same carrier frequency band, and a terminal device/an access network device sends and receives information at different moments. Based on a hybrid automatic repeat request (HARQ) mechanism, feedback information given by a terminal device for a downlink carrier includes an acknowledgement (ACK) and a negative acknowledgement (NACK). In an existing LTE system, a subframe interval between a subframe in which a terminal device receives a physical downlink shared channel (PDSCH) and an uplink subframe in which the terminal device feeds back an ACK or NACK corresponding to the PDSCH is predefined, to ensure that the terminal device feeds back the ACK or the NACK and an access network device receives the ACK or the NACK.

For an FDD system, after receiving, in a downlink subframe n−4, downlink data carried on a PDSCH, a terminal device feeds back, in an uplink subframe n, an ACK or NACK corresponding to the PDSCH. For a TDD system, an uplink-downlink configuration of a radio frame is fixed. As shown in FIG. 1A, LTE currently supports seven different TDD uplink-downlink configurations. D represents a downlink subframe, S represents a special subframe (SSF), and U represents an uplink subframe. A time sequence relationship or a timing relationship between a PDSCH and an ACK or NACK corresponding to the PDSCH is shown in FIG. 1B. A subframe identified by using a number is an uplink subframe n used to feed back an ACK or NACK, and the identification number indicates that an ACK or NACK corresponding to a PDSCH in a downlink subframe n−k (k belongs to K) needs to be fed back in the uplink subframe n. For example, K={7, 6} in a subframe n=2 in an uplink-downlink configuration 1 indicates that the uplink subframe n=2 is used to feed back ACKs or NACKs corresponding to PDSCHs in two downlink subframes n−7 and n−6. Specifically, n−7 identifies a downlink subframe 5, and n−6 identifies a downlink subframe 6.

All spectrums deployed in a serving cell in the existing LTE system are licensed spectrums; to be specific, the spectrums can be used only by an operator network that has purchased the licensed spectrums. Increasing attention is paid to an unlicensed spectrum (which may also be referred to as a license-free spectrum) because the unlicensed spectrum can be used by any operator without being purchased. Spectrum resources are increasingly in short supply in the future, and consequently a service capability of the LTE system based on the licensed spectrum is limited. Therefore, it is an evolution trend that the LTE system uses the unlicensed spectrum. An LTE system deployed on an unlicensed spectrum is referred to as an unlicensed-Long Term Evolution (U-LTE) system.

Resource sharing on the unlicensed spectrum means that a restriction is imposed only on counters such as transmit power and out-of-band leakage during use of a specific spectrum, there are some additional coexistence policies in some regions, and so on. Considering friendly coexistence between a plurality of systems on the unlicensed spectrum, for example, between a U-LTE system and a Wireless Fidelity (WiFi) system, or between U-LTE systems of a plurality of operators, a restriction of some coexistence regulations such as listen before talk (LBT) needs to be followed during use of the unlicensed spectrum. Specifically, before an access network device or a terminal device sends a signal on a channel of a U-LTE serving cell, clear channel assessment (CCA) needs to be performed on the channel of the serving cell. Once a detected receive power exceeds a threshold, the access network device or the terminal device temporarily cannot send a signal on the channel, until detecting that the channel is idle. Even, in some cases, the access network device or the terminal device further needs to perform random backoff. The channel is idle and a signal can be sent on the channel only during the random backoff. Based on this, it may be learned that for the LTE system, both the access network device sending downlink data and the terminal device sending uplink data occasionally transmit data on the unlicensed spectrum. In addition, based on occasional data transmission on the unlicensed spectrum, to meet an uplink-downlink service requirement of the LTE system, an uplink-downlink configuration of the U-LTE system on the unlicensed spectrum can be flexible.

Based on the foregoing features (to be specific, the occasional data transmission and the flexible uplink-downlink configuration) of the unlicensed spectrum, in a case of occasional data transmission, to ensure effective use of an unlicensed frequency band resource and data transmission efficiency, a trigger mechanism may be used to instruct the terminal device to send HARQ-ACK information for downlink data. Considering that in the existing system, feedback of aperiodic channel state information and uplink data transmission are also implemented by using the trigger mechanism, for example, a UL grant is used to instruct the terminal device to transmit uplink data and/or aperiodic channel state information, how to design a suitable technical solution to enable the terminal device to identify a type of triggered uplink information is a technical problem that needs to be currently resolved.

SUMMARY

Embodiments of the present invention provide an uplink information transmission method, a related device, and a communications system, so that when using an unlicensed frequency band resource, a terminal device can effectively identify a type of uplink information that needs to be fed back, ensuring data transmission efficiency.

According to a first aspect, an uplink information transmission method is provided, including: receiving, by a terminal device, uplink scheduling information sent by an access network device; determining, by the terminal device based on aperiodic channel state indication information and modulation and coding indication information that are included in the uplink scheduling information, whether to transmit feedback information on an uplink resource indicated by the uplink scheduling information; and if determining to transmit the feedback information on the uplink resource, transmitting, by the terminal device, the feedback information on the uplink resource.

By performing the foregoing steps, the terminal device can determine whether the terminal device needs to feed back the HARQ-ACK, and can further reuse the aperiodic channel state indication information and the modulation and coding indication information that are included in the existing uplink scheduling information (for example, a UL grant), without causing extra signaling overheads, so that signaling overheads are reduced.

With reference to the first aspect, in a first implementation of the first aspect, the method further includes: when the terminal device transmits the feedback information on the uplink resource, further transmitting, by the terminal device, at least one of uplink data and aperiodic channel state information on the uplink resource.

The foregoing step is performed. Therefore, an indication method in the existing UL grant is reused to a maximum extent, and a previous method for determining, by the terminal device, to transmit the UL-SCH and/or the aCSI on the scheduled uplink resource can be maintained, so that the terminal device is slightly changed.

With reference to the first aspect or the first implementation of the first aspect, in a second implementation of the first aspect, the determining, by the terminal device based on aperiodic channel state indication information and modulation and coding indication information that are included in the uplink scheduling information, whether to transmit feedback information on an uplink resource indicated by the uplink scheduling information includes: when the aperiodic channel state indication information included in the uplink scheduling information instructs the terminal device to feed back the aperiodic channel state information and a modulation and coding scheme index number corresponding to the modulation and coding indication information included in the uplink scheduling information is set to 30 or 31, determining, by the terminal device, to transmit the feedback information on the uplink resource indicated by the uplink scheduling information; and/or when the aperiodic channel state indication information included in the uplink scheduling information instructs the terminal device not to feed back the aperiodic channel state information and a modulation and coding scheme index number corresponding to the modulation and coding indication information included in the uplink scheduling information is set to any value in 29 to 31, determining, by the terminal device, to transmit the feedback information on the uplink resource indicated by the uplink scheduling information.

The foregoing steps are performed. Therefore, on a license-free frequency band, asynchronous and adaptive uplink data transmission is performed to effectively use an uplink resource. In this case, modulation and coding scheme indexes (MCS index) 29 to 31 that are mainly used for non-adaptive retransmission may not be used to indicate an MCS used when the UE transmits the uplink data, so that it can be determined, by using the MCS indexes 29 to 31 and with reference to the aperiodic channel state indication information (an aCSI trigger), whether to transmit the HARQ-ACK on the uplink resource.

According to a second aspect, an uplink information transmission method is provided, including: receiving, by a terminal device, uplink scheduling information sent by an access network device; determining, by the terminal device based on modulation and coding indication information included in the uplink scheduling information, whether to transmit uplink data on an uplink resource indicated by the uplink scheduling information; and if determining to transmit the uplink data on the uplink resource, transmitting, by the terminal device, the uplink data on the uplink resource.

By performing the foregoing steps, the terminal device can determine, by using only the modulation and coding indication information, whether the terminal device needs to feed back the uplink data, without causing extra signaling overheads, so that signaling overheads are reduced. In addition, the terminal device can determine, without reference to aperiodic channel state indication information, whether to transmit the uplink data, so that complexity of detection by the terminal device is reduced.

With reference to the second aspect, in a first implementation of the second aspect, the determining, by the terminal device based on modulation and coding indication information included in the uplink scheduling information, whether to transmit uplink data on an uplink resource indicated by the uplink scheduling information includes: when the terminal device determines that an index number corresponding to the modulation and coding indication information included in the uplink scheduling information is any value in 0 to 28, determining, by the terminal device, to transmit the uplink data on the uplink resource indicated by the uplink scheduling information; and/or when the terminal device determines that an index number corresponding to the modulation and coding indication information included in the uplink scheduling information is any value in 29 to 31, determining, by the terminal device, not to transmit the uplink data on the uplink resource indicated by the uplink scheduling information.

The foregoing steps are performed, so that an MCS of the uplink data can be adaptively adjusted, to improve data transmission efficiency.

With reference to the first implementation of the second aspect, in a second implementation of the second aspect, the determining, by the terminal device, to transmit the uplink data on the uplink resource indicated by the uplink scheduling information includes: determining, by the terminal device based on aperiodic channel state indication information and feedback indication information that are included in the uplink scheduling information, to transmit the uplink data, the uplink data and aperiodic channel state information, the uplink data and feedback information, or the uplink data, aperiodic channel state information, and feedback information on the uplink resource indicated by the uplink scheduling information.

With reference to the first implementation of the second aspect, in a third implementation of the second aspect, the determining, by the terminal device, not to transmit the uplink data on the uplink resource indicated by the uplink scheduling information includes: determining, by the terminal device based on at least one of the modulation and coding indication information, aperiodic channel state indication information, and feedback indication information that are included in the uplink scheduling information, to transmit aperiodic channel state information, feedback information, or aperiodic channel state information and feedback information on the uplink resource indicated by the uplink scheduling information.

With reference to the third implementation of the second aspect, in a fourth implementation of the second aspect, the determining, by the terminal device based on at least one of the modulation and coding indication information, aperiodic channel state indication information, and feedback indication information that are included in the uplink scheduling information, to transmit aperiodic channel state information, feedback information, or aperiodic channel state information and feedback information on the uplink resource indicated by the uplink scheduling information includes: when the terminal device determines that the index number corresponding to the modulation and coding indication information is 29, determining, by the terminal device, to transmit the aperiodic channel state information on the uplink resource indicated by the uplink scheduling information; and/or when the terminal device determines that the index number corresponding to the modulation and coding indication information is 30 or 31, determining, by the terminal device, to transmit the feedback information, or the aperiodic channel state information and the feedback information on the uplink resource indicated by the uplink scheduling information.

The foregoing steps are performed. Therefore, with reference to a feature of asynchronous and adaptive uplink data transmission on a license-free frequency band, a redundant MCS index can be effectively used, to improve resource use efficiency.

With reference to the third implementation of the second aspect, in a fifth implementation of the second aspect, the determining, by the terminal device based on at least one of the modulation and coding indication information, aperiodic channel state indication information, and feedback indication information that are included in the uplink scheduling information, to transmit aperiodic channel state information, feedback information, or aperiodic channel state information and feedback information on the uplink resource indicated by the uplink scheduling information includes: when the terminal device determines that the index number corresponding to the modulation and coding indication information is 29 and the aperiodic channel state indication information included in the uplink scheduling information is set to "true", determining, by the terminal device, to transmit the aperiodic channel state information on the uplink resource indicated by the uplink scheduling information; and/or when the terminal device determines that the index number corresponding to the modulation and coding indication information is 29 and the aperiodic channel state indication information included in the uplink scheduling information is set to "false", determining, by the terminal device, to transmit the feedback information, or the aperiodic channel state information and the feedback information on the uplink resource indicated by the uplink scheduling information.

With reference to the fifth implementation of the second aspect, in a sixth implementation of the second aspect, the determining, by the terminal device, to transmit the feedback information, or the aperiodic channel state information and the feedback information on the uplink resource indicated by the uplink scheduling information includes: determining, by the terminal device, to transmit the feedback information on the uplink resource indicated by the uplink scheduling information; and the method further includes: when the terminal device determines that the index number corresponding to the modulation and coding indication information is 30 or 31, determining, by the terminal device, to transmit the aperiodic channel state information and the feedback information on the uplink resource indicated by the uplink scheduling information.

With reference to the fifth implementation of the second aspect, in a seventh implementation of the second aspect, the determining, by the terminal device, to transmit the feedback information, or the aperiodic channel state information and the feedback information on the uplink resource indicated by the uplink scheduling information includes: determining, by the terminal device, to transmit the aperiodic channel state information and the feedback information on the uplink resource indicated by the uplink scheduling information; and the method further includes: when the terminal device determines that the index number corresponding to the modulation and coding indication information is 30 or 31, determining, by the terminal device, to transmit the feedback information on the uplink resource indicated by the uplink scheduling information.

With reference to the third implementation of the second aspect, in an eighth implementation of the second aspect, the determining, by the terminal device based on at least one of the modulation and coding indication information, aperiodic channel state indication information, and feedback indication information that are included in the uplink scheduling information, to transmit aperiodic channel state information, feedback information, or aperiodic channel state information and feedback information on the uplink resource indicated by the uplink scheduling information includes: determining, by the terminal device based on the aperiodic channel state indication information and the feedback indication information that are included in the uplink scheduling information, to transmit the aperiodic channel state information, the feedback information, or the aperiodic channel state information and the feedback information on the uplink resource indicated by the uplink scheduling information.

With reference to the third implementation of the second aspect, in a ninth implementation of the second aspect, the determining, by the terminal device based on at least one of the modulation and coding indication information, aperiodic channel state indication information, and feedback indication information that are included in the uplink scheduling information, to transmit aperiodic channel state information, feedback information, or aperiodic channel state information and feedback information on the uplink resource indicated by the uplink scheduling information includes: determining, by the terminal device based on the modulation and coding indication information, the aperiodic channel state indication information, and the feedback indication information that are included in the uplink scheduling information, to transmit the aperiodic channel state information, the feedback information, or the aperiodic channel state information and the feedback information on the uplink resource indicated by the uplink scheduling information.

According to a third aspect, an uplink information transmission method is provided, including: receiving, by a terminal device, uplink scheduling information sent by an access network device; determining, by the terminal device based on aperiodic channel state indication information and feedback indication information that are included in the uplink scheduling information, uplink information to be transmitted on an uplink resource indicated by the uplink scheduling information, where the uplink information includes at least one of the following: uplink data, aperiodic channel state information, and feedback information; and transmitting, by the terminal device, the uplink information on the uplink resource.

By performing the foregoing steps, the terminal device can determine, based on the aperiodic channel state indication information and an added indication bit (the feedback indication information) that are included in the uplink scheduling information, the uplink information that needs to be fed back. The UE can determine, based on explicit signaling included in the uplink scheduling information, to transmit the aperiodic CSI but transmit none of the following: the HARQ-ACK; the HARQ-ACK and the aCSI; the HARQ-ACK and the uplink data; the HARQ-ACK, the aCSI, and the uplink data; the aCSI and the uplink data; and the uplink data, without performing determining based on a special MCS configuration and explicit signaling like the prior art (for example, in the prior art, the UE determines, based on an aCSI trigger indication and a specific value of the MCS index (for example, the MCS index is 29), whether to transmit the aCSI), so that an MCS can be normally used. A reserved MCS index, for example, any value in 29 to 31, may be used to represent a modulation and coding order, to improve downlink data transmission efficiency.

According to a fourth aspect, an uplink information transmission method is provided, including: sending, by an access network device, uplink scheduling information to a terminal device, where the uplink scheduling information includes aperiodic channel state indication information and modulation and coding indication information, and the aperiodic channel state indication information and the modulation and coding indication information are used to instruct the terminal device to determine whether to transmit feedback information on an uplink resource indicated by the uplink scheduling information; and if the aperiodic channel state indication information and the modulation and coding indication information instruct the terminal device to transmit the feedback information on the uplink resource indicated by the uplink scheduling information, receiving, by the access network device, the feedback information transmitted by the terminal device on the uplink resource.

By performing the foregoing steps, the terminal device can determine whether the terminal device needs to feed back the HARQ-ACK, and can further reuse the aperiodic channel state indication information and the modulation and coding indication information that are included in the existing uplink scheduling information (for example, a UL grant), without causing extra signaling overheads, so that signaling overheads are reduced.

With reference to the fourth aspect, in a first implementation of the fourth aspect, when the aperiodic channel state indication information included in the uplink scheduling information instructs the terminal device to feed back aperiodic channel state information and a modulation and coding scheme index number corresponding to the modulation and coding indication information included in the uplink scheduling information is set to 30 or 31, the aperiodic channel state indication information and the modulation and coding indication information are used to instruct the terminal device to transmit the feedback information on the uplink resource indicated by the uplink scheduling information; and/or when the aperiodic channel state indication information included in the uplink scheduling information instructs the terminal device not to feed back aperiodic channel state information and a modulation and coding scheme index number corresponding to the modulation and coding indication information included in the uplink scheduling information is set to any value in 29 to 31, the aperiodic channel state indication information and the modulation and coding indication information are used to instruct the terminal device to transmit the feedback information on the uplink resource indicated by the uplink scheduling information.

According to a fifth aspect, an uplink information transmission method is provided, including: sending, by an access network device, uplink scheduling information to a terminal device, where the uplink scheduling information includes modulation and coding indication information, and the modulation and coding indication information is used by the terminal device to determine whether to transmit uplink data on an uplink resource indicated by the uplink scheduling information; and if the modulation and coding indication information instructs the terminal device to transmit the uplink data on the uplink resource indicated by the uplink scheduling information, receiving, by the access network device, the uplink data transmitted by the terminal device on the uplink resource.

By performing the foregoing steps, the terminal device can determine, by using only the modulation and coding indication information, whether the terminal device needs to feed back the uplink data, without causing extra signaling overheads, so that signaling overheads are reduced. In addition, the terminal device can determine, without reference to aperiodic channel state indication information, whether to transmit the uplink data, so that complexity of detection by the terminal device is reduced.

With reference to the fifth aspect, in a first implementation of the fifth aspect, when an index number corresponding to the modulation and coding indication information included in the uplink scheduling information is any value in 0 to 28, the modulation and coding indication information indicates the terminal device to transmit the uplink data on the uplink resource indicated by the uplink scheduling information; and/or when an index number corresponding to the modulation and coding indication information included in the uplink scheduling information is any value in 29 to 31, the modulation and coding indication information indicates the terminal device not to transmit the uplink data on the uplink resource indicated by the uplink scheduling information.

With reference to the fifth aspect, in a second implementation of the fifth aspect, the uplink scheduling information further includes feedback indication information, where the aperiodic channel state indication information and the feedback indication information are used by the terminal device to determine to transmit the uplink data, the uplink data and aperiodic channel state information, the uplink data and feedback information, or the uplink data, aperiodic channel state information, and feedback information on the uplink resource indicated by the uplink scheduling information.

With reference to the fifth aspect, in a third implementation of the fifth aspect, the uplink scheduling information further includes aperiodic channel state indication information and feedback indication information, where at least one of the modulation and coding indication information, the aperiodic channel state indication information, and the feedback indication information is used by the terminal device to determine to transmit aperiodic channel state information, feedback information, or aperiodic channel state information and feedback information on the uplink resource indicated by the uplink scheduling information.

With reference to the third implementation of the fifth aspect, in a fourth implementation of the fifth aspect, when an index number corresponding to the modulation and coding indication information is 29, the modulation and coding indication information indicates the terminal device to transmit the aperiodic channel state information on the uplink resource indicated by the uplink scheduling information; and/or when an index number corresponding to the modulation and coding indication information is 30 or 31, the modulation and coding indication information indicates the terminal device to transmit the feedback information, or the aperiodic channel state information and the feedback information on the uplink resource indicated by the uplink scheduling information.

With reference to the third implementation of the fifth aspect, in a fifth implementation of the fifth aspect, when an index number corresponding to the modulation and coding indication information is 29 and the aperiodic channel state indication information included in the uplink scheduling information is set to "true", the modulation and coding indication information and the aperiodic channel state indication information are used to instruct the terminal device to transmit the aperiodic channel state information on the uplink resource indicated by the uplink scheduling information; and/or when an index number corresponding to the modulation and coding indication information is 29 and the aperiodic channel state indication information included in the uplink scheduling information is set to "false", the modulation and coding indication information and the aperiodic channel state indication information are used to instruct the terminal device to transmit the feedback information, or the aperiodic channel state information and the feedback information on the uplink resource indicated by the uplink scheduling information.

With reference to the fifth implementation of the fifth aspect, in a sixth implementation of the fifth aspect, when the index number corresponding to the modulation and coding indication information is 29 and the aperiodic channel state indication information included in the uplink scheduling information is set to "false", the modulation and coding indication information and the aperiodic channel state indication information are used to instruct the terminal device to transmit the feedback information on the uplink resource indicated by the uplink scheduling information; or when the index number corresponding to the modulation and coding indication information is 30 or 31, the modulation and coding indication information indicates the terminal device to transmit the aperiodic channel state information and the feedback information on the uplink resource indicated by the uplink scheduling information.

With reference to the fifth implementation of the fifth aspect, in a seventh implementation of the fifth aspect, when the index number corresponding to the modulation and coding indication information is 29 and the aperiodic channel state indication information included in the uplink scheduling information is set to "false", the modulation and coding indication information and the aperiodic channel state indication information are used to instruct the terminal device to transmit the aperiodic channel state information and the feedback information on the uplink resource indicated by the uplink scheduling information; or when the index number corresponding to the modulation and coding indication information is 30 or 31, the modulation and coding indication information indicates the terminal device to transmit the feedback information on the uplink resource indicated by the uplink scheduling information.

With reference to the third implementation of the fifth aspect, in an eighth implementation of the fifth aspect, the aperiodic channel state indication information and the feedback indication information that are included in the uplink scheduling information are used by the terminal device to determine to transmit the aperiodic channel state information, the feedback information, or the aperiodic channel state information and the feedback information on the uplink resource indicated by the uplink scheduling information.

With reference to the third implementation of the fifth aspect, in a ninth implementation of the fifth aspect, the modulation and coding indication information, the aperiodic channel state indication information, and the feedback indication information that are included in the uplink scheduling information are used by the terminal device to determine to transmit the aperiodic channel state information, the feedback information, or the aperiodic channel state information and the feedback information on the uplink resource indicated by the uplink scheduling information.

According to a sixth aspect, an uplink information transmission method is provided, including: sending, by an access network device, uplink scheduling information to a terminal device, where the uplink scheduling information includes aperiodic channel state indication information and feedback indication information, the aperiodic channel state indication information and the feedback indication information are used to instruct the terminal device to determine uplink information to be transmitted on an uplink resource indicated by the uplink scheduling information, and the uplink information includes at least one of the following: uplink data, aperiodic channel state information, and feedback information; and receiving, by the access network device, the uplink information transmitted by the terminal device on the uplink resource.

By performing the foregoing steps, the terminal device can determine, based on the aperiodic channel state indication information and an added indication bit (the feedback indication information) that are included in the uplink scheduling information, the uplink information that needs to be fed back. The UE can determine, based on explicit signaling included in the uplink scheduling information, to transmit the aperiodic CSI but transmit none of the following: the HARQ-ACK; the HARQ-ACK and the aCSI; the HARQ-ACK and the uplink data; the HARQ-ACK, the aCSI, and the uplink data; the aCSI and the uplink data; and the uplink data, without performing determining based on a special MCS configuration and explicit signaling like the prior art (for example, in the prior art, the UE determines, based on an aCSI trigger indication and MCS index=29, whether to transmit the aCSI, so that an MCS can be normally used. A reserved MCS may be used to represent a modulation and coding order, to improve downlink data transmission efficiency.

According to a seventh aspect, a terminal device is provided, including a processor, a memory, and a communications module, where the memory is configured to store uplink information transmission program code, and the processor is configured to invoke the uplink information transmission program code to perform the following operations: receiving, by the processor by using the communications module, uplink scheduling information sent by an access network device; determining, by the processor based on aperiodic channel state indication information and modulation and coding indication information that are included in the uplink scheduling information, whether to transmit feedback information on an uplink resource indicated by the uplink scheduling information; and if determining to transmit the feedback information on the uplink resource, transmitting, by the processor, the feedback information on the uplink resource by using the communications module.

By performing the foregoing operations, the terminal device can determine whether the terminal device needs to feed back the HARQ-ACK, and can further reuse the aperiodic channel state indication information and the modulation and coding indication information that are included in the existing uplink scheduling information (for example, a UL grant), without causing extra signaling overheads, so that signaling overheads are reduced.

With reference to the seventh aspect, in a first implementation of the seventh aspect, the processor is further configured to: when the processor transmits the feedback information on the uplink resource by using the communications module, further transmit, by the processor, at least one of uplink data and aperiodic channel state information on the uplink resource by using the communications module.

The foregoing operation is performed. Therefore, an indication method in the existing UL grant is reused to a maximum extent, and a previous method for determining, by the terminal device, to transmit the UL-SCH and/or the aCSI on the scheduled uplink resource can be maintained, so that the terminal device is slightly changed.

With reference to the seventh aspect or the first implementation of the seventh aspect, in a second implementation of the seventh aspect, the determining, by the processor based on aperiodic channel state indication information and modulation and coding indication information that are included in the uplink scheduling information, whether to transmit feedback information on an uplink resource indicated by the uplink scheduling information includes: when the aperiodic channel state indication information included in the uplink scheduling information instructs the terminal device to feed back the aperiodic channel state information and a modulation and coding scheme index number corresponding to the modulation and coding indication information included in the uplink scheduling information is set to 30 or 31, determining, by the processor, to transmit the feedback information on the uplink resource indicated by the uplink scheduling information; and/or when the aperiodic channel state indication information included in the uplink scheduling information instructs the terminal device not to feed back the aperiodic channel state information and a modulation and coding scheme index number corresponding to the modulation and coding indication information included in the uplink scheduling information is set to any value in 29 to 31, determining, by the processor, to transmit the feedback information on the uplink resource indicated by the uplink scheduling information.

The foregoing operations are performed. Therefore, on a license-free frequency band, asynchronous and adaptive uplink data transmission is performed to effectively use an uplink resource. In this case, modulation and coding schemes (MCS index) 29 to 31 that are mainly used for non-adaptive retransmission may not be used to indicate an MCS used when the UE transmits the uplink data, so that it can be determined, by using the MCS indexes 29 to 31 and with reference to the aperiodic channel state indication information (an aCSI trigger), whether to transmit the HARQ-ACK on the uplink resource.

According to an eighth aspect, a terminal device is provided, including a processor, a memory, and a communications module, where the memory is configured to store uplink information transmission program code, and the processor is configured to invoke the uplink information transmission program code to perform the following operations: receiving, by the processor by using the communications module, uplink scheduling information sent by an access network device; determining, by the processor based on modulation and coding indication information included in the uplink scheduling information, whether to transmit uplink data on an uplink resource indicated by the uplink scheduling information; and if determining to transmit the uplink data on the uplink resource, transmitting, by the processor, the uplink data on the uplink resource by using the communications module.

By performing the foregoing operations, the terminal device can determine, by using only the modulation and coding indication information, whether the terminal device needs to feed back the uplink data, without causing extra signaling overheads, so that signaling overheads are reduced. In addition, the terminal device can determine, without reference to aperiodic channel state indication information, whether to transmit the uplink data, so that complexity of detection by the terminal device is reduced.

With reference to the eighth aspect, in a first implementation of the eighth aspect, the determining, by the processor based on modulation and coding indication information included in the uplink scheduling information, whether to transmit uplink data on an uplink resource indicated by the uplink scheduling information includes: when the processor determines that an index number corresponding to the modulation and coding indication information included in the uplink scheduling information is any value in 0 to 28, determining, by the processor, to transmit the uplink data on the uplink resource indicated by the uplink scheduling information; and/or when the processor determines that an index number corresponding to the modulation and coding indication information included in the uplink scheduling information is any value in 29 to 31, determining, by the processor, not to transmit the uplink data on the uplink resource indicated by the uplink scheduling information.

The foregoing operations are performed, so that an MCS of the uplink data can be adaptively adjusted, to improve data transmission efficiency.

With reference to the first implementation of the eighth aspect, in a second implementation of the eighth aspect, the determining, by the processor, to transmit the uplink data on the uplink resource indicated by the uplink scheduling information includes: determining, by the processor based on aperiodic channel state indication information and feedback indication information that are included in the uplink scheduling information, to transmit the uplink data, the uplink data and aperiodic channel state information, the uplink data and feedback information, or the uplink data, aperiodic channel state information, and feedback information on the uplink resource indicated by the uplink scheduling information.

With reference to the first implementation of the eighth aspect, in a third implementation of the eighth aspect, the determining, by the processor, not to transmit the uplink data on the uplink resource indicated by the uplink scheduling information includes: determining, by the processor based on at least one of the modulation and coding indication information, aperiodic channel state indication information, and feedback indication information that are included in the uplink scheduling information, to transmit aperiodic channel state information, feedback information, or aperiodic channel state information and feedback information on the uplink resource indicated by the uplink scheduling information.

With reference to the third implementation of the eighth aspect, in a fourth implementation of the eighth aspect, the determining, by the processor based on at least one of the modulation and coding indication information, aperiodic channel state indication information, and feedback indication information that are included in the uplink scheduling information, to transmit aperiodic channel state information, feedback information, or aperiodic channel state information and feedback information on the uplink resource indicated by the uplink scheduling information includes: when the processor determines that the index number corresponding to the modulation and coding indication information is 29, determining, by the processor, to transmit the aperiodic channel state information on the uplink resource indicated by the uplink scheduling information; and/or when the processor determines that the index number corresponding to the modulation and coding indication information is 30 or 31, determining, by the processor, to transmit the feedback information, or the aperiodic channel state information and the feedback information on the uplink resource indicated by the uplink scheduling information.

With reference to the third implementation of the eighth aspect, in a fifth implementation of the eighth aspect, the determining, by the processor based on at least one of the modulation and coding indication information, aperiodic channel state indication information, and feedback indication information that are included in the uplink scheduling information, to transmit aperiodic channel state information, feedback information, or aperiodic channel state information and feedback information on the uplink resource indicated by the uplink scheduling information includes: when the processor determines that the index number corresponding to the modulation and coding indication information is 29 and the aperiodic channel state indication information included in the uplink scheduling information is set to "true", determining, by the processor, to transmit the aperiodic channel state information on the uplink resource indicated by the uplink scheduling information; and/or when the processor determines that the index number corresponding to the modulation and coding indication information is 29 and the aperiodic channel state indication information included in the uplink scheduling information is set to "false", determining, by the processor, to transmit the feedback information, or the aperiodic channel state information and the feedback information on the uplink resource indicated by the uplink scheduling information.

With reference to the fifth implementation of the eighth aspect, in a sixth implementation of the eighth aspect, the determining, by the processor, to transmit the feedback information, or the aperiodic channel state information and the feedback information on the uplink resource indicated by the uplink scheduling information includes: determining, by the processor, to transmit the feedback information on the uplink resource indicated by the uplink scheduling information; and the processor is further configured to: when the processor determines that the index number corresponding to the modulation and coding indication information is 30 or 31, determine, by the processor, to transmit the aperiodic channel state information and the feedback information on the uplink resource indicated by the uplink scheduling information.

With reference to the fifth implementation of the eighth aspect, in a seventh implementation of the eighth aspect, the determining, by the processor, to transmit the feedback information, or the aperiodic channel state information and the feedback information on the uplink resource indicated by the uplink scheduling information includes: determining, by the processor, to transmit the aperiodic channel state information and the feedback information on the uplink resource indicated by the uplink scheduling information; and the processor is further configured to: when the processor determines that the index number corresponding to the modulation and coding indication information is 30 or 31, determine, by the processor, to transmit the feedback information on the uplink resource indicated by the uplink scheduling information.

With reference to the third implementation of the eighth aspect, in an eighth implementation of the eighth aspect, the determining, by the processor based on at least one of the modulation and coding indication information, aperiodic channel state indication information, and feedback indication information that are included in the uplink scheduling information, to transmit aperiodic channel state information, feedback information, or aperiodic channel state information and feedback information on the uplink resource indicated by the uplink scheduling information includes: determining, by the processor based on the aperiodic channel state indication information and the feedback indication information that are included in the uplink scheduling information, to transmit the aperiodic channel state information, the feedback information, or the aperiodic channel state information and the feedback information on the uplink resource indicated by the uplink scheduling information.

With reference to the third implementation of the eighth aspect, in a ninth implementation of the eighth aspect, the determining, by the processor based on at least one of the modulation and coding indication information, aperiodic channel state indication information, and feedback indication information that are included in the uplink scheduling information, to transmit aperiodic channel state information, feedback information, or aperiodic channel state information and feedback information on the uplink resource indicated by the uplink scheduling information includes: determining, by the processor based on the modulation and coding indication information, the aperiodic channel state indication information, and the feedback indication information that are included in the uplink scheduling information, to transmit the aperiodic channel state information, the feedback information, or the aperiodic channel state information and the feedback information on the uplink resource indicated by the uplink scheduling information.

According to a ninth aspect, a terminal device is provided, including a processor, a memory, and a communications module, where the memory is configured to store uplink information transmission program code, and the processor is configured to invoke the uplink information transmission program code to perform the following operations: receiving, by the processor by using the communications module, uplink scheduling information sent by an access network device; determining, by the processor based on aperiodic channel state indication information and feedback indication information that are included in the uplink scheduling information, uplink information to be transmitted on an uplink resource indicated by the uplink scheduling information, where the uplink information includes at least one of the following: uplink data, aperiodic channel state information, and feedback information; and transmitting, by the processor, the uplink information on the uplink resource by using the communications module.

By performing the foregoing operations, the terminal device can determine, based on the aperiodic channel state indication information and an added indication bit (the feedback indication information) that are included in the uplink scheduling information, the uplink information that needs to be fed back. The UE can determine, based on explicit signaling included in the uplink scheduling information, to transmit the aperiodic CSI but transmit none of the following: the HARQ-ACK; the HARQ-ACK and the aCSI; the HARQ-ACK and the uplink data; the HARQ-ACK, the aCSI, and the uplink data; the aCSI and the uplink data; and the uplink data, without performing determining based on a special MCS configuration and explicit signaling like the prior art (for example, in the prior art, the UE determines, based on an aCSI trigger indication and MCS index=29, whether to transmit the aCSI, so that an MCS can be normally used. A reserved MCS may be used to represent a modulation and coding order, to improve downlink data transmission efficiency.

According to a tenth aspect, an access network device is provided, including a processor, a memory, and a communications module, where the memory is configured to store uplink information transmission program code, and the processor is configured to invoke the uplink information transmission program code to perform the following operations: sending, by the processor, uplink scheduling information to a terminal device by using the communications module, where the uplink scheduling information includes aperiodic channel state indication information and modulation and coding indication information, and the aperiodic channel state indication information and the modulation and coding indication information are used to instruct the terminal device to determine whether to transmit feedback information on an uplink resource indicated by the uplink scheduling information; and if the aperiodic channel state indication information and the modulation and coding indication information instruct the terminal device to transmit the feedback information on the uplink resource indicated by the uplink scheduling information, receiving, by the processor by using the communications module, the feedback information transmitted by the terminal device on the uplink resource.

With reference to the tenth aspect, in a first implementation of the tenth aspect, when the aperiodic channel state indication information included in the uplink scheduling information instructs the terminal device to feed back aperiodic channel state information and a modulation and coding scheme index number corresponding to the modulation and coding indication information included in the uplink scheduling information is set to 30 or 31, the aperiodic channel state indication information and the modulation and coding indication information are used to instruct the terminal device to transmit the feedback information on the uplink resource indicated by the uplink scheduling information; and/or when the aperiodic channel state indication information included in the uplink scheduling information instructs the terminal device not to feed back aperiodic channel state information and a modulation and coding scheme index number corresponding to the modulation and coding indication information included in the uplink scheduling information is set to any value in 29 to 31, the aperiodic channel state indication information and the modulation and coding indication information are used to instruct the terminal device to transmit the feedback information on the uplink resource indicated by the uplink scheduling information.

According to an eleventh aspect, an access network device is provided, including a processor, a memory, and a communications module, where the memory is configured to store uplink information transmission program code, and the processor is configured to invoke the uplink information transmission program code to perform the following operations: sending, by the processor, uplink scheduling information to a terminal device by using the communications module, where the uplink scheduling information includes modulation and coding indication information, and the modulation and coding indication information is used by the terminal device to determine whether to transmit uplink data on an uplink resource indicated by the uplink scheduling information; and if the modulation and coding indication information instructs the terminal device to transmit the uplink data on the uplink resource indicated by the uplink scheduling information, receiving, by the processor by using the communications module, the uplink data transmitted by the terminal device on the uplink resource.

With reference to the eleventh aspect, in a first implementation of the eleventh aspect, when an index number corresponding to the modulation and coding indication information included in the uplink scheduling information is any value in 0 to 28, the modulation and coding indication information indicates the terminal device to transmit the uplink data on the uplink resource indicated by the uplink scheduling information; and/or when an index number corresponding to the modulation and coding indication information included in the uplink scheduling information is any value in 29 to 31, the modulation and coding indication information indicates the terminal device not to transmit the uplink data on the uplink resource indicated by the uplink scheduling information.

With reference to the eleventh aspect, in a second implementation of the eleventh aspect, the uplink scheduling information further includes feedback indication information, where the aperiodic channel state indication information and the feedback indication information are used by the terminal device to determine to transmit the uplink data, the uplink data and aperiodic channel state information, the uplink data and feedback information, or the uplink data, aperiodic channel state information, and feedback information on the uplink resource indicated by the uplink scheduling information.

With reference to the eleventh aspect, in a third implementation of the eleventh aspect, the uplink scheduling information further includes aperiodic channel state indication information and feedback indication information, where at least one of the modulation and coding indication information, the aperiodic channel state indication information, and the feedback indication information is used by the terminal device to determine to transmit aperiodic channel state information, feedback information, or aperiodic channel state information and feedback information on the uplink resource indicated by the uplink scheduling information.

With reference to the third implementation of the eleventh aspect, in a fourth implementation of the eleventh aspect, when an index number corresponding to the modulation and coding indication information is 29, the modulation and coding indication information indicates the terminal device to transmit the aperiodic channel state information on the uplink resource indicated by the uplink scheduling information; and/or when an index number corresponding to the modulation and coding indication information is 30 or 31, the modulation and coding indication information indicates the terminal device to transmit the feedback information, or the aperiodic channel state information and the feedback information on the uplink resource indicated by the uplink scheduling information.

With reference to the third implementation of the eleventh aspect, in a fifth implementation of the eleventh aspect, when an index number corresponding to the modulation and coding indication information is 29 and the aperiodic channel state indication information included in the uplink scheduling information is set to "true", the modulation and coding indication information and the aperiodic channel state indication information are used to instruct the terminal device to transmit the aperiodic channel state information on the uplink resource indicated by the uplink scheduling information; and/or when an index number corresponding to the modulation and coding indication information is 29 and the aperiodic channel state indication information included in the uplink scheduling information is set to "false", the modulation and coding indication information and the aperiodic channel state indication information are used to instruct the terminal device to transmit the feedback information, or the aperiodic channel state information and the feedback information on the uplink resource indicated by the uplink scheduling information.

With reference to the fifth implementation of the eleventh aspect, in a sixth implementation of the eleventh aspect, when the index number corresponding to the modulation and coding indication information is 29 and the aperiodic channel state indication information included in the uplink scheduling information is set to "false", the modulation and coding indication information and the aperiodic channel state indication information are used to instruct the terminal device to transmit the feedback information on the uplink resource indicated by the uplink scheduling information; or when the index number corresponding to the modulation and coding indication information is 30 or 31, the modulation and coding indication information indicates the terminal device to transmit the aperiodic channel state information and the feedback information on the uplink resource indicated by the uplink scheduling information.

With reference to the fifth implementation of the eleventh aspect, in a seventh implementation of the eleventh aspect, when the index number corresponding to the modulation and coding indication information is 29 and the aperiodic channel state indication information included in the uplink scheduling information is set to "false", the modulation and coding indication information and the aperiodic channel state indication information are used to instruct the terminal device to transmit the aperiodic channel state information and the feedback information on the uplink resource indicated by the uplink scheduling information; or when the index number corresponding to the modulation and coding indication information is 30 or 31, the modulation and coding indication information indicates the terminal device to transmit the feedback information on the uplink resource indicated by the uplink scheduling information.

With reference to the third implementation of the eleventh aspect, in an eighth implementation of the eleventh aspect, the aperiodic channel state indication information and the feedback indication information that are included in the uplink scheduling information are used by the terminal device to determine to transmit the aperiodic channel state information, the feedback information, or the aperiodic channel state information and the feedback information on the uplink resource indicated by the uplink scheduling information.

With reference to the third implementation of the eleventh aspect, in a ninth implementation of the eleventh aspect, the modulation and coding indication information, the aperiodic channel state indication information, and the feedback indication information that are included in the uplink scheduling information are used by the terminal device to determine to transmit the aperiodic channel state information, the feedback information, or the aperiodic channel state information and the feedback information on the uplink resource indicated by the uplink scheduling information.

According to a twelfth aspect, an access network device is provided, including a processor, a memory, and a communications module, where the memory is configured to store uplink information transmission program code, and the processor is configured to invoke the uplink information transmission program code to perform the following operations: sending, by the processor, uplink scheduling information to a terminal device by using the communications module, where the uplink scheduling information includes aperiodic channel state indication information and feedback indication information, the aperiodic channel state indication information and the feedback indication information are used to instruct the terminal device to determine uplink information to be transmitted on an uplink resource indicated by the uplink scheduling information, and the uplink information includes at least one of the following: uplink data, aperiodic channel state information, and feedback information; and receiving, by the processor by using the communications module, the uplink information transmitted by the terminal device on the uplink resource.

According to a thirteenth aspect, a terminal device is provided, where the terminal device includes modules or units configured to perform the uplink information transmission method according to the first aspect or any one implementation of the first aspect.

According to a fourteenth aspect, a terminal device is provided, where the terminal device includes modules or units configured to perform the uplink information transmission method according to the second aspect or any one implementation of the second aspect.

According to a fifteenth aspect, a terminal device is provided, where the terminal device includes modules or units configured to perform the uplink information transmission method according to the third aspect or any one implementation of the third aspect.

According to a sixteenth aspect, an access network device is provided, where the access network device includes modules or units configured to perform the uplink information transmission method according to the fourth aspect or any one implementation of the fourth aspect.

According to a seventeenth aspect, an access network device is provided, where the terminal device includes modules or units configured to perform the uplink information transmission method according to the fifth aspect or any one implementation of the fifth aspect.

According to an eighteenth aspect, an access network device is provided, where the terminal device includes modules or units configured to perform the uplink information transmission method according to the sixth aspect or any one implementation of the sixth aspect.

According to a nineteenth aspect, a communications system is provided, where the communications system includes the terminal device according to the seventh aspect or the thirteenth aspect and the access network device according to the tenth aspect or the sixteenth aspect; the communications system includes the terminal device according to the eighth aspect or the fourteenth aspect and the access network device according to the eleventh aspect or the seventeenth aspect; or the communications system includes the terminal device according to the ninth aspect or the fifteenth aspect and the access network device according to the twelfth aspect or the eighteenth aspect.

According to a twentieth aspect, a computer readable storage medium is provided, where the readable storage medium stores program code for performing the uplink information transmission method according to the first aspect or any one implementation of the first aspect, and the program code includes an execution instruction for performing the uplink information transmission method.

According to a twenty-first aspect, a computer readable storage medium is provided, where the readable storage medium stores program code for performing the uplink information transmission method according to the second aspect or any one implementation of the second aspect, and the program code includes an execution instruction for performing the uplink information transmission method.

According to a twenty-second aspect, a computer readable storage medium is provided, where the readable storage medium stores program code for performing the uplink information transmission method according to the third aspect or any one implementation of the third aspect, and the program code includes an execution instruction for performing the uplink information transmission method.

According to a twenty-third aspect, a computer readable storage medium is provided, where the readable storage medium stores program code for performing the uplink information transmission method according to the fourth aspect or any one implementation of the fourth aspect, and the program code includes an execution instruction for performing the uplink information transmission method.

According to a twenty-fourth aspect, a computer readable storage medium is provided, where the readable storage medium stores program code for performing the uplink information transmission method according to the fifth aspect or any one implementation of the fifth aspect, and the program code includes an execution instruction for performing the uplink information transmission method.

According to a twenty-fifth aspect, a computer readable storage medium is provided, where the readable storage medium stores program code for performing the uplink information transmission method according to the sixth aspect or any one implementation of the sixth aspect, and the program code includes an execution instruction for performing the uplink information transmission method.

With reference to any one of the foregoing aspects, in some implementations of the present invention, if the terminal device transmits neither the aperiodic channel state information nor the uplink data on the uplink resource, the uplink resource is a resource included in a physical uplink control channel; or if the terminal device transmits the aperiodic channel state information and/or the uplink data on the uplink resource, the uplink resource is a resource included in a physical uplink shared channel.

This manner has the following advantage: When the terminal device determines to transmit the HARQ-ACK but transmit neither the uplink data nor the aperiodic channel state information, the terminal device may transmit the HARQ-ACK by using the physical uplink control channel (PUCCH). Compared with a manner of adding the HARQ-ACK to the physical uplink shared channel (PUSCH), in this manner, multi-user multiplexing can be achieved, to effectively use a license-free frequency band resource. In addition, when the aperiodic channel state information is to be transmitted or the aperiodic channel state information and the HARQ-ACK are to be transmitted, an existing design method for adding the aperiodic channel state information or the aperiodic channel state information and the HARQ-ACK to the PUSCH may be reused.

With reference to any one of the foregoing aspects, in some implementations of the present invention, if the terminal device does not transmit the uplink data on the uplink resource, the uplink resource is a resource included in a physical uplink control channel; or if the terminal device transmits the uplink data on the uplink resource, the uplink resource is a resource included in a physical uplink shared channel.

This manner has the following advantage: When the uplink information that the terminal device determines to transmit is uplink control information, for example, both the HARQ-ACK and the aperiodic channel state information belong to the uplink control information, the terminal device may transmit the control information on the PUCCH, so that multi-user multiplexing can be achieved, to effectively use a license-free frequency band resource.

With reference to any one of the foregoing aspects, in some implementations of the present invention, a format of the uplink scheduling information corresponding to the resource included in the physical uplink control channel is the same as a format of the uplink scheduling information corresponding to the resource included in the physical uplink shared channel.

This manner has the following advantage: A format of scheduling indication information (or downlink control information (DCI)) instructing the terminal device to transmit the uplink information on the PUCCH is the same as a format of scheduling indication information (or downlink control information DCI) instructing the terminal device to transmit the uplink information on the PUSCH, so that complexity of blind detection by the terminal device can be reduced.

BRIEF DESCRIPTION OF THE DRAWINGS

To describe the technical solutions in the embodiments of the present invention more clearly, the following briefly describes the accompanying drawings required for describing the embodiments.

FIG. 1A is a schematic diagram of different TDD uplink-downlink configurations in an LTE system;

FIG. 1B is a schematic diagram of a time sequence relationship between a PDSCH and an ACK/NACK corresponding to the PDSCH in an LTE TDD system;

DETAILED DESCRIPTION OF ILLUSTRATIVE EMBODIMENTS

The terms used in the implementations of the present invention are merely intended to explain specific embodiments of the present invention, but are not intended to limit the present invention. The following clearly describes the technical solutions in the embodiments of the present invention with reference to the accompanying drawings in the embodiments of the present invention.

Figure 2:
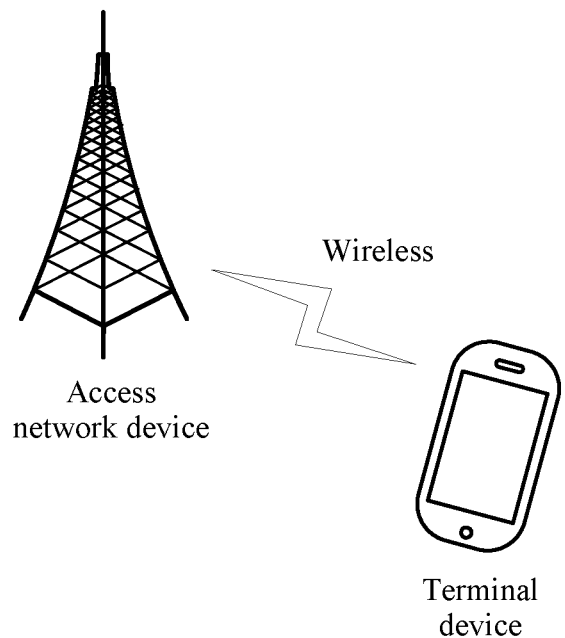
FIG. 2 is a schematic diagram of a communications system according to an embodiment of the present invention

Referring to FIG. 2, FIG. 2 shows a communications system according to an embodiment of the present invention. In this embodiment of the present invention, an access network device and a terminal device may operate on an unlicensed spectrum. The access network device and the terminal device communicate with each other by using an air interface technology. The air interface technology may include existing 2G (for example, a Global System for Mobile Communications (GSM)), 3G (for example, a Universal Mobile Telecommunications System (UMTS), Wideband Code Division Multiple Access (WCDMA), and Time Division-Synchronous Code Division Multiple Access (TD-SCDMA)), and 4G (for example, FDD LTE and TDD LTE), and a future 4.5G system, 5G system, and the like.

The present invention describes the embodiments with reference to the terminal device, and the present invention describes the embodiments by using user equipment (UE) in a general sense. In addition, the terminal device may also be referred to as a mobile console, an access terminal, a subscriber unit, a subscriber station, a mobile station, a remote station, a remote terminal, a mobile device, a user terminal, a terminal, a wireless communications device, a user agent, a user apparatus, or the like. The terminal device may be a station (ST) in a wireless local area network (WLAN), or may be a cellular phone, a cordless telephone set, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a mobile station in a future 5G network, a terminal device in a future evolved public land mobile network (PLMN) network, or the like. In addition, in this embodiment of the present invention, the terminal device may be a relay and another device that can perform data communication with the access network device (for example, a base station).

The present invention describes the embodiments with reference to the access network device. The access network device may be a device configured to communicate with the terminal device. The access network device may be an access point (AP) in a WLAN or a base transceiver station (BTS) in a GSM or CDMA, may be a NodeB (NB) in WCDMA, or may be an evolved NodeB (eNB) in LTE, a relay station, an access point, an in-vehicle device, a wearable device, an access network device in a future 5G network, an access network device in a future evolved PLMN network, or the like.

In this embodiment of the present invention, the terminal device and the access network device can perform wireless communication (for example, transmit uplink information or downlink information) by using a license-free spectrum resource (or a license-free frequency band), to be specific, the communications system described in this embodiment of the present invention is a communications system that can use a license-free frequency band. By way of example, and not limitation, the communications system may use the license-free frequency band by using a licensed-assisted access using LTE (LAA-LTE) technology, the communications system may use the license-free frequency band by using a dual connectivity (DC) technology, or the communications system may use the license-free frequency band by using a technology of independently deploying a license-free frequency band, for example, a standalone LTE over unlicensed spectrum technology. The LAA-LTE technology is a technology of configuring carriers (license-free carriers) on a plurality of license-free frequency bands by using a configuration and a structure of carrier aggregation (CA) in an existing LTE system and on a basis of configuring a carrier (a licensed carrier) on a licensed frequency band of an operator for communication; and using the licensed carrier to assist in using the license-free carriers for communication. Specifically, in a CA manner, an LTE device may configure the licensed carrier as a primary component carrier (PCC) or a primary cell (PCell), and configure the license-free carrier as a secondary component carrier (SCC) or a secondary cell (SCell). Further, in this embodiment of the present invention, the primary cell and the secondary cell may be deployed in one station, or may be deployed in different stations. The DC technology includes a technology of jointly using a licensed carrier and a license-free carrier in a non-CA (or non-ideal backhaul) manner.

The license-free spectrum resource is a resource that is included in a license-free spectrum and that can be shared by communications devices without requiring system allocation. Resource sharing on the license-free frequency band means that a restriction is imposed only on counters such as transmit power and out-of-band leakage during use of a specific spectrum, to ensure that a plurality of devices that jointly use the frequency band meet a basic coexistence requirement. An operator can achieve network capacity offloading by using a license-free frequency band resource, but the operator needs to comply with regulatory requirements of different regions and different spectrums for the license-free frequency band resource. These requirements are usually formulated to protect a public system such as radar and ensure that a plurality of systems cause no harmful impact to each other if possible and fairly coexist with each other. These requirements include a transmit power restriction, an out-of-band leakage counter, an indoor/outdoor use restriction, some additional coexistence policies in some regions, and the like. For example, communications devices can use a spectrum resource in a contention manner or a listening manner, for example, a manner specified by LBT.

By way of example, and not limitation, in this embodiment of the present invention, the license-free spectrum resource may include an approximate 900 MHz frequency band near 5 GHz frequency band, and an approximate 90 MHz frequency band near 2.4 GHz frequency band.

The licensed spectrum resource is usually a spectrum resource that needs to be approved by a national or local wireless committee before being used. Different systems, for example, an LTE system and a WiFi system, or systems included by different operators, cannot share a licensed spectrum resource.

In this embodiment of the present invention, it may be considered that a carrier is conceptually equivalent to a cell. For example, accessing a carrier by a terminal device may be equivalent to accessing a cell by the terminal device. For another example, in a CA scenario, when a primary carrier or a secondary carrier is configured for a terminal device, a carrier index of the carrier and a cell identity (Cell ID) of a cell operating on the carrier are both carried. In this case, it may be considered that a carrier is conceptually equivalent to a cell. In the descriptions of the embodiments of the present invention, unless otherwise specified, "cell" may be replaced with "carrier".

Figure 3:
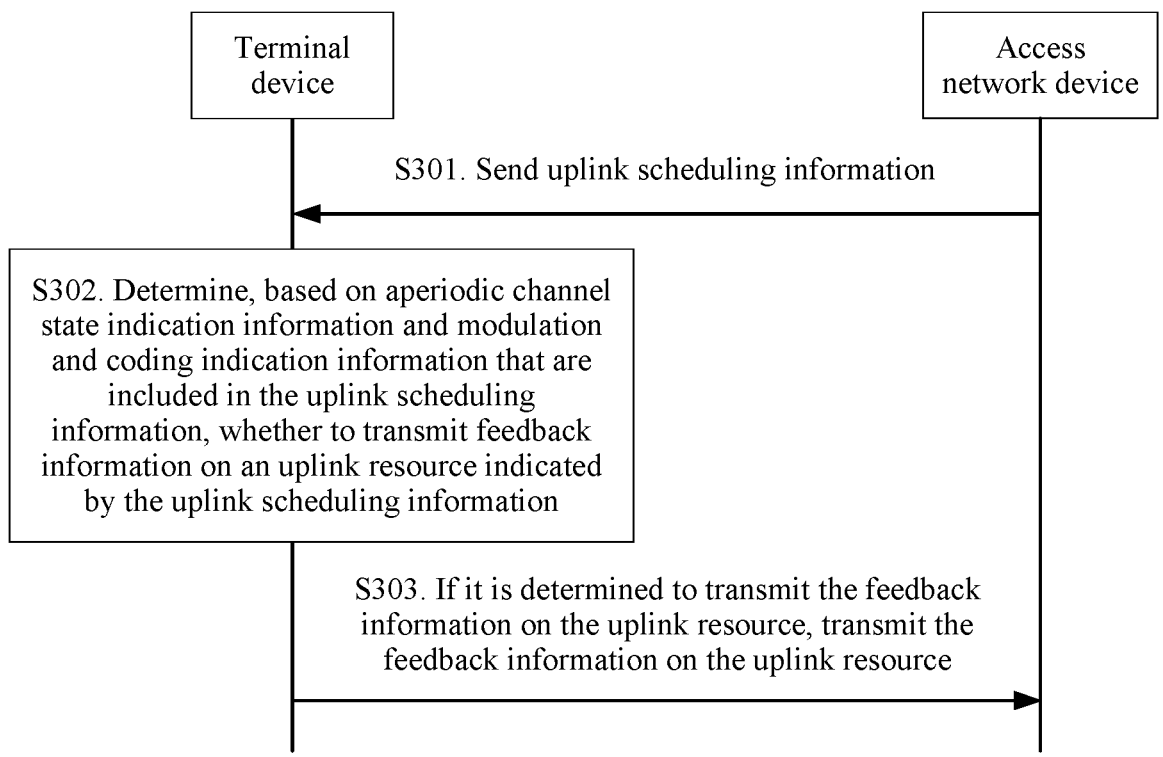
FIG. 3 is a schematic flowchart of an uplink information transmission method according to an embodiment of the present invention.

Referring to FIG. 3, FIG. 3 is a schematic flowchart of an uplink information transmission method according to an embodiment of the present invention. The method includes but is not limited to the following steps.

S301. A terminal device receives uplink scheduling information sent by an access network device.

In this embodiment of the present invention, the uplink scheduling information may be information carried on a physical downlink control channel (PDCCH), or may be information carried on an enhanced physical downlink control channel (EPDCCH). The uplink scheduling information may be uplink grant (UL grant) information, and indicates the terminal device to transmit uplink information. An LTE system supporting the release 14 and an LTE system supporting a release earlier than the release 14 are used as examples. The uplink scheduling information may be all or a part of control information sent in a downlink control information (DCI) format 0, all or a part of control information sent in a DCI format 4, all or a part of control information sent in a DCI format 0A, all or a part of control information sent in a DCI format 0B, all or a part of control information sent in a DCI format 4A, or all or a part of control information sent in a DCI format 4B. All of the foregoing control information can be considered as the uplink scheduling information in this embodiment of the present invention. In this embodiment of the present invention, the uplink scheduling information may be further used to instruct the terminal device to transmit the uplink information in one or more time units. The time unit described herein may be one subframe, one timeslot, or one orthogonal frequency division multiplexing (OFDM) symbol. This is not specifically limited in this embodiment of the present invention.

In this embodiment of the present invention, the uplink scheduling information may be used to instruct the terminal device to send the uplink information on a PUCCH or a PUSCH. The uplink information may include at least one of the following: an HARQ-ACK, channel state information (CSI), and uplink data. The HARQ-ACK includes at least an ACK or NACK. The CSI includes aperiodic CSI (aCSI). The uplink data is uplink service data, and the uplink data may be considered as a transport block carried on an uplink shared channel (UL-SCH). For ease of description, in this embodiment of the present invention, unless otherwise specified, feedback information is represented by using the HARQ-ACK, the uplink data is represented by using the UL-SCH, and the aperiodic channel state information is represented by using the aCSI.

S302. The terminal device determines, based on aperiodic channel state indication information and modulation and coding indication information that are included in the uplink scheduling information, whether to transmit feedback information on an uplink resource indicated by the uplink scheduling information.

In this embodiment of the present invention, the uplink scheduling information includes at least the aperiodic channel state indication information (which can be represented by using an aCSI trigger) and the modulation and coding indication information (which can be represented by using an MCS index). The aperiodic channel state indication information is used to indicate whether the terminal device feeds back the CSI, or indicate whether the terminal device feeds back the CSI on the uplink resource indicated by the uplink scheduling information. The aperiodic channel state indication information may further indicate serving cells and/or channel state information processes (CSI process) that are corresponding to the CSI fed back by the terminal device. Herein, CSI corresponding to a serving cell may be understood as channel state information of a downlink data transmission link between the serving cell and the terminal device. The downlink data transmission link is a data transmission link on which the serving cell sends data to the terminal device. CSI corresponding to a CSI process may be understood as a CSI measurement result that is obtained through calculation by the terminal device by using a channel state information-reference signal (CSI-RS) and a channel state information-interference measurement (CSI-IM) resource that are corresponding to the CSI process. In other words, in this embodiment of the present invention, when the aperiodic channel state indication information instructs the terminal device to feed back the CSI, the CSI that is fed back may be corresponding to a single serving cell or a single CSI process, or may be corresponding to a plurality of serving cells or a plurality of CSI processes.

An example in which the uplink scheduling information is a UL grant is used. The aperiodic channel state indication information included in the uplink scheduling information may be represented by using an aperiodic CSI request field included in the UL grant. The following Table 1 shows an example method for using the aperiodic channel state indication information. In Table 1, when the aperiodic state indication information is represented as "00", it indicates that the terminal device is not triggered to transmit the aperiodic CSI. When the aperiodic state indication information is represented as "01", it indicates that the terminal device is triggered to transmit the aperiodic CSI and transmit only aperiodic CSI corresponding to a serving cell. When the aperiodic state indication information is represented as "10" or "11", it indicates that the terminal device is triggered to transmit aperiodic CSI corresponding to a first set/second set of serving cells. The first set/second set of serving cells includes serving cells that are indicated to the terminal device through higher layer signaling configuration.

TABLE 1

CORRESPONDENCE BETWEEN AN APERIODIC CSI REQUEST FIELD AND A CSI REPORT

| Value of a CSI request field (Value of CSI request field) | Correspondence |
|---|---|
| '00' | No aperiodic CSI report is triggered |
| '01' | Aperiodic CSI report is triggered for serving cell $c$ |

TABLE 1-continued

CORRESPONDENCE BETWEEN AN APERIODIC
CSI REQUEST FIELD AND A CSI REPORT

| Value of a CSI request field (Value of CSI request field) | Correspondence |
|---|---|
| '10' | Aperiodic CSI report is triggered for a 1st set of serving cells configured by higher layers |
| '11' | Aperiodic CSI report is triggered for a 2nd set of serving cells configured by higher layers |

In this embodiment of the present invention, the modulation and coding indication information can be understood as follows: When the access network device instructs, by using the uplink scheduling information, the terminal device to transmit the uplink data (or the UL-SCH), or a PUSCH is scheduled by using the scheduling information, the terminal device may determine, based on the modulation and coding indication information included in the uplink scheduling information indication, at least one of the following used to transmit the uplink data: a modulation order, a transport block size (Transmission Block Size, TBS) index, and a redundancy version (RV). Further, the terminal device may determine, based on the TBS Index and a determined quantity of scheduled resources, a quantity of original bits that can be transmitted (excluding cyclic redundancy check) bit. An example in which the uplink scheduling information is a UL grant is used. The modulation and coding indication information included in the uplink scheduling information may be represented by using a 5-bit modulation and coding scheme and redundancy version included in the UL grant. In this embodiment of the present invention, the modulation and coding indication information may be in a one-to-one correspondence with a modulation and coding scheme number. The terminal device may determine the modulation and coding indication information based on the modulation and coding scheme number. Alternatively, the terminal device may determine, based on the modulation and coding scheme number, at least one of the following: the modulation order, a TBS, and the RV.

Specifically, the terminal device may determine, based on the aperiodic channel state indication information and the modulation and coding indication information that are included in the uplink scheduling information, whether to transmit the feedback information on the uplink resource indicated by the uplink scheduling information. In this embodiment of the present invention, the feedback information is the HARQ-ACK.

In this embodiment of the present invention, if the terminal device determines to transmit the HARQ-ACK on the uplink resource indicated by the uplink scheduling information, the HARQ-ACK may be an HARQ-ACK acknowledgement for downlink data that is included in a single serving cell and that is scheduled to the terminal device, or may be an HARQ-ACK acknowledgement for downlink data that is included in a plurality of serving cells and that is scheduled to the terminal device. This is not specifically limited in this embodiment of the present invention. For example, in a CA scenario, five serving cells are configured for the terminal device and are respectively represented by using a serving cell 1 (Serving cell 1, SC1), an SC2, an SC3, an SC4, and an SC5, and carriers corresponding to the five serving cells are respectively represented by using a CC1, a CC2, a CC3, a CC4, and a CC5. It is assumed that the uplink scheduling information is sent in the SC1, the terminal device determines, based on the uplink scheduling information, to feed back the HARQ-ACK on the uplink resource indicated by the uplink scheduling information, and a carrier to which the uplink resource belongs is the same as a carrier, namely, the CC1, of the serving cell 1. In this case, in one manner, the terminal device feeds back an HARQ-ACK corresponding to downlink data included in the SC1 only. In the other manner, the terminal device may feed back an HARQ-ACK corresponding to downlink data included in a plurality of serving cells. The plurality of serving cells are all corresponding to the CC1, and the correspondence may be configured by using RRC signaling. For example, if the access network device may indicate, to the terminal device through RRC signaling configuration, that an HARQ-ACK corresponding to downlink data of the SC1/SC2/SC3 is to be transmitted on the CC1, when determining to transmit an HARQ-ACK on the CC1, the terminal device may transmit, on the CC1, the HARQ-ACK corresponding to the downlink data of the SC1/SC2/SC3. It should be noted that, in this embodiment of the present invention, the terminal device may feed back the HARQ-ACK information for actually scheduled downlink data. For example, during downlink data transmission, the access network device can schedule a maximum of 16 downlink HARQ processes to the terminal device, but when determining to feed back the HARQ-ACK, the terminal device can determine four actually scheduled downlink HARQ processes. In this case, the terminal device may give feedback only for the four HARQ processes. Alternatively, in this embodiment of the present invention, the terminal device feeds back the HARQ-ACK information for a maximum quantity of downlink HARQ processes configured by the access network device. For example, if the access network device can configure a maximum of 16 downlink HARQ processes, after determining to feed back the HARQ-ACK, the terminal device may give feedback for the 16 HARQ processes, even if fewer than 16 downlink HARQ processes are actually scheduled. Further, the maximum quantity of downlink HARQ processes configured by the access network device may be configured by using RRC signaling, or may be configured by using Medium Access Control (English: Medium Access Control, MAC) signaling. Alternatively, the maximum quantity of downlink HARQ processes may be specified by a standard or protocol. This is not specifically limited in this embodiment of the present invention. The foregoing explanations of the HARQ-ACK are also applicable to the following embodiment shown in FIG. 4 or FIG. 5. Details are not described below again.

In this embodiment of the present invention, there may be at least two understandings of the uplink resource indicated by the uplink scheduling information. One understanding is that a specific location (for example, a time and/or frequency location) of the uplink resource is indicated by the uplink scheduling information. Herein, the time location of the uplink resource means that the time location of the uplink resource is included, and may be, for example, represented by using a subframe index number, and the frequency location of the uplink resource means that the frequency location of the uplink resource is included, and may be, for example, represented by using a resource block (RB) location. A UL grant is used as an example. Resource block assignment and hopping resource allocation indication information included in the UL grant may be used to indicate a frequency location of a scheduled uplink resource to the terminal device. Another understanding is that a specific location (for example, a time and/or frequency location) of the uplink resource is preconfigured, for example, is configured by using radio resource control (RRC) signaling. The uplink resource indicated by the uplink scheduling information may be understood that the uplink scheduling information instructs the terminal device to use the preconfigured uplink resource. For example, when the uplink resource is a resource included in a PUCCH, if determining, based on the uplink scheduling information, to transmit the uplink information on the PUCCH resource indicated by the uplink scheduling information, the terminal device may transmit the uplink information by using the preconfigured uplink resource.

In this embodiment of the present invention, the uplink resource may be a resource included in a PUSCH, or may be a resource included in a PUCCH. When the uplink resource is the resource included in the PUSCH, the access network device may indicate, by using the uplink scheduling information, a specific frequency location of the uplink resource, which is also understood as a frequency location of the PUSCH. When the uplink resource is the resource included in the PUCCH, the access network device may indicate a specific frequency location of the uplink resource by using the uplink scheduling information, or may instruct, by using the uplink scheduling information, the terminal device to transmit the uplink information by using the PUCCH resource. In this case, the PUCCH resource may be preconfigured, for example, is configured by using RRC signaling. This embodiment of the present invention is not limited thereto.

In this embodiment of the present invention, the carrier to which the uplink resource belongs may be the same as or may be different from a carrier to which the uplink scheduling information belongs. This is not specifically limited.

Optionally, in this embodiment of the present invention, in addition to determining, based on the aperiodic channel state indication information and the modulation and coding indication information that are included in the uplink scheduling information, whether to transmit the HARQ-ACK, the terminal device may determine, from the following uplink information based on the aperiodic channel state indication information and the modulation and coding indication information, uplink information to be transmitted on the uplink resource indicated by the uplink scheduling information: the HARQ-ACK; the HARQ-ACK and the aCSI; the HARQ-ACK and the UL-SCH; and the HARQ-ACK, the aCSI, and the UL-SCH.

It should be noted that, no limitation is specifically imposed on an execution order of determining, by the terminal device based on the aperiodic channel state indication information and the modulation and coding indication information that are included in the uplink scheduling information, whether to transmit the HARQ-ACK and determining, by the terminal device from the following uplink information based on the aperiodic channel state indication information and the modulation and coding indication information that are included in the uplink scheduling information, the uplink information to be transmitted on the uplink resource indicated by the uplink scheduling information: the HARQ-ACK; the HARQ-ACK and the aCSI; the HARQ-ACK and the UL-SCH; and the HARQ-ACK, the aCSI, and the UL-SCH. During specific implementation, the terminal device may first determine, based on the aperiodic channel state indication information and the modulation and coding indication information, whether to transmit the HARQ-ACK. If determining to transmit the HARQ-ACK, the terminal device further determines, from the following uplink information based on the aperiodic channel state indication information and the modulation and coding indication information, the uplink information to be transmitted on the uplink resource: the HARQ-ACK; the HARQ-ACK and the aCSI; the HARQ-ACK and the UL-SCH; and the HARQ-ACK, the aCSI, and the UL-SCH. Alternatively, the terminal device may first determine, from the following uplink information based on the aperiodic channel state indication information and the modulation and coding indication information, the uplink information to be transmitted on the uplink resource: the HARQ-ACK; the HARQ-ACK and the aCSI; the HARQ-ACK and the UL-SCH; and the HARQ-ACK, the aCSI, and the UL-SCH. If determining that a current case is none of the foregoing four cases, the terminal device further determines, based on the aperiodic channel state indication information and the modulation and coding indication information, whether to transmit the HARQ-ACK. Alternatively, the terminal device may directly determine, from the following uplink information based on the aperiodic channel state indication information and the modulation and coding indication information, the uplink information to be transmitted on the uplink resource: the HARQ-ACK; the HARQ-ACK and the aCSI; the HARQ-ACK and the UL-SCH; and the HARQ-ACK, the aCSI, and the UL-SCH. Further, the terminal device may determine, from the following uplink information based on the aperiodic channel state indication information and the modulation and coding indication information, uplink information to be transmitted on the uplink resource: the UL-SCH; the UL-SCH and the aCSI; and the aCSI.

The following Table 2 shows an example method. In Table 2, the aperiodic channel state indication information is represented by "setting to false" or "setting to true". When the aperiodic state indication information is set to "false", it indicates that the terminal device does not report the aCSI, or it indicates that the terminal device does not report the aCSI on the uplink resource indicated by the uplink scheduling information. On the contrary, when the aperiodic state indication information is set to "true", it indicates that the terminal device reports the aCSI, or it indicates that the terminal device reports the aCSI on the uplink resource indicated by the uplink scheduling information. In an example in which the aperiodic channel state indication information is 1 bit, 0 may indicate "setting to false" and 1 may indicate "setting to true". Further, when the aperiodic channel state indication information is set to "true", in addition to indicating that the terminal device reports the aCSI, the aperiodic channel state indication information may indicate a serving cell or serving cells that are corresponding to the aCSI reported by the terminal device, or may indicate a CSI process or CSI processes that are corresponding to the aCSI reported by the terminal device. For example, as described in the foregoing Table 1, "01", "10", and "11" all can indicate that the aperiodic state indication information is set to "true". In Table 2, the modulation and coding indication information is represented by using the modulation and coding scheme number. Assuming that the modulation and coding indication information can be represented by using 5-bit information, a value range of the corresponding modulation and coding scheme number is 0 to 31.

Table 2 is used as an example. When the terminal device determines that the aperiodic state indication information and the modulation and coding indication information meet a value range corresponding to any one of the second row to the fourth row, the terminal device may determine not to transmit the HARQ-ACK on the uplink resource indicated by the uplink scheduling information. Otherwise, the terminal device may determine to transmit the HARQ-ACK on the uplink resource. Alternatively, when the terminal device determines that the aperiodic state indication information and the modulation and coding indication information meet a value range corresponding to any one of the fifth row to the eighth row, the terminal device may determine to transmit the HARQ-ACK on the uplink resource indicated by the uplink scheduling information. Otherwise, the terminal device may determine not to transmit the HARQ-ACK on the uplink resource. The terminal device may further determine, based on value ranges that are corresponding to the aperiodic channel state indication information and the modulation and coding indication information and that are corresponding to the fifth row to the eighth row in Table 2, whether the terminal device can further transmit the aCSI and the UL-SCH on the uplink resource when transmitting the HARQ-ACK. In Table 2, Note 1 indicates that if a corresponding modulation and coding scheme is 29 when the terminal device determines to transmit "UL-SCH+ HARQ-ACK" on the uplink resource, a corresponding modulation and coding scheme is 30 or 31 when the terminal device determines to transmit "HARQ-ACK" on the uplink resource. Note 2 indicates that if a corresponding modulation and coding scheme is 30 when the terminal device determines to transmit "aCSI+HARQ-ACK" on the uplink resource, a corresponding modulation and coding scheme is 31 when the terminal device determines to transmit "UL-SCH+aCSI+HARQ-ACK" on the uplink resource.

Optionally, in this embodiment of the present invention, when the terminal device determines to transmit the HARQ-ACK but transmit neither the UL-SCH nor the aCSI on the uplink resource, the terminal device transmits the HARQ-ACK on the resource included in the PUCCH. Alternatively, in this embodiment of the present invention, when the terminal device determines that the uplink information to be transmitted on the uplink resource includes the HARQ-ACK but excludes the aCSI, when the uplink information to be transmitted on the uplink resource includes the HARQ-ACK but excludes the UL-SCH, or when the terminal device determines that the uplink information to be transmitted on the uplink resource includes the HARQ-ACK but includes neither the aCSI nor the UL-SCH, the uplink resource is the resource included in the PUCCH, and the terminal device transmits the HARQ-ACK on the PUCCH.

Optionally, in this embodiment of the present invention, when the terminal device determines to transmit, on the uplink resource, one of the following uplink information: the HARQ-ACK and the aCSI; the HARQ-ACK and the UL-SCH; the HARQ-ACK, the aCSI, and the UL-SCH; the aCSI; the aCSI and the UL-SCH; and the UL-SCH, the terminal device transmits the information on the resource included in the PUSCH. Table 3 shows a correspondence between different uplink information and uplink channels

TABLE 2

| | Type of to-be-transmitted uplink information | Aperiodic channel state indication information | Modulation and coding scheme |
|---|---|---|---|
| First row | | | |
| Second row | UL-SCH | Set to "false" | Any value in 0 to 28 |
| Third row | aCSI | Set to "true" | 29 |
| Fourth row | UL-SCH + aCSI | Set to "true" | Any value in 0 to 28 |
| Fifth row | UL-SCH + HARQ-ACK | Set to "false" | Any value in 29 to 31 [Note 1] |
| Sixth row | aCSI + HARQ-ACK | Set to "true" | 30 or 31 [Note 2] |
| Seventh row | UL-SCH + aCSI + HARQ-ACK | Set to "true" | 30 or 31 [Note 2] |
| Eighth row | HARQ-ACK | Set to "false" | Any value in 29 to 31 [Note 1] |

[Note 1]:
Different states are corresponding to different values.
[Note 2]:
Different states are corresponding to different values.

It should be noted that, in this embodiment of the present invention, for the uplink information part in the table, "+" represents "and". For example, "HARQ-ACK+aCSI" in the table represents "HARQ-ACK and aCSI". In all of the following tables, "+" represents "and".

In the indication manner shown in Table 2, an indication method in the existing UL grant can be reused to a maximum extent, and a previous method for determining, by the terminal device, to transmit the UL-SCH and/or the aCSI on the scheduled uplink resource can be maintained, so that the terminal device is slightly changed.

Optionally, if the terminal device transmits neither the aperiodic channel state information nor the uplink data on the uplink resource, the uplink resource is a resource included in a PUCCH. If the terminal device transmits the aperiodic channel state information and/or the uplink data on the uplink resource, the uplink resource is a resource included in a PUSCH.

In this embodiment of the present invention, that the uplink resource is a resource included in a PUCCH may be understood that a channel that carries the uplink resource is the PUCCH, and that the uplink resource is a resource included in a PUSCH may be understood that a channel that carries the uplink resource is the PUSCH.

used by the terminal device to transmit the uplink information. In this embodiment of the present invention, the uplink information includes at least one of the following: the HARQ-ACK, the aCSI, and the UL-SCH.

TABLE 3

EXAMPLE METHOD OF AN UPLINK CHANNEL CORRESPONDING TO UPLINK INFORMATION

| Type of uplink information | Uplink channel |
|---|---|
| UL-SCH | PUSCH |
| UL-SCH and aCSI | |
| UL-SCH and HARQ-ACK | |
| UL-SCH, aCSI, and HARQ-ACK | |
| aCSI | |
| HARQ-ACK | PUCCH |
| aCSI and HARQ-ACK | PUSCH |

This manner has the following advantage: When the terminal device determines to transmit the HARQ-ACK but transmit neither the UL-SCH nor the aCSI, the terminal device may transmit the HARQ-ACK by using the PUCCH channel. Compared with a manner of adding the HARQ-ACK to the PUSCH, in this manner, multi-user multiplexing can be achieved, to effectively use a license-free frequency band resource. In addition, during transmission of the aCSI or the aCSI and the HARQ-ACK, an existing design method for adding the aCSI or the aCSI and the HARQ-ACK to the PUSCH may be reused.

Optionally, if the terminal device does not transmit the uplink data on the uplink resource, the uplink resource is a resource included in a PUCCH. If the terminal device transmits the uplink data on the uplink resource, the uplink resource is a resource included in a PUSCH.

Optionally, in this embodiment of the present invention, when the terminal device determines not to transmit the UL-SCH on the uplink resource, for example, when the terminal device determines to transmit, on the uplink resource, at least one of the following: the aCSI and the HARQ-ACK, the uplink resource is the resource included in the PUCCH, and the terminal device transmits, on the PUCCH, at least one of the following: the aCSI and the HARQ-ACK.

Optionally, in this embodiment of the present invention, when the terminal device determines to transmit the UL-SCH on the uplink resource, for example, when the terminal device determines to transmit, on the uplink resource, one of the following: the UL-SCH; the UL-SCH and the aCSI; the UL-SCH and the HARQ-ACK; and the UL-SCH, the aCSI, and the HARQ-ACK, the uplink resource is the resource included in the PUSCH, and the terminal device transmits, on the PUSCH, one of the following: the UL-SCH; the UL-SCH and the aCSI; the UL-SCH and the HARQ-ACK; and the UL-SCH, the aCSI, and the HARQ-ACK.

Table 4 shows a correspondence between different uplink information and uplink channels used by the terminal device to transmit the uplink information. In this embodiment of the present invention, the uplink information includes at least one of the following: the HARQ-ACK, the aCSI, and the UL-SCH.

TABLE 4

EXAMPLE METHOD OF AN UPLINK CHANNEL CORRESPONDING TO UPLINK INFORMATION

| Type of uplink information | Uplink channel |
|---|---|
| UL-SCH | PUSCH |
| UL-SCH and aCSI | |
| UL-SCH and HARQ-ACK | |
| UL-SCH, aCSI, and HARQ-ACK | |
| aCSI | |
| HARQ-ACK | PUCCH |
| aCSI and HARQ-ACK | PUCCH |

Table 5 shows another correspondence between different uplink information and uplink channels used by the terminal device to transmit the uplink information.

TABLE 5

| Type of uplink information | Uplink channel |
|---|---|
| UL-SCH | PUSCH |
| UL-SCH and aCSI | |
| UL-SCH and HARQ-ACK | |
| UL-SCH, aCSI, and HARQ-ACK | |
| aCSI | PUCCH |
| HARQ-ACK | PUCCH |
| aCSI and HARQ-ACK | PUCCH |

It should be noted that, in this embodiment of the present invention, optionally, the terminal device may determine, based on the type of the uplink information to be transmitted on the uplink resource indicated by the uplink scheduling information, a type of a channel to which the uplink resource belongs. For example, with reference to the foregoing descriptions, if the terminal device determines to transmit the HARQ-ACK but transmit neither the UL-SCH nor the aCSI on the uplink resource, the terminal device may determine to transmit the HARQ-ACK on the PUCCH. Alternatively, for another example, as shown in Table 3 to Table 5, the terminal device may determine, based on the modulation and coding indication information and the aperiodic channel state indication information, the uplink information to be transmitted on the uplink resource, and then determine, based on the determined uplink information, an uplink channel that carries the uplink information. Alternatively, the terminal device may directly determine, based on the modulation and coding indication information and the aperiodic channel state indication information, an uplink channel that carries the uplink information.

This manner has the following advantage: When the uplink information that the terminal device determines to transmit is uplink control information, for example, both the HARQ-ACK and the aCSI belong to the uplink control information, the terminal device may transmit the control information on the PUCCH, so that multi-user multiplexing can be achieved, to effectively use a license-free frequency band resource.

Optionally, a format of the uplink scheduling information corresponding to the resource included in the PUCCH is the same as a format of the uplink scheduling information corresponding to the resource included in the PUSCH.

In this embodiment of the present invention, the uplink scheduling information corresponding to the resource included in the PUCCH may be understood that the uplink scheduling information indicates the resource included in the PUCCH or triggers the UE to transmit the uplink information on the resource included in the PUCCH. Correspondingly, the uplink scheduling information corresponding to the resource included in the PUSCH may be understood that the uplink scheduling information indicates the resource included in the PUSCH or triggers the UE to transmit the uplink information on the resource included in the PUSCH. In this embodiment of the present invention, it may be understood that the format of the uplink scheduling information may be represented by using different DCI formats. For example, the format of the uplink scheduling information may be represented by using a format (for example, the DCI format 0, the DCI format 4, the DCI format 0A/0B, or the DCI format 4A/4B) corresponding to the UL grant. The DCI format 0 may instruct the UE to transmit single-codeword data on the scheduled uplink resource. The DCI format 4 may instruct the UE to transmit single-codeword data or dual-codeword data on the scheduled uplink resource. The DCI format 0A/0B may instruct the UE to perform uplink single-codeword data transmission in one or more uplink subframes on a license-free frequency band resource. The DCI format 4A/4B may instruct the UE to perform uplink single-codeword or dual-codeword data transmission in one or more uplink subframes on a license-free frequency band resource.

In this embodiment of the present invention, that the format of the uplink scheduling information corresponding to the PUCCH is the same as the format of the uplink scheduling information corresponding to the PUSCH may indicate that a same DCI format is used for the uplink scheduling information corresponding to the PUCCH and the uplink scheduling information corresponding to the PUSCH, or a quantity of information bits included in the format of the uplink scheduling information corresponding to the PUCCH is the same as a quantity of information bits included in the format of the uplink scheduling information corresponding to the PUSCH. For example, it is assumed that the access network device instructs, by using first scheduling information, the UE to transmit the HARQ-ACK on the PUCCH, the access network device instructs, by using second scheduling information, the UE to transmit, on the PUSCH, one of the following: the UL-SCH; the UL-SCH and the aCSI; the UL-SCH and the HARQ-ACK; the UL-SCH, the aCSI, and the HARQ-ACK; the aCSI; and the aCSI and the HARQ-ACK, the first scheduling information is sent in a DCI format A, and the second scheduling information is sent in a DCI format B. In this case, that the format of the uplink scheduling information corresponding to the resource included in the PUCCH is the same as the format of the uplink scheduling information corresponding to the resource included in the PUSCH may indicate that the DCI format A is the same as the DCI format B.

In this embodiment of the present invention, the format of the uplink scheduling information corresponding to the resource included in the physical uplink control channel is the same as the format of the uplink scheduling information corresponding to the resource included in the physical uplink shared channel. For example, the access network device may instruct, by using one UL grant, the terminal device to transmit the HARQ-ACK on the resource included in the PUCCH or transmit the HARQ-ACK on the resource included in the PUSCH. Optionally, in this embodiment of the present invention, the terminal device may determine, based on the aperiodic channel state indication information and the modulation and coding indication information in the UL grant, whether a resource for transmitting the HARQ-ACK is the resource included in the PUCCH or the resource included in the PUSCH. Certainly, this embodiment of the present invention is not limited to this implementation method.

Optionally, when the aperiodic channel state indication information included in the uplink scheduling information instructs the terminal device to feed back the aperiodic channel state information and a modulation and coding scheme index number corresponding to the modulation and coding indication information included in the uplink scheduling information is set to 30 or 31, the terminal device determines to transmit the feedback information on the uplink resource indicated by the uplink scheduling information; and/or when the aperiodic channel state indication information included in the uplink scheduling information instructs the terminal device not to feed back the aperiodic channel state information and a modulation and coding scheme index number corresponding to the modulation and coding indication information included in the uplink scheduling information is set to any value in 29 to 31, the terminal device determines to transmit the feedback information on the uplink resource indicated by the uplink scheduling information.

In this embodiment of the present invention, the terminal device may determine, based on the aperiodic channel state indication information and the modulation and coding indication information in Table 2, to transmit, on the uplink resource, at least one of the following: the HARQ-ACK, the aCSI, and the UL-SCH. When the terminal device determines to transmit the UL-SCH on the uplink resource, an index value corresponding to the modulation and coding indication information is any value in 0 to 28.

This has the following advantage: On a license-free frequency band, asynchronous and adaptive uplink data transmission is performed to effectively use an uplink resource. In this case, modulation and coding schemes (MCS index) 29 to 31 that are mainly used for non-adaptive retransmission may not be used to indicate an MCS used when the UE transmits the UL-SCH, so that it can be determined, by using the MCS indexes 29 to 31 and with reference to the aperiodic channel state indication information (an aCSI trigger), to transmit, on the uplink resource, one of the following: the HARQ-ACK; the HARQ-ACK and the UL-SCH; the HARQ-ACK and the aCSI; and the HARQ-ACK, the UL-SCH, and the aCSI. Therefore, signaling overheads can be reduced.

Optionally, the format of the uplink scheduling information corresponding to the PUCCH is the same as the format of the uplink scheduling information corresponding to the PUSCH. To be specific, a format of scheduling indication information (or downlink control information DCI) instructing the UE to transmit the uplink information on the PUCCH is the same as a format of scheduling indication information (or downlink control information DCI) instructing the UE to transmit the uplink information on the PUSCH, so that complexity of blind detection by the UE can be reduced. An example in which the scheduling indication information is a UL grant is used. Information included in the UL grant may be used to distinguish whether a resource indicated by the UL grant is a resource included in a PUCCH or a resource included in a PUSCH. The resource indicated by the UL grant may be understood as a resource triggered by the UL grant. In this case, the UE can distinguish, based on the information included in the UL grant, the resource indicated by the UL grant. The UE may detect the UL grant once in various possible control resources (the various possible control resources may be distinguished from each other based on aggregation levels (aggregation level) and/or resource locations of the control resources) included in search space (search space), without detecting the UL grant twice for different uplink resources indicated by the UL grant. This embodiment of the present invention has the following advantage: Complexity of blind detection by the UE can be reduced.

S303. If determining to transmit the feedback information on the uplink resource, the terminal device transmits the feedback information on the uplink resource.

By performing the method described in FIG. 3, the terminal device can determine whether the terminal device needs to feed back the HARQ-ACK, and can further reuse the aperiodic channel state indication information and the modulation and coding indication information that are included in the existing uplink scheduling information (for example, a UL grant), without causing extra signaling overheads, so that signaling overheads are reduced.

Figure 4:
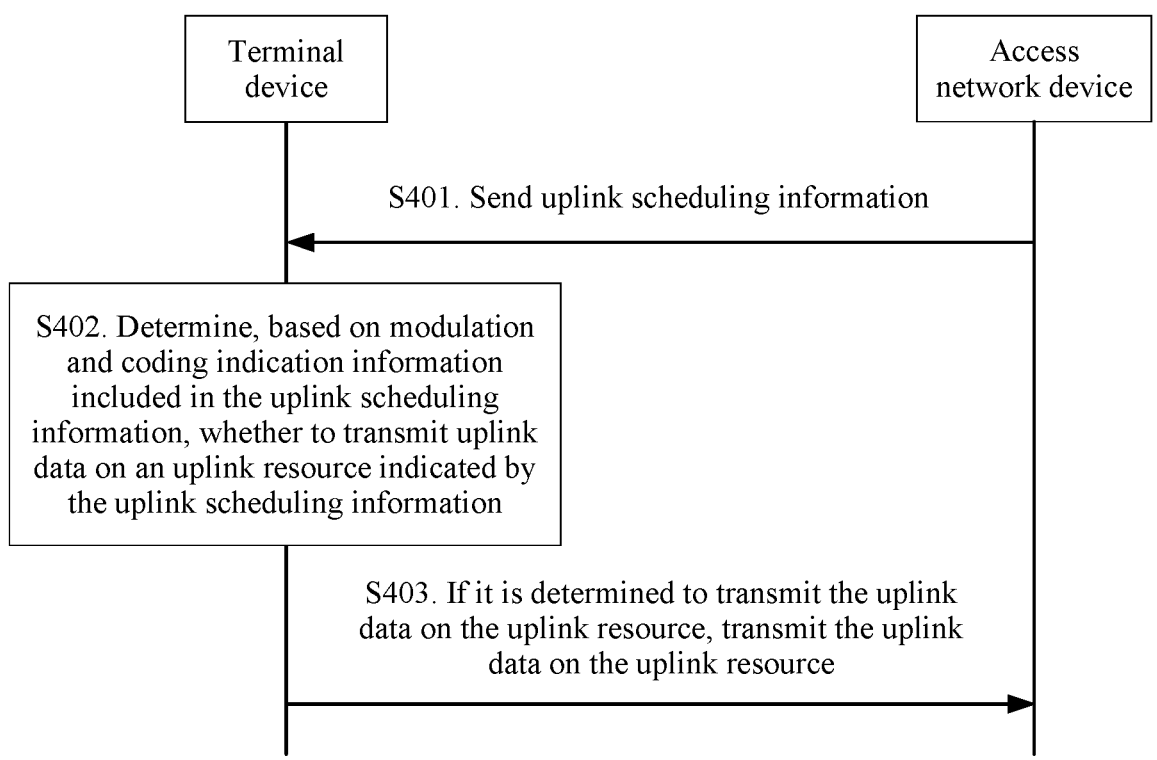
FIG. 4 is a schematic flowchart of another uplink information transmission method according to an embodiment of the present invention.

Referring to FIG. 4, FIG. 4 is a schematic flowchart of another uplink information transmission method according to an embodiment of the present invention. The method includes but is not limited to the following steps.

S401. A terminal device receives uplink scheduling information sent by an access network device.

For step S401 in this embodiment of the present invention, refer to step S301 in the embodiment shown in FIG. 3. Details are not described herein again.

S402. The terminal device determines, based on modulation and coding indication information included in the uplink scheduling information, whether to transmit uplink data on an uplink resource indicated by the uplink scheduling information.

On a license-free frequency band, asynchronous and adaptive uplink data transmission is performed to effectively use an uplink resource. In this case, modulation and coding schemes (MCS index) 29 to 31 that are included in the UL grant and that are mainly used for non-adaptive retransmission may not be used to indicate an MCS used when the UE transmits the UL-SCH. Instead, only any value in MCS indexes 0 to 28 is used to indicate the MCS used when the UE transmits the UL-SCH. Therefore, in this embodiment of the present invention, the UE may determine, based on a value range of an MCS index included in the uplink scheduling information, whether to transmit the uplink data on the uplink resource.

Specifically, 5-bit modulation and coding indication information included in the existing UL grant is used as an example. If the MCS index corresponding to the modulation and coding indication information is any value in 0 to 28, the terminal device transmits the uplink data on the uplink resource. If the MCS index corresponding to the modulation and coding indication information is a value other than 0 to 28, for example, any value in 29 to 31, or either of 30 and 31, the terminal device does not transmit the uplink data on the uplink resource. In this manner, an MCS of the uplink data can be adaptively adjusted, to improve data transmission efficiency.

In this embodiment of the present invention, for ease of description, unless otherwise specified, the modulation and coding indication information is in a one-to-one correspondence with the modulation and coding scheme index (Modulation Coding and Scheme Index, MCS index). Therefore, the modulation and coding indication information may be represented by using the MCS index.

Optionally, when the terminal device determines that the index number corresponding to the modulation and coding indication information included in the uplink scheduling information is any value in 0 to 28, the terminal device determines, from the following information based on aperiodic channel state indication information and feedback indication information that are included in the uplink scheduling information, information to be transmitted on the uplink resource indicated by the uplink scheduling information: the UL-SCH; the UL-SCH and aCSI; the UL-SCH and an HARQ-ACK; and an HARQ-ACK, the UL-SCH, and aCSI.

In this embodiment of the present invention, for ease of description, unless otherwise specified, the modulation and coding indication information is represented by using the MCS index, the aperiodic channel state indication information is represented by using an aCSI trigger, and the feedback indication information is represented by using an HARQ-ACK trigger.

Optionally, the feedback indication information is used to indicate whether the UE transmits the HARQ-ACK, and the aperiodic channel state indication information is used to indicate whether the UE transmits the aCSI.

In this embodiment of the present invention, the terminal device may determine, based on Table 6, to transmit, on the uplink resource, one of the following: the UL-SCH; the UL-SCH and the aCSI; the UL-SCH and the HARQ-ACK; and the UL-SCH, the aCSI, and the HARQ-ACK.

TABLE 6

| Uplink information | MCS index | aCSI trigger | HARQ-ACK trigger |
|---|---|---|---|
| UL-SCH | Any value in 0 to 28 | Set to "false" | Set to "false" |
| UL-SCH + aCSI | Any value in 0 to 28 | Set to "true" | Set to "false" |
| UL-SCH + HARQ-ACK | Any value in 0 to 28 | Set to "false" | Set to "true" |
| UL-SCH + aCSI + HARQ-ACK | Any value in 0 to 28 | Set to "true" | Set to "true" |

It should be noted that, neither a quantity of bits used for the aCSI trigger nor a quantity of bits used for the HARQ-ACK trigger is specifically limited in this embodiment of the present invention. That the aCSI trigger is set to "true" or "false" can be understood as described above (as shown in Table 2). Details are not described herein again. A 1-bit aCSI trigger and a 1-bit HARQ-ACK trigger are used as examples. When one bit is set to "0", it indicates that corresponding information is set to "false". When one bit is set to "1", it indicates that corresponding information is set to "true". In this case, the terminal device may determine, based on Table 7, to transmit, on the uplink resource, one of the following: the UL-SCH; the UL-SCH and the aCSI; the UL-SCH and the HARQ-ACK; and the UL-SCH, the aCSI, and the HARQ-ACK. Further, in Table 7, when a bit of the aCSI trigger is set to "1", it indicates that the UE is triggered to transmit the aperiodic CSI. When a bit of the HARQ-ACK is set to "1", it indicates that the UE is triggered to transmit the HARQ-ACK.

TABLE 7

| Uplink information | MCS index | aCSI trigger | HARQ-ACK trigger |
|---|---|---|---|
| UL-SCH | Any value in 0 to 28 | 0 | 0 |
| UL-SCH + aCSI | Any value in 0 to 28 | 1 | 0 |
| UL-SCH + HARQ-ACK | Any value in 0 to 28 | 0 | 1 |
| UL-SCH + aCSI + HARQ-ACK | Any value in 0 to 28 | 1 | 1 |

Optionally, when the terminal device determines that the index number corresponding to the modulation and coding indication information included in the uplink scheduling information is any value in 29 to 31, the terminal device determines, based on at least one of the modulation and coding indication information, aperiodic channel state indication information, and feedback indication information that are included in the uplink scheduling information, to transmit aCSI, an HARQ-ACK, or aCSI and an HARQ-ACK on the uplink resource indicated by the uplink scheduling information.

Optionally, in this embodiment of the present invention, the UE may determine, based on Table 8, to transmit, on the uplink resource, one of the following: the aCSI; the HARQ-ACK; and the HARQ-ACK and the aCSI. Optionally, the UE may determine, based on Table 9, to transmit, on the uplink resource, one of the following: the aCSI; the HARQ-ACK; and the HARQ-ACK and the aCSI. N/A indicates that corresponding information can be in any state. This is not specifically limited in this embodiment of the present invention.

It should be noted that, in this embodiment of the present invention, the UE may determine, based on Table 7 and Table 8, or based on Table 7 and Table 9, to transmit, on the uplink resource, at least one of the following: the HARQ-ACK, the aCSI, and the UL-SCH. Optionally, in Table 8 and Table 9, for ease of understanding by the UE, an aCSI trigger corresponding to "HARQ-ACK" may be set to 0, and an aCSI trigger corresponding to "aCSI+HARQ-ACK" may be set to 1.

TABLE 8

| Uplink information | MCS index | aCSI trigger | HARQ-ACK trigger |
|---|---|---|---|
| aCSI | 29 | Set to "true" | N/A |
| HARQ-ACK | 30 | N/A | N/A |
| aCSI + HARQ-ACK | 31 | N/A | N/A |

TABLE 9

| Uplink information | MCS index | aCSI trigger | HARQ-ACK trigger |
|---|---|---|---|
| aCSI | 29 | Set to "true" | N/A |
| HARQ-ACK | 31 | N/A | N/A |
| aCSI + HARQ-ACK | 30 | N/A | N/A |

With reference to a feature of asynchronous and adaptive uplink data transmission on a license-free frequency band, a redundant MCS index can be effectively used, to improve resource use efficiency.

It should be noted that, if transmission of the HARQ-ACK is carried on a resource included in a PUCCH, and transmission of HARQ-ACK+aCS, HARQ-ACK+UL-SCH, HARQ-ACK+aCSI+UL-SCH, the aCSI, aCSI+UL-SCH, or the UL-SCH is carried on a resource included in a PUSCH, in this implementation, it may also be understood that the modulation and coding indication information may be used to distinguish whether the current uplink scheduling information is corresponding to the PUCCH or the PUSCH. Herein, that the uplink scheduling information is corresponding to the PUCCH may indicate that the uplink scheduling information instructs the UE to transmit information on the PUCCH, and that the uplink scheduling information is corresponding to the PUSCH may indicate that the uplink scheduling information instructs the UE to transmit information on the PUSCH.

Optionally, when the terminal device determines that the index number corresponding to the modulation and coding indication information is 29 and the aperiodic channel state indication information is set to "true", the terminal device determines to transmit the aperiodic channel state information on the uplink resource. When the terminal device determines that the index number corresponding to the modulation and coding indication information is 29 and the aperiodic channel state indication information is set to "false", the terminal device determines to transmit the feedback information, or the aperiodic channel state information and the feedback information on the uplink resource.

Optionally, in this embodiment of the present invention, the UE may determine, based on Table 10, to transmit, on the uplink resource, one of the following: the aCSI; the HARQ-ACK; and the HARQ-ACK and the aCSI. Optionally, the UE may determine, based on Table 11, to transmit, on the uplink resource, one of the following: the aCSI; the HARQ-ACK; and the HARQ-ACK and the aCSI. N/A indicates that corresponding information can be in any state. For example, in Table 10, N/A indicates that a bit of the aCSI trigger can be set to "true" or "false". This is not specifically limited in this embodiment of the present invention.

It should be noted that, in this embodiment of the present invention, the UE may determine, based on Table 7 and Table 10, or based on Table 7 and Table 11, to transmit, on the uplink resource, at least one of the following: the HARQ-ACK, the aCSI, and the UL-SCH.

It should be noted that, in this embodiment of the present invention, that the aCSI trigger is set to "true" may indicate that the UE is instructed to transmit the aCSI, and that the aCSI trigger is set to "false" may indicate that the UE is instructed not to transmit the aCSI. However, the present invention is not limited thereto. For example, that the aCSI trigger is set to "true" does not indicate that the UE is instructed to transmit the aCSI, and that the aCSI trigger is set to "false" does not indicate that the UE is instructed not to transmit the aCSI. A similar description is given for the HARQ-ACK trigger.

TABLE 10

| Uplink information | MCS index | aCSI trigger | HARQ-ACK trigger |
|---|---|---|---|
| aCSI | 29 | Set to "true" | N/A |
| HARQ-ACK | 29 | Set to "false" | N/A |
| aCSI + HARQ-ACK | 30 or 31 | N/A | N/A |

TABLE 11

| Uplink information | MCS index | aCSI trigger | HARQ-ACK trigger |
|---|---|---|---|
| aCSI | 29 | Set to "true" | N/A |
| HARQ-ACK | 30 or 31 | N/A | N/A |
| aCSI + HARQ-ACK | 29 | Set to "false" | N/A |

Optionally, the terminal device determines, based on the aperiodic channel state indication information and the feedback indication information, to transmit, on the uplink resource, one of the following: the aCSI; the HARQ-ACK; and the HARQ-ACK and the aCSI.

Optionally, the feedback indication information is used to indicate whether the UE transmits the HARQ-ACK, and the aperiodic channel state indication information is used to indicate whether the UE transmits the aCSI.

Optionally, in this embodiment of the present invention, the UE may determine, based on Table 12, to transmit, on the uplink resource, one of the following: the aCSI; the HARQ-ACK; and the HARQ-ACK and the aCSI. In Table 12, N/A indicates that the MCS index can be a value other than 0 to 28, for example, any value in 29 to 31. This is not specifically limited in this embodiment of the present invention. In addition, when the UE determines to transmit the aCSI, the HARQ-ACK and the aCSI, or the HARQ-ACK on the uplink resource, corresponding MCS indexes may be the same or may be different.

It should be noted that, in this embodiment of the present invention, the UE may determine, based on Table 7 and Table 12, to transmit, on the uplink resource, at least one of the following: the HARQ-ACK, the aCSI, and the UL-SCH.

TABLE 12

| Uplink information | MCS index | aCSI trigger | HARQ-ACK trigger |
|---|---|---|---|
| aCSI | N/A | Set to "true" | Set to "false" |
| HARQ-ACK | N/A | Set to "false" | Set to "true" |
| aCSI + HARQ-ACK | N/A | Set to "true" | Set to "true" |

In Table 12, that the aCSI trigger is set to "true"/"false" may indicate that the UE is triggered/not triggered to transmit the aCSI, and that the HARQ-ACK trigger is set to "true"/"false" may indicate that the UE is triggered/not triggered to transmit the HARQ-ACK.

Further, in this embodiment of the present invention, MCS indexes 29 to 31 may indicate different modulation orders. For example, MCS index=29 may indicate 16QAM, and MCS index=30 may indicate 64QAM. This has the following advantage: Uplink control information (the aCSI and/or the HARQ-ACK) transmission efficiency can be improved.

Optionally, the terminal device determines, based on the modulation and coding indication information, the aperiodic channel state indication information, and the feedback indication information, to transmit, on the uplink resource, one of the following: the aCSI; the HARQ-ACK; and the HARQ-ACK and the aCSI.

Optionally, the feedback indication information is used to indicate whether the UE transmits the HARQ-ACK, the aperiodic channel state indication information is used to indicate whether the UE transmits the aCSI, and the modulation and coding indication information is used to indicate whether the UE transmits the UL-SCH. For example, it is determined, based on an index range corresponding to the modulation and coding indication information, whether to transmit the UL-SCH on the uplink resource.

Optionally, in this embodiment of the present invention, the UE may determine, based on Table 13, to transmit, on the uplink resource, one of the following: the aCSI; the HARQ-ACK; and the HARQ-ACK and the aCSI. It should be noted that, in this embodiment of the present invention, the UE may determine, based on Table 7 and Table 13, to transmit, on the uplink resource, at least one of the following: the HARQ-ACK, the aCSI, and the UL-SCH. To be specific, the UE may determine, based on Table 14, to transmit, on the uplink resource, at least one of the following: the HARQ-ACK, the aCSI, and the UL-SCH. It should be noted that, in this implementation, when the HARQ-ACK trigger is set to "true", it may indicate that the UE is triggered to transmit the HARQ-ACK on the uplink resource; or if the HARQ-ACK trigger is set to "false", it may indicate that the UE is not triggered to transmit the HARQ-ACK on the uplink resource.

TABLE 13

| Uplink information | MCS index | aCSI trigger | HARQ-ACK trigger |
|---|---|---|---|
| aCSI | 29 | Set to "true" | Set to "false" |
| HARQ-ACK | 29 or 30 or 31 | Set to "false" | Set to "true" |
| aCSI + HARQ-ACK | 29 or 30 or 31 | Set to "true" | Set to "true" |

TABLE 14

| Uplink information | MCS index | aCSI trigger | HARQ-ACK trigger |
|---|---|---|---|
| UL-SCH | Any value in 0 to 28 | Set to "false" | Set to "false" |
| UL-SCH + aCSI | Any value in 0 to 28 | Set to "true" | Set to "false" |
| UL-SCH + HARQ-ACK | Any value in 0 to 28 | Set to "false" | Set to "true" |
| UL-SCH + aCSI + HARQ-ACK | Any value in 0 to 28 | Set to "true" | Set to "true" |
| aCSI | 29 | Set to "true" | Set to "false" |
| HARQ-ACK | 29 or 30 or 31 | Set to "false" | Set to "true" |
| aCSI + HARQ-ACK | 29 or 30 or 31 | Set to "true" | Set to "true" |

At least one of the HARQ-ACK, the aCSI, and the UL-SCH is transmitted on the uplink resource, so that an MCS corresponding to the UL-SCH can flexibly change and a redundant MCS state is effectively used. The HARQ-ACK indication information (for example, 1 bit) is added, so that the terminal device can determine, based on the detected HARQ-ACK indication information, whether to transmit the HARQ-ACK on the uplink resource. In addition, design complexity of the UE can be reduced by using the redundant MCS index (for example, the MCS index is 29, 30, or 31) and with reference to the aCSI trigger and the HARQ-ACK trigger.

It is assumed that the aperiodic state indication information (the aCSI trigger) is represented by using one bit, the feedback indication information (the HARQ-ACK trigger) is represented by using one bit, that the bit is set to "1" indicates that the UE is triggered to transmit the aCSI/HARQ-ACK, and that the bit is set to "0" indicates that the UE is triggered not to transmit the aCSI/HARQ-ACK. In this case, the UE may determine, based on Table 15, to transmit, on the uplink resource indicated by the uplink scheduling information, at least one of the following: the UL-SCH, the aCSI, and the HARQ-ACK.

TABLE 15

| Uplink information | MCS index | aCSI trigger | HARQ-ACK trigger |
|---|---|---|---|
| UL-SCH | Any value in 0 to 28 | 0 | 0 |
| UL-SCH + aCSI | Any value in 0 to 28 | 1 | 0 |
| UL-SCH + HARQ-ACK | Any value in 0 to 28 | 0 | 1 |
| UL-SCH + aCSI + HARQ-ACK | Any value in 0 to 28 | 1 | 1 |
| aCSI | 29 | 1 | 0 |
| HARQ-ACK | 29 or 30 or 31 | 0 | 1 |
| aCSI + HARQ-ACK | 29 or 30 or 31 | 1 | 1 |

Based on Table 13 to Table 15, it may be learned that when the UE determines to transmit the aCSI but transmit none of the following on the uplink resource: the UL-SCH, UL-SCH+aCSI, UL-SCH+HARQ-ACK, UL-SCH+aCSI+HARQ-ACK, the HARQ-ACK, and aCSI+HARQ-ACK, the MCS index may be 30 or 31. In addition, in the foregoing table, "aCSI", "HARQ-ACK", and "aCSI+HARQ-ACK" may be corresponding to a same MCS index or different MCS indexes. For example, in Table 14 and Table 15, "aCSI", "HARQ-ACK", and "aCSI+HARQ-ACK" all may be corresponding to an MCS index 29.

In this embodiment of the present invention, as described above, if the terminal device transmits neither the aCSI nor the UL-SCH on the uplink resource, the uplink resource is a resource included in a PUCCH. If the terminal device transmits the aCSI and/or the UL-SCH on the uplink resource, the uplink resource is a resource included in a PUSCH.

Optionally, if the terminal device does not transmit the UL-SCH on the uplink resource, the uplink resource is a resource included in a PUCCH. If the terminal device transmits the UL-SCH on the uplink resource, the uplink resource is a resource included in a PUSCH.

Optionally, a format of the uplink scheduling information corresponding to the PUCCH is the same as a format of the uplink information corresponding to the PUSCH.

S403. If determining to transmit the uplink data on the uplink resource, the terminal device transmits the uplink data on the uplink resource.

By performing the method described in FIG. 4, the terminal device can determine, by using only the modulation and coding indication information, whether the terminal device needs to feed back the uplink data, without causing extra signaling overheads, so that signaling overheads are reduced. In addition, the terminal device can determine, without reference to the aperiodic channel state indication information, whether to transmit the uplink data, so that complexity of detection by the terminal device is reduced.

It should be noted that, in this embodiment of the present invention, in the manner of the foregoing embodiment, a type of the uplink information to be transmitted on the uplink resource may be indicated to the UE. In addition, if different uplink information can be carried on uplink resources included in different uplink channels, for example, the resource included in the PUCCH, or the resource included in the PUSCH, it may be understood that in the manner of the foregoing embodiment, the UE may determine, based on the uplink scheduling information, an uplink channel corresponding to the uplink scheduling information. The uplink channel herein includes the PUCCH and the PUSCH. The uplink channel corresponding to the uplink scheduling information may be understood as an uplink channel that carries transmission of the uplink information indicated by the uplink scheduling information.

Figure 5:
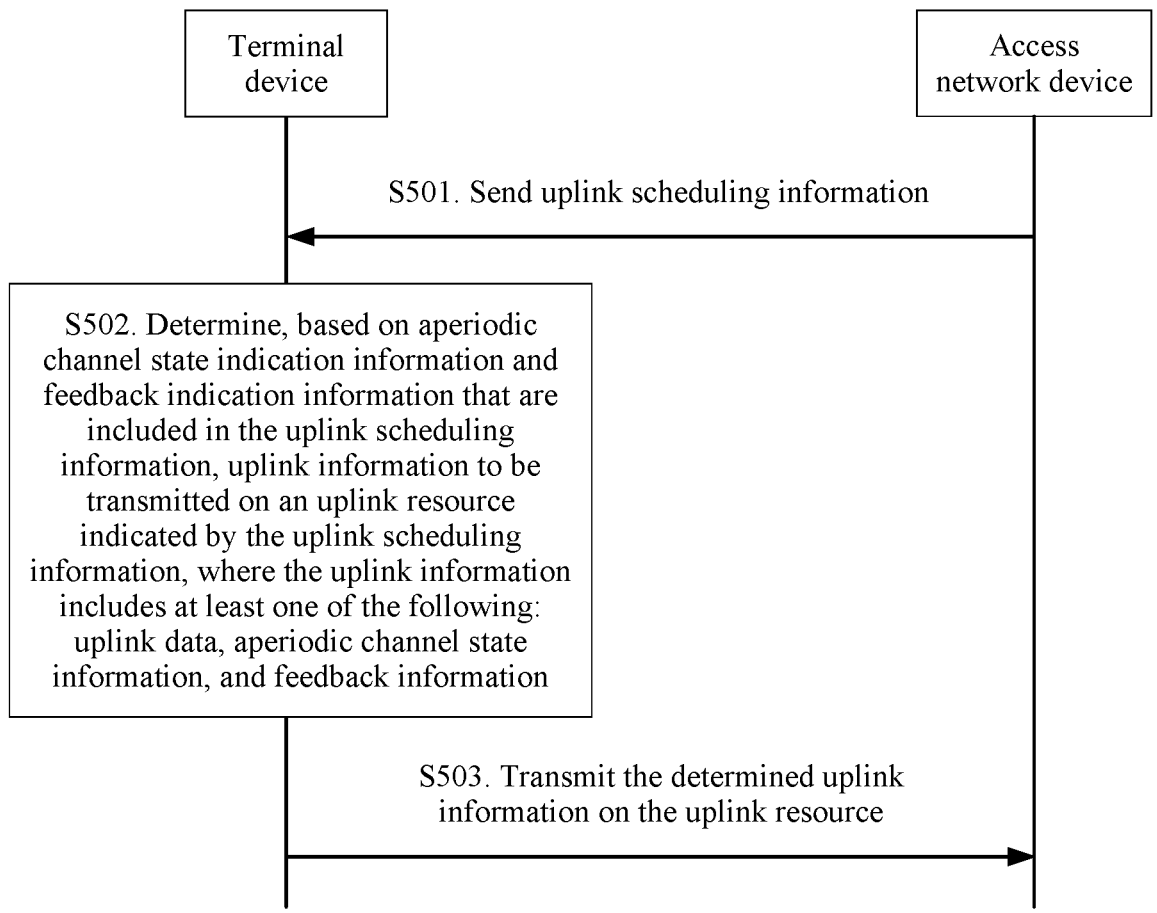
FIG. 5 is a schematic flowchart of another uplink information transmission method according to an embodiment of the present invention.

Referring to FIG. 5, FIG. 5 is a schematic flowchart of another uplink information transmission method according to an embodiment of the present invention. The method includes but is not limited to the following steps.

S501. A terminal device receives uplink scheduling information sent by an access network device.

For step S501 in this embodiment of the present invention, refer to step S301 in the embodiment shown in FIG. 3. Details are not described herein again.

S502. The terminal device determines, based on aperiodic channel state indication information and feedback indication information that are included in the uplink scheduling information, uplink information to be transmitted on an uplink resource indicated by the uplink scheduling information, where the uplink information includes at least one of the following: uplink data, aperiodic channel state information, and feedback information.

Optionally, in this embodiment of the present invention, the aperiodic channel state indication information and the feedback indication information may be jointly used for indication or may be separately used for indication. This is not specifically limited in this embodiment of the present invention. In this embodiment of the present invention, when the aperiodic channel state indication information and the feedback indication information are separately used for indication, it may be understood that the "aperiodic channel state indication information" is used to indicate whether the UE transmits the aCSI on the uplink resource, and the "feedback indication information" is used to indicate whether the UE transmits the HARQ-ACK on the uplink resource. Further, when the "aperiodic channel state indication information" instructs the UE not to transmit the aCSI on the uplink resource, and the "feedback indication information" instructs the UE not to transmit the HARQ-ACK on the uplink resource, the UE may determine to transmit only the UL-SCH on the uplink resource. In addition, in this embodiment of the present invention, when the aperiodic channel state indication information and the feedback indication information are jointly used for indication, it may be understood that a bit corresponding to the aperiodic channel state indication information and a bit corresponding to the feedback indication information jointly instruct the UE to transmit, on the uplink resource, at least one of the following: the uplink data, the aperiodic channel state information, and the feedback information, or it may be understood that the "aperiodic channel state indication information and feedback indication information" may be represented by using one piece of indication information, and it may be determined, based on the indication information, to transmit, on the uplink resource, at least one of the following: the uplink data, the aperiodic channel state information, and the feedback information. It should be noted that, in this embodiment of the present invention, if the UE determines to transmit the aCSI or the HARQ-ACK on the uplink resource, whether the CSI or the HARQ-ACK that is to be transmitted by the UE is corresponding to a single serving cell (or CSI process) or a plurality of serving cells (or CSI processes) is not limited.

Specifically, indication methods in the aperiodic channel state information and the feedback indication information are described in a table form.

Optionally, in this embodiment of the present invention, the aperiodic channel state indication information and the feedback indication information are represented by using explicit bit signaling.

In this embodiment of the present invention, optionally, the UE may determine, based on Table 16, to transmit, on the uplink resource, at least one of the following: the uplink data, the aperiodic channel state information, and the feedback information. When the aCSI trigger is set to "true", the aCSI trigger may be used to instruct the UE to transmit the aCSI on the uplink resource. On the contrary, when the aCSI trigger is set to "false", the aCSI trigger may be used to indicate that the UE is not triggered to transmit the aCSI on the uplink resource. When the feedback indication information is set to "true", the feedback indication information may be used to instruct the UE to transmit the HARQ-ACK on the uplink resource. On the contrary, when the feedback indication information is set to "false", the feedback indication information may be used to indicate that the UE is not triggered to transmit the HARQ-ACK on the uplink resource. The UE receives the uplink scheduling information. If determining, based on the uplink scheduling information, to transmit neither the aCSI nor the HARQ-ACK on the uplink resource, the UE may determine, based on the uplink scheduling information, to transmit the UL-SCH on the uplink resource. It may be considered that content included in Table 16 is implemented by separately using the aperiodic state information indication and the feedback indication information for indication.

Optionally, in this embodiment of the present invention, when the UE transmits the HARQ-ACK on the uplink resource, the uplink resource is a resource included in a PUCCH (or the UE transmits the HARQ-ACK on a PUCCH); and/or when the UE transmits, on the uplink resource, one of the following: the HARQ-ACK and the aCSI; the aCSI; the HARQ-ACK and the UL-SCH; the aCSI and the UL-SCH; the UL-SCH; and the HARQ-ACK, the UL-SCH, and the aCSI, the uplink resource is a resource included in a PUSCH (or the UE transmits the HARQ-ACK on a PUSCH).

TABLE 16

| Uplink information | Aperiodic channel state indication information | Feedback indication information |
|---|---|---|
| HARQ-ACK | Set to "false" | Set to "true" |
| HARQ-ACK + aCSI | Set to "true" | Set to "true" |
| UL-SCH | Set to "false" | Set to "false" |
| UL-SCH and aCSI | Set to "true" | Set to "false" |
| UL-SCH and ACK | Set to "false" | Set to "true" |
| UL-SCH, ACK, and aCSI | Set to "true" | Set to "true" |
| aCSI | Set to "true" | Set to "false" |

Further, it is assumed that the aperiodic channel state indication information is represented by using one bit, "0" is used to indicate that the aperiodic channel state indication information is set to "false", and "1" is used to indicate that the aperiodic channel state indication information is set to "true"; and the feedback indication information is represented by using two bits, "00" and "11" are used to indicate that the feedback indication information is set to "false", and "01" and "10" are used to indicate that the feedback indication information is set to "true". In this case, the UE may further determine, based on Table 17, a type of the uplink information to be transmitted on the uplink resource. It may be considered that content included in Table 17 is implemented by separately using the aperiodic state information indication and the feedback indication information for indication.

TABLE 17

| Uplink information | Aperiodic channel state indication information | Feedback indication information |
| --- | --- | --- |
| HARQ-ACK | 0 | 01 |
| HARQ-ACK + aCSI | 1 | 01 |
| UL-SCH | 0 | 00 |
| UL-SCH and aCSI | 1 | 00 |
| UL-SCH and ACK | 0 | 10 |
| UL-SCH, ACK, and aCSI | 1 | 10 |
| aCSI | 1 | 11 |

Optionally, assuming that the aperiodic channel state indication information is represented by using one bit, and the feedback indication information is represented by using two bits, the UE may determine, based on Table 18, a type of the uplink information to be transmitted on the uplink resource. It may be considered that content included in Table 18 is implemented by jointly using the aperiodic state information indication and the feedback indication information for indication.

TABLE 18

| Uplink information | Aperiodic channel state indication information and feedback indication information (one piece of indication information) |
| --- | --- |
| HARQ-ACK | 000 |
| HARQ-ACK + aCSI | 100 |
| UL-SCH | 001 |
| UL-SCH and aCSI | 101 |
| UL-SCH and ACK | 010 |
| UL-SCH, ACK, and aCSI | 110 |
| aCSI | 111 |

It should be noted that, in this embodiment of the present invention, a quantity of bits of the aperiodic channel state indication information is not limited to 1, and the quantity of bits of the aperiodic channel state indication information may be greater than 1, for example, may be 3. Likewise, in this embodiment of the present invention, a quantity of bits of the feedback indication information is not limited to 1, and may be greater than 1, for example, may be 3.

S503. The terminal device transmits the determined uplink information on the uplink resource indicated by the uplink scheduling information.

In this embodiment of the present invention, as described above, if the terminal device transmits neither the aCSI nor the UL-SCH on the uplink resource, the uplink resource is a resource included in a PUCCH. If the terminal device transmits the aCSI and/or the UL-SCH on the uplink resource, the uplink resource is a resource included in a PUSCH.

Optionally, if the terminal device does not transmit the UL-SCH on the uplink resource, the uplink resource is a resource included in a PUCCH. If the terminal device transmits the UL-SCH on the uplink resource, the uplink resource is a resource included in a PUSCH.

Optionally, a format of the uplink scheduling information corresponding to the PUCCH is the same as a format of the uplink information corresponding to the PUSCH.

It should be noted that, in this embodiment of the present invention, in the manner of the foregoing embodiment, a type of the uplink information to be transmitted on the uplink resource may be indicated to the UE. In addition, if different uplink information can be carried on uplink resources included in different uplink channels, for example, the resource included in the PUCCH, or the resource included in the PUSCH, it may be understood that in the manner of the foregoing embodiment, the UE may be instructed to determine, based on the uplink scheduling information, an uplink channel corresponding to the uplink scheduling information. The uplink channel herein includes the PUCCH and the PUSCH. The uplink channel corresponding to the uplink scheduling information may be understood as an uplink channel that carries transmission of the uplink information indicated by the uplink scheduling information.

It should be noted that, neither the quantity of bits of the aCSI trigger nor the quantity of bits of the HARQ-ACK trigger is specifically limited in this embodiment of the present invention.

It should be noted that, in this embodiment of the present invention, the feedback indication information is merely an example provided in this embodiment of the present invention. During actual application, the name is not specifically limited. For example, the feedback indication information described in this embodiment of the present invention may also be referred to as feedback information indication information.

By performing the method described in FIG. 5, the UE can determine, based on explicit signaling included in the uplink scheduling information, to transmit the aperiodic CSI but transmit none of the following: the HARQ-ACK; the HARQ-ACK and the aCSI; the HARQ-ACK and the UL-SCH; the HARQ-ACK, the aCSI, and the UL-SCH; the aCSI and the UL-SCH; and the UL-SCH, without performing determining based on a special MCS configuration and explicit signaling like the prior art (for example, in the prior art, the UE determines, based on an aCSI trigger indication and MCS index=29, whether to transmit the aCSI), so that an MCS can be normally used. A reserved MCS may be used to represent a modulation and coding order, to improve downlink data transmission efficiency.

To facilitate better implementation of the foregoing uplink information transmission method in the embodiments of the present invention, the present invention further provides a terminal device for performing the foregoing method.

Figure 6:
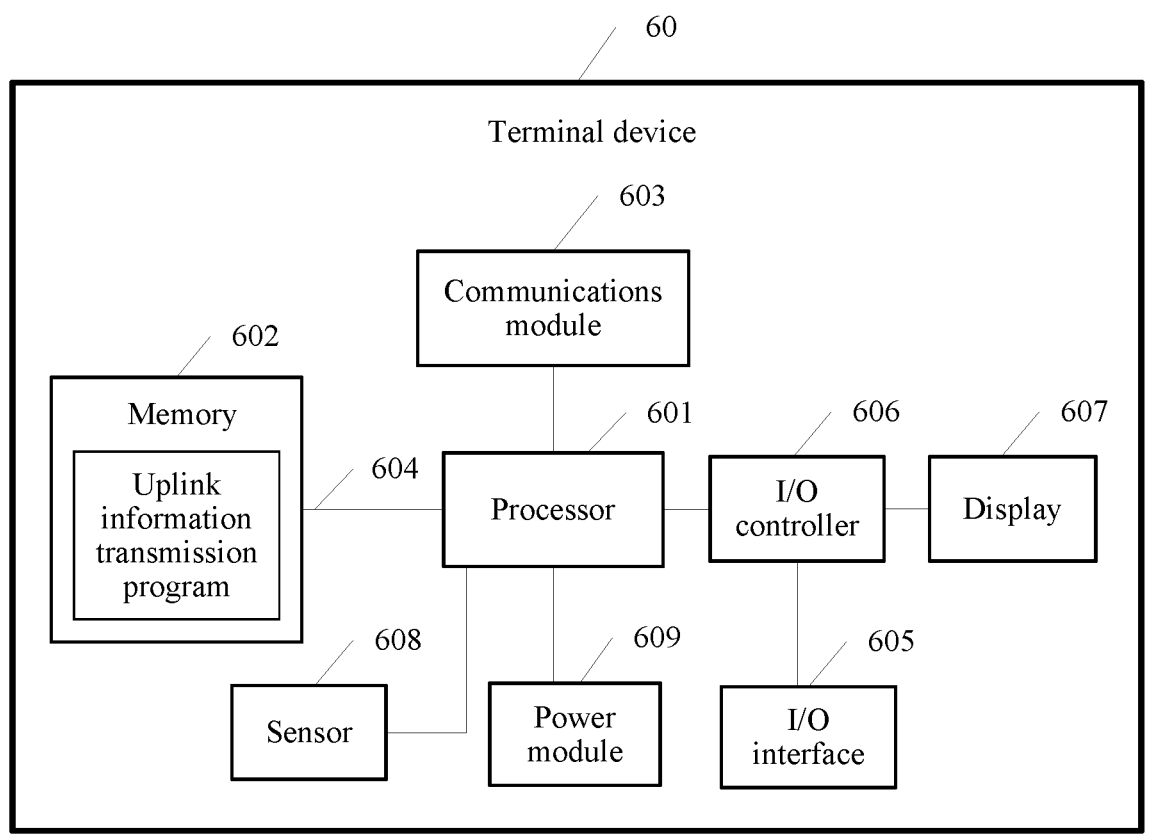
FIG. 6 is a schematic structural diagram of a terminal device according to an embodiment of the present invention.

Referring to FIG. 6, FIG. 6 is a schematic structural diagram of a terminal device according to an embodiment of the present invention. As shown in FIG. 6, the terminal device 60 includes a processor 601, a memory 602, a communications module 603, and a bus 604. The processor 601, the memory 602, and the communications module 603 may be connected to each other by using the bus or in another manner. For example, in FIG. 6, the connection is implemented by using the bus 604.

Optionally, the terminal device 60 may further include an input/output (I/O) interface 605, an I/O controller 606, a display 607, a sensor 608, and a power module 609.

The processor 601 may be a general purpose processor, for example, a central processing unit (CPU), and is configured to run operating system software, required application software, and the like of the terminal device 60. The processor 601 may process data received by using the communications module 603. The processor 601 may further process data to be sent to the communications module 603 for wireless transmission.

The memory 602 is configured to: store uplink information transmission program code, and complete storage of various software programs of the terminal device, data storage, software running, and the like. The memory 602 may include a volatile memory, for example, a random access memory (RAM). Alternatively, the memory 602 may include a nonvolatile memory, for example, a read-only memory (ROM), a hard disk drive (HDD), or a solid-state drive (SSD). Alternatively, the memory 602 may include a combination of the foregoing types of memories.

The communications module 603 provides a communication function for the terminal device 60, is configured to perform transmission processing on (for example, amplify, modulate, or encode) a mobile communication signal generated by the processor 601, and is further configured to perform receiving processing on (for example, demodulate or decode) a mobile communication signal received by an antenna. The communications module 603 is applicable to a cellular network, for example, a GSM, UMTS, LTE, or CDMA network, and is also applicable to one or more of a WLAN, a near field communication (NFC) network, a Bluetooth network, and the like.

The bus 604 may be an industry standard architecture (ISA) bus, a peripheral component interconnect (PCI) bus, an extended industry standard architecture (EISA) bus, an inter integrated circuit (IIC) bus, or the like.

The I/O interface 605 is an external interface of the terminal device 60, and includes one or more of a universal serial bus (USB) interface, a secure digital (SD) card interface, a push-button interface, and the like.

The I/O controller 606 is configured to control data exchange between various input/output devices of the terminal device 60, especially, data exchange between the processor 601, the I/O interface 605, and the display 607.

The display 607 is a display screen and a touchscreen of the terminal device 60. The display 607 is configured to display a software running status, a power status, time, a user configuration interface, and a configuration result of the terminal device 60. The touchscreen is configured to: receive a user touch operation and convert the user touch operation into a user operation instruction.

The sensor 608 includes various sensor devices, including one or more of a global positioning system (GPS) module, a gravity sensor, an acceleration sensor, a distance sensor, a camera, an optical sensor, and the like.

The power module 609 supplies power to the modules of the terminal device 60.

In this embodiment of the present invention, the processor 601 is mainly configured to: invoke the program stored in the memory 602 and perform the following operations: receiving, by the processor 601 by using the communications module 603, uplink scheduling information sent by an access network device; determining, by the processor 601 based on aperiodic channel state indication information and modulation and coding indication information that are included in the uplink scheduling information, whether to transmit feedback information on an uplink resource indicated by the uplink scheduling information; and if determining to transmit the feedback information on the uplink resource, transmitting, by the processor 601, the feedback information on the uplink resource by using the communications module 603.

Optionally, the processor 601 is further configured to: when the processor 601 transmits the feedback information on the uplink resource by using the communications module 603, further transmit, by the processor, at least one of uplink data and aperiodic channel state information on the uplink resource by using the communications module.

Optionally, the determining, by the processor 601 based on aperiodic channel state indication information and modulation and coding indication information that are included in the uplink scheduling information, whether to transmit feedback information on an uplink resource indicated by the uplink scheduling information includes: when the aperiodic channel state indication information included in the uplink scheduling information instructs the terminal device to feed back the aperiodic channel state information and a modulation and coding scheme index number corresponding to the modulation and coding indication information included in the uplink scheduling information is set to 30 or 31, determining, by the processor 601, to transmit the feedback information on the uplink resource indicated by the uplink scheduling information; and/or when the aperiodic channel state indication information included in the uplink scheduling information instructs the terminal device not to feed back the aperiodic channel state information and a modulation and coding scheme index number corresponding to the modulation and coding indication information included in the uplink scheduling information is set to any value in 29 to 31, determining, by the processor 601, to transmit the feedback information on the uplink resource indicated by the uplink scheduling information.

It should be noted that, functions of the function modules of the terminal device 60 described in this embodiment of the present invention may be implemented based on the related descriptions of the corresponding terminal device in the embodiment shown in FIG. 3. Details are not described herein again.

Figure 7:
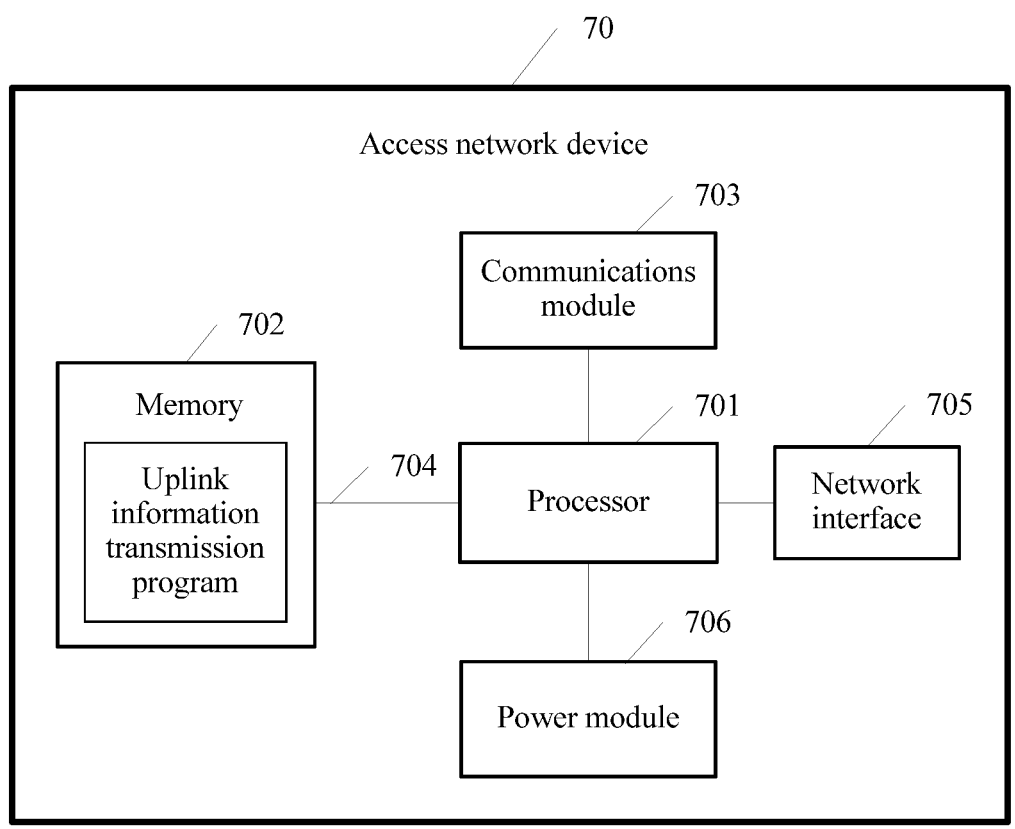
FIG. 7 is a schematic structural diagram of an access network device according to an embodiment of the present invention.

Referring to FIG. 7, FIG. 7 is a schematic structural diagram of an access network device according to an embodiment of the present invention. As shown in FIG. 7, the access network device 70 includes a processor 701, a memory 702, a communications module 703, and a bus 704. The processor 701, the memory 702, and the communications module 703 may be connected to each other by using the bus or in another manner. For example, in FIG. 7, the connection is implemented by using the bus 704.

Optionally, the access network device 70 may further include a network interface 705 and a power module 706.

The processor 701 may be a digital signal processing (DSP) chip. The processor 701 is configured to: manage a radio channel, control cross-zone handover of the access network device in a local control zone, and so on. During specific implementation, the processor 701 may include an AM/CM module (a center for speech channel exchange and information exchange), a BM module (configured to perform functions such as call processing, signaling processing, radio resource management, radio link management, and circuit maintenance), a TCSM module (configured to perform functions of multiplexing/demultiplexing and code conversion), and other modules. For detailed information, refer to knowledge about mobile communications.

The memory 702 is configured to store feedback information transmission program code. During specific implementation, the memory 702 may be a ROM or a RAM, and can be configured to store program code.

The communications module 703 is configured to perform transmission processing on (for example, modulate) a mobile communication signal generated by the processor 701, and is further configured to perform receiving processing on (for example, demodulate) a mobile communication signal received by an antenna.

The bus 704 may be an ISA bus, a PCI bus, an EISA bus, an IIC bus, or the like.

The network interface 705 is used by the access network device 70 to perform data communication with a terminal (a mobile station MS in 2G, or UE in 3G and 4G). During specific implementation, the network interface 705 may include one or several of a GSM (2G) wireless network interface, a WCDMA (3G) wireless network interface, an LTE (4G) wireless network interface, and the like, or may be a wireless network interface in future 4.5G or 5G.

The power module 706 is configured to supply power to the modules of the access network device 70.

In this embodiment of the present invention, the processor 701 is further configured to invoke the program code in the memory 702 and perform the following operations: sending, by the processor 701, uplink scheduling information to a terminal device by using the communications module 703, where the uplink scheduling information includes aperiodic channel state indication information and modulation and coding indication information, and the aperiodic channel state indication information and the modulation and coding indication information are used to instruct the terminal device to determine whether to transmit feedback information on an uplink resource indicated by the uplink scheduling information; and if the aperiodic channel state indication information and the modulation and coding indication information instruct the terminal device to transmit the feedback information on the uplink resource indicated by the uplink scheduling information, receiving, by the processor 701 by using the communications module 703, the feedback information transmitted by the terminal device on the uplink resource.

It should be noted that, the access network device 70 is applicable to a 2G communications system (for example, a GSM), a 3G communications system (for example, UMTS), and a 4G communications system (for example, LTE), and is also applicable to a future 4.5G or 5G communications system.

Optionally, when the aperiodic channel state indication information included in the uplink scheduling information instructs the terminal device to feed back aperiodic channel state information and a modulation and coding scheme index number corresponding to the modulation and coding indication information included in the uplink scheduling information is set to 30 or 31, the aperiodic channel state indication information and the modulation and coding indication information are used to instruct the terminal device to transmit the feedback information on the uplink resource indicated by the uplink scheduling information; and/or when the aperiodic channel state indication information included in the uplink scheduling information instructs the terminal device not to feed back aperiodic channel state information and a modulation and coding scheme index number corresponding to the modulation and coding indication information included in the uplink scheduling information is set to any value in 29 to 31, the aperiodic channel state indication information and the modulation and coding indication information are used to instruct the terminal device to transmit the feedback information on the uplink resource indicated by the uplink scheduling information.

It should be noted that, functions of the function modules of the access network device 70 described in this embodiment of the present invention may be implemented based on the related descriptions of the corresponding access network device in the embodiment shown in FIG. 3. Details are not described herein again.

Figure 8:
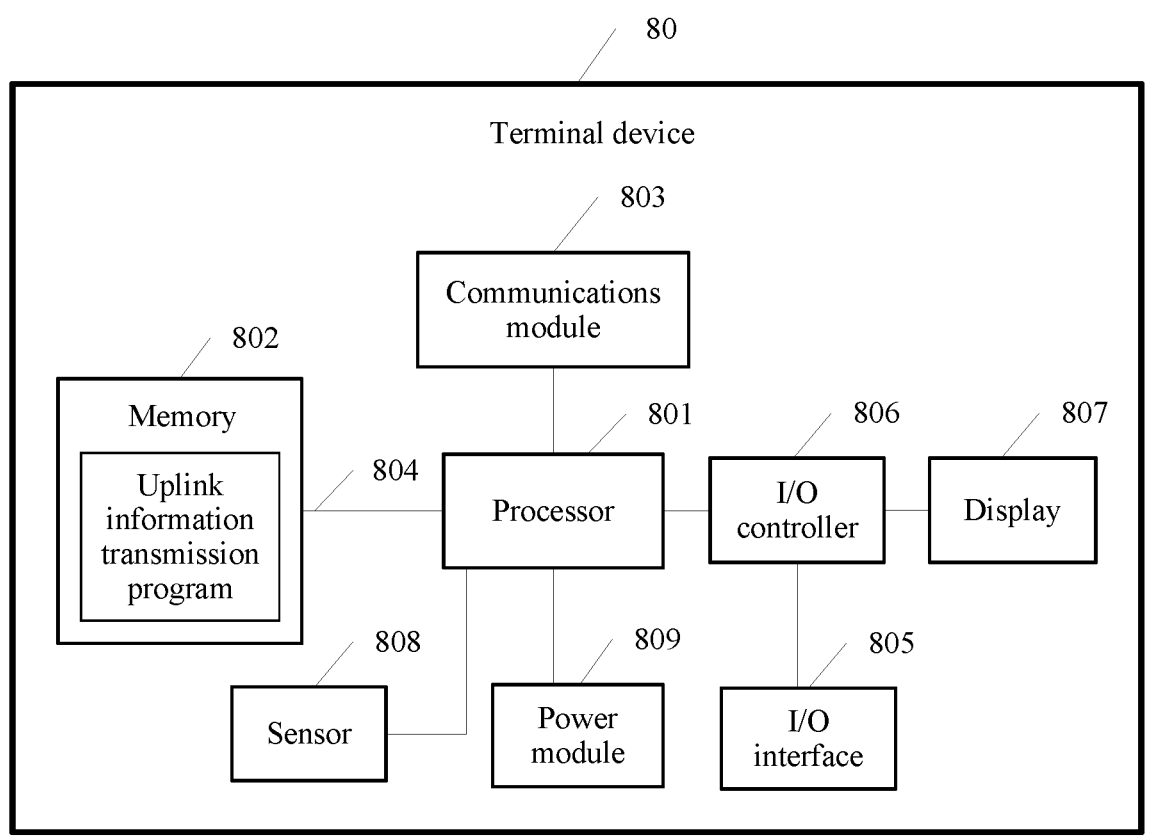
FIG. 8 is a schematic structural diagram of another terminal device according to an embodiment of the present invention.

Referring to FIG. 8, FIG. 8 is a schematic structural diagram of a terminal device according to an embodiment of the present invention. As shown in FIG. 8, the terminal device 80 includes a processor 801, a memory 802, a communications module 803, and a bus 804. The processor 801, the memory 802, and the communications module 803 may be connected to each other by using the bus or in another manner. For example, in FIG. 8, the connection is implemented by using the bus 804.

Optionally, the terminal device 80 may further include an I/O interface 805, an I/O controller 806, a display 807, a sensor 808, and a power module 809.

The processor 801 may be a general purpose processor, for example, a CPU, and is configured to run operating system software, required application software, and the like of the terminal device 80. The processor 801 may process data received by using the communications module 803. The processor 801 may further process data to be sent to the communications module 803 for wireless transmission.

The memory 802 is configured to: store uplink information transmission program code, and complete storage of various software programs of the terminal device, data storage, software running, and the like. The memory 802 may include a volatile memory, for example, a RAM. Alternatively, the memory 802 may include a nonvolatile memory, for example, a ROM, a hard disk drive, or a solid-state drive. Alternatively, the memory 802 may include a combination of the foregoing types of memories.

The communications module 803 provides a communication function for the terminal device 80, is configured to perform transmission processing on (for example, amplify, modulate, or encode) a mobile communication signal generated by the processor 801, and is further configured to perform receiving processing on (for example, demodulate or decode) a mobile communication signal received by an antenna. The communications module 803 is applicable to a cellular network, for example, a GSM, UMTS, LTE, or CDMA network, and is also applicable to one or more of a WLAN, an NFC network, a Bluetooth network, and the like.

The bus 804 may be an ISA bus, a PCI bus, an EISA bus, an IIC bus, or the like.

The I/O interface 805 is an external interface of the terminal device 80, and includes one or more of a USB interface, an SD card interface, a push-button interface, and the like.

The I/O controller 806 is configured to control data exchange between various input/output devices of the terminal device 80, especially, data exchange between the processor 801, the I/O interface 805, and the display 807.

The display 807 is a display screen and a touchscreen of the terminal device 80. The display 807 is configured to display a software running status, a power status, time, a user configuration interface, and a configuration result of the terminal device 80. The touchscreen is configured to: receive a user touch operation and convert the user touch operation into a user operation instruction.

The sensor 808 is various sensor devices, including one or more of a GPS module, a gravity sensor, an acceleration sensor, a distance sensor, a camera, an optical sensor, and the like.

The power module 809 supplies power to the modules of the terminal device 80.

In this embodiment of the present invention, the processor 801 is mainly configured to: invoke the program stored in the memory 802 and perform the following operations: receiving, by the processor 801 by using the communications module 803, uplink scheduling information sent by an access network device; determining, by the processor 801 based on modulation and coding indication information included in the uplink scheduling information, whether to transmit uplink data on an uplink resource indicated by the uplink scheduling information; and if determining to transmit the uplink data on the uplink resource, transmitting, by the processor 801, the uplink data on the uplink resource by using the communications module 803.

Optionally, the determining, by the processor 801 based on modulation and coding indication information included in the uplink scheduling information, whether to transmit uplink data on an uplink resource indicated by the uplink scheduling information includes: when the processor 801 determines that an index number corresponding to the modulation and coding indication information included in the uplink scheduling information is any value in 0 to 28, determining, by the processor 801, to transmit the uplink data on the uplink resource indicated by the uplink scheduling information; and/or when the processor 801 determines that an index number corresponding to the modulation and coding indication information included in the uplink scheduling information is any value in 29 to 31, determining, by the processor 801, not to transmit the uplink data on the uplink resource indicated by the uplink scheduling information.

Optionally, the determining, by the processor 801, to transmit the uplink data on the uplink resource indicated by the uplink scheduling information includes: determining, by the processor 801 based on aperiodic channel state indication information and feedback indication information that are included in the uplink scheduling information, to transmit the uplink data, the uplink data and aperiodic channel state information, the uplink data and feedback information, or the uplink data, aperiodic channel state information, and feedback information on the uplink resource indicated by the uplink scheduling information.

Optionally, the determining, by the processor 801, not to transmit the uplink data on the uplink resource indicated by the uplink scheduling information includes: determining, by the processor 801 based on at least one of the modulation and coding indication information, aperiodic channel state indication information, and feedback indication information that are included in the uplink scheduling information, to transmit aperiodic channel state information, feedback information, or aperiodic channel state information and feedback information on the uplink resource indicated by the uplink scheduling information.

Optionally, the determining, by the processor 801 based on at least one of the modulation and coding indication information, aperiodic channel state indication information, and feedback indication information that are included in the uplink scheduling information, to transmit aperiodic channel state information, feedback information, or aperiodic channel state information and feedback information on the uplink resource indicated by the uplink scheduling information includes: when the processor 801 determines that the index number corresponding to the modulation and coding indication information is 29, determining, by the processor 801, to transmit the aperiodic channel state information on the uplink resource indicated by the uplink scheduling information; and/or when the processor 801 determines that the index number corresponding to the modulation and coding indication information is 30 or 31, determining, by the processor 801, to transmit the feedback information, or the aperiodic channel state information and the feedback information on the uplink resource indicated by the uplink scheduling information.

Optionally, the determining, by the processor 801 based on at least one of the modulation and coding indication information, aperiodic channel state indication information, and feedback indication information that are included in the uplink scheduling information, to transmit aperiodic channel state information, feedback information, or aperiodic channel state information and feedback information on the uplink resource indicated by the uplink scheduling information includes: when the processor 801 determines that the index number corresponding to the modulation and coding indication information is 29 and the aperiodic channel state indication information included in the uplink scheduling information is set to "true", determining, by the processor 801, to transmit the aperiodic channel state information on the uplink resource indicated by the uplink scheduling information; and/or when the processor 801 determines that the index number corresponding to the modulation and coding indication information is 29 and the aperiodic channel state indication information included in the uplink scheduling information is set to "false", determining, by the processor 801, to transmit the feedback information, or the aperiodic channel state information and the feedback information on the uplink resource indicated by the uplink scheduling information.

Optionally, the determining, by the processor 801, to transmit the feedback information, or the aperiodic channel state information and the feedback information on the uplink resource indicated by the uplink scheduling information includes: determining, by the processor 801, to transmit the feedback information on the uplink resource indicated by the uplink scheduling information.

The processor 801 is further configured to: when the processor 801 determines that the index number corresponding to the modulation and coding indication information is 30 or 31, determine, by the processor 801, to transmit the aperiodic channel state information and the feedback information on the uplink resource indicated by the uplink scheduling information.

Optionally, the determining, by the processor 801, to transmit the feedback information, or the aperiodic channel state information and the feedback information on the uplink resource indicated by the uplink scheduling information includes: determining, by the processor 801, to transmit the aperiodic channel state information and the feedback information on the uplink resource indicated by the uplink scheduling information.

The processor 801 is further configured to: when the processor 801 determines that the index number corresponding to the modulation and coding indication information is 30 or 31, determine, by the processor 801, to transmit the feedback information on the uplink resource indicated by the uplink scheduling information.

Optionally, the determining, by the processor 801 based on at least one of the modulation and coding indication information, aperiodic channel state indication information, and feedback indication information that are included in the uplink scheduling information, to transmit aperiodic channel state information, feedback information, or aperiodic channel state information and feedback information on the uplink resource indicated by the uplink scheduling information includes: determining, by the processor 801 based on the aperiodic channel state indication information and the feedback indication information that are included in the uplink scheduling information, to transmit the aperiodic channel state information, the feedback information, or the aperiodic channel state information and the feedback information on the uplink resource indicated by the uplink scheduling information.

Optionally, the determining, by the processor 801 based on at least one of the modulation and coding indication information, aperiodic channel state indication information, and feedback indication information that are included in the uplink scheduling information, to transmit aperiodic channel state information, feedback information, or aperiodic channel state information and feedback information on the uplink resource indicated by the uplink scheduling information includes: determining, by the processor 801 based on the modulation and coding indication information, the aperiodic channel state indication information, and the feedback indication information that are included in the uplink scheduling information, to transmit the aperiodic channel state information, the feedback information, or the aperiodic channel state information and the feedback information on the uplink resource indicated by the uplink scheduling information.

It should be noted that, functions of the function modules of the terminal device 80 described in this embodiment of the present invention may be implemented based on the related descriptions of the corresponding terminal device in the embodiment shown in FIG. 4. Details are not described herein again.

Figure 9:
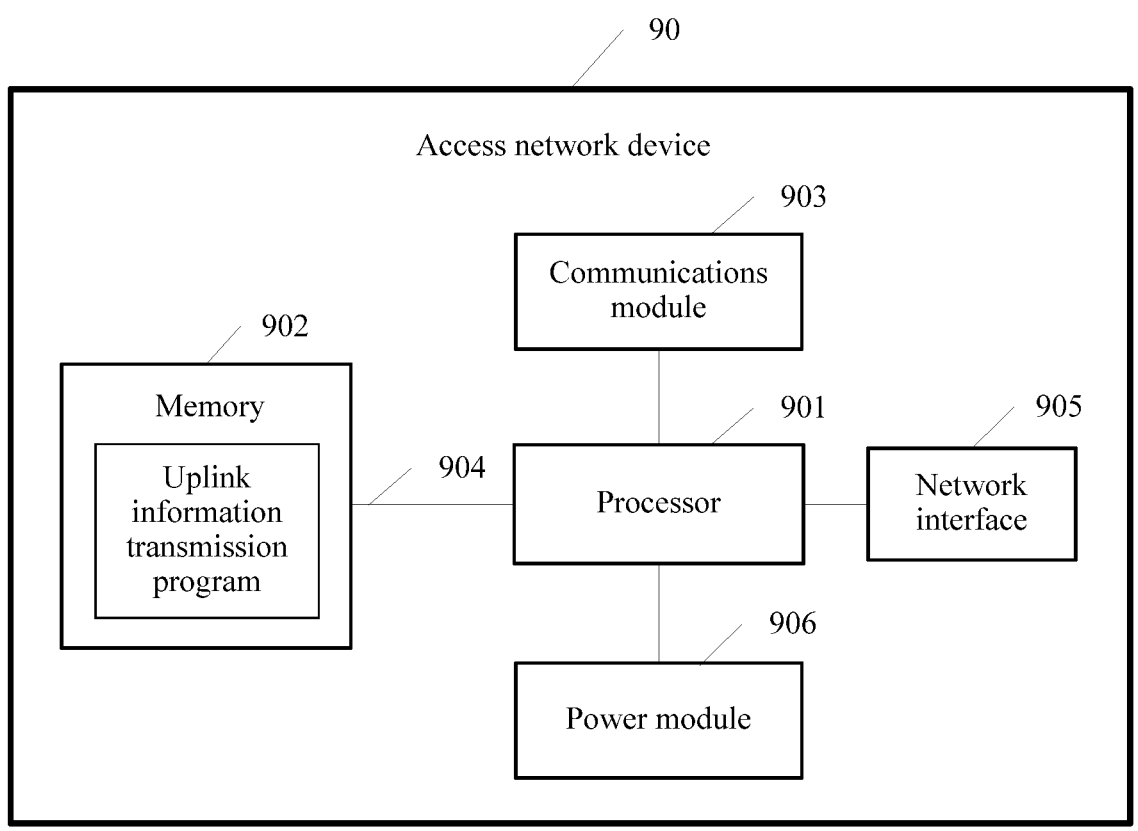
FIG. 9 is a schematic structural diagram of another access network device according to an embodiment of the present invention.

Referring to FIG. 9, FIG. 9 is a schematic structural diagram of an access network device according to an embodiment of the present invention. As shown in FIG. 9, the access network device 90 includes a processor 901, a memory 902, a communications module 903, and a bus 904. The processor 901, the memory 902, and the communications module 903 may be connected to each other by using the bus or in another manner. For example, in FIG. 9, the connection is implemented by using the bus 904.

Optionally, the access network device 90 may further include a network interface 905 and a power module 906.

The processor 901 may be a DSP chip. The processor 901 is configured to: manage a radio channel, control cross-zone handover of the terminal device in a local control zone, and so on. During specific implementation, the processor 901 may include an AM/CM module (a center for speech channel exchange and information exchange), a BM module (configured to perform functions such as call processing, signaling processing, radio resource management, radio link management, and circuit maintenance), a TCSM module (configured to perform functions of multiplexing/demultiplexing and code conversion), and other modules. For detailed information, refer to knowledge about mobile communications.

The memory 902 is configured to store feedback information transmission program code. During specific implementation, the memory 902 may be a ROM or a RAM, and can be configured to store program code.

The communications module 903 is configured to perform transmission processing on (for example, modulate) a mobile communication signal generated by the processor 901, and is further configured to perform receiving processing on (for example, demodulate) a mobile communication signal received by an antenna.

The bus 904 may be an ISA bus, a PCI bus, an EISA bus, an IIC bus, or the like.

The network interface 905 is used by the access network device 90 to perform data communication with a terminal (a mobile station MS in 2G, or UE in 3G and 4G). During specific implementation, the network interface 905 may include one or several of a GSM (2G) wireless network interface, a WCDMA (3G) wireless network interface, an LTE (4G) wireless network interface, and the like, or may be a wireless network interface in future 4.5G or 5G.

The power module 906 is configured to supply power to the modules of the access network device 90.

In this embodiment of the present invention, the processor 901 is further configured to: invoke the program code in the memory 902 and perform the following operations: sending, by the processor 901, uplink scheduling information to a terminal device by using the communications module 903, where the uplink scheduling information includes modulation and coding indication information, and the modulation and coding indication information is used by the terminal device to determine whether to transmit uplink data on an uplink resource indicated by the uplink scheduling information; and if the modulation and coding indication information instructs the terminal device to transmit the uplink data on the uplink resource indicated by the uplink scheduling information, receiving, by the processor 901 by using the communications module 903, the uplink data transmitted by the terminal device on the uplink resource.

It should be noted that, the access network device 90 is applicable to a 2G communications system (for example, a GSM), a 3G communications system (for example, a UMTS), and a 4G communications system (for example, LTE), and is also applicable to a future 4.5G or 5G communications system.

Optionally, when an index number corresponding to the modulation and coding indication information included in the uplink scheduling information is any value in 0 to 28, the modulation and coding indication information indicates the terminal device to transmit the uplink data on the uplink resource indicated by the uplink scheduling information; and/or when an index number corresponding to the modulation and coding indication information included in the uplink scheduling information is any value in 29 to 31, the modulation and coding indication information indicates the terminal device not to transmit the uplink data on the uplink resource indicated by the uplink scheduling information.

Optionally, the uplink scheduling information further includes feedback indication information, where the aperiodic channel state indication information and the feedback indication information are used by the terminal device to determine to transmit the uplink data, the uplink data and aperiodic channel state information, the uplink data and feedback information, or the uplink data, aperiodic channel state information, and feedback information on the uplink resource indicated by the uplink scheduling information.

Optionally, the uplink scheduling information further includes aperiodic channel state indication information and feedback indication information, where at least one of the modulation and coding indication information, the aperiodic channel state indication information, and the feedback indication information is used by the terminal device to determine to transmit aperiodic channel state information, feedback information, or aperiodic channel state information and feedback information on the uplink resource indicated by the uplink scheduling information.

Optionally, when an index number corresponding to the modulation and coding indication information is 29, the modulation and coding indication information indicates the terminal device to transmit the aperiodic channel state information on the uplink resource indicated by the uplink scheduling information; and/or when an index number corresponding to the modulation and coding indication information is 30 or 31, the modulation and coding indication information indicates the terminal device to transmit the feedback information, or the aperiodic channel state information and the feedback information on the uplink resource indicated by the uplink scheduling information.

Optionally, when an index number corresponding to the modulation and coding indication information is 29 and the aperiodic channel state indication information included in the uplink scheduling information is set to "true", the modulation and coding indication information and the aperiodic channel state indication information are used to instruct the terminal device to transmit the aperiodic channel state information on the uplink resource indicated by the uplink scheduling information; and/or when an index number corresponding to the modulation and coding indication information is 29 and the aperiodic channel state indication information included in the uplink scheduling information is set to "false", the modulation and coding indication information and the aperiodic channel state indication information are used to instruct the terminal device to transmit the feedback information, or the aperiodic channel state information and the feedback information on the uplink resource indicated by the uplink scheduling information.

Optionally, when the index number corresponding to the modulation and coding indication information is 29 and the aperiodic channel state indication information included in the uplink scheduling information is set to "false", the modulation and coding indication information and the aperiodic channel state indication information are used to instruct the terminal device to transmit the feedback information on the uplink resource indicated by the uplink scheduling information; or when the index number corresponding to the modulation and coding indication information is 30 or 31, the modulation and coding indication information indicates the terminal device to transmit the aperiodic channel state information and the feedback information on the uplink resource indicated by the uplink scheduling information.

Optionally, when the index number corresponding to the modulation and coding indication information is 29 and the aperiodic channel state indication information included in the uplink scheduling information is set to "false", the modulation and coding indication information and the aperiodic channel state indication information are used to instruct the terminal device to transmit the aperiodic channel state information and the feedback information on the uplink resource indicated by the uplink scheduling information; or when the index number corresponding to the modulation and coding indication information is 30 or 31, the modulation and coding indication information indicates the terminal device to transmit the feedback information on the uplink resource indicated by the uplink scheduling information.

Optionally, the aperiodic channel state indication information and the feedback indication information that are included in the uplink scheduling information are used by the terminal device to determine to transmit the aperiodic channel state information, the feedback information, or the aperiodic channel state information and the feedback information on the uplink resource indicated by the uplink scheduling information.

Optionally, the modulation and coding indication information, the aperiodic channel state indication information, and the feedback indication information that are included in the uplink scheduling information are used by the terminal device to determine to transmit the aperiodic channel state information, the feedback information, or the aperiodic channel state information and the feedback information on the uplink resource indicated by the uplink scheduling information.

It should be noted that, functions of the function modules of the access network device 90 described in this embodiment of the present invention may be implemented based on the related descriptions of the corresponding access network device in the embodiment shown in FIG. 4. Details are not described herein again.

Figure 10:
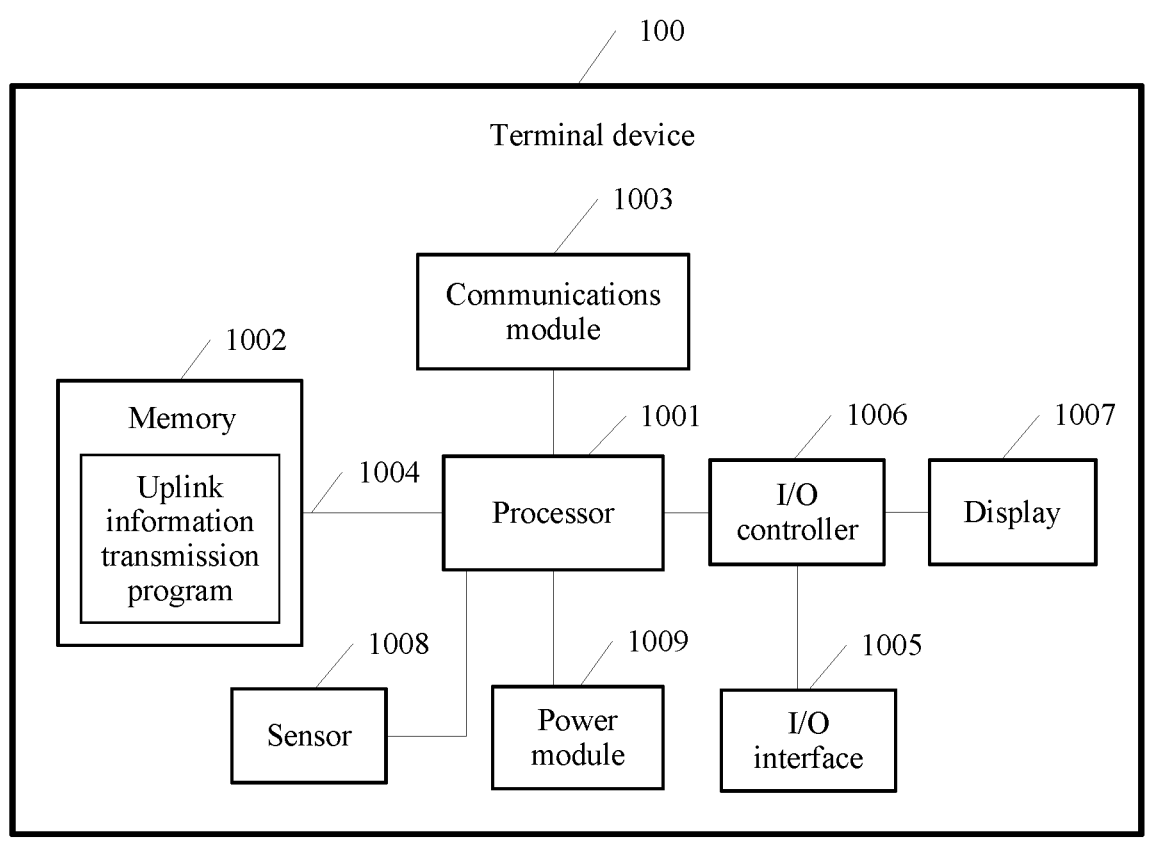
FIG. 10 is a schematic structural diagram of another terminal device according to an embodiment of the present invention.

Referring to FIG. 10, FIG. 10 is a schematic structural diagram of a terminal device according to an embodiment of the present invention. As shown in FIG. 10, the terminal device 100 includes a processor 1001, a memory 1002, a communications module 1003, and a bus 1004. The processor 1001, the memory 1002, and the communications module 1003 may be connected to each other by using the bus or in another manner. For example, in FIG. 10, the connection is implemented by using the bus 1004.

Optionally, the terminal device 100 may further include an I/O interface 1005, an I/O controller 1006, a display 1007, a sensor 1008, and a power module 1009.

The processor 1001 may be a general purpose processor, for example, a CPU, and is configured to run operating system software, required application software, and the like of the terminal device 100. The processor 1001 may process data received by using the communications module 1003. The processor 1001 may further process data to be sent to the communications module 1003 for wireless transmission.

The memory 1002 is configured to: store uplink information transmission program code, and complete storage of various software programs of the terminal device, data storage, software running, and the like. The memory 1002 may include a volatile memory, for example, a RAM. Alternatively, the memory 1002 may include a nonvolatile memory, for example, a ROM, a hard disk drive, or a solid-state drive. Alternatively, the memory 1002 may include a combination of the foregoing types of memories.

The communications module 1003 provides a communication function for the terminal device 100, is configured to perform transmission processing on (for example, amplify, modulate, or encode) a mobile communication signal generated by the processor 1001, and is further configured to perform receiving processing on (for example, demodulate or decode) a mobile communication signal received by an antenna. The communications module 1003 is applicable to a cellular network, for example, a GSM, UMTS, LTE, or CDMA network, and is also applicable to one or more of a WLAN, an NFC network, a Bluetooth network, and the like.

The bus 1004 may be an ISA bus, a PCI bus, an EISA bus, an IIC bus, or the like.

The I/O interface 1005 is an external interface of the terminal device 100, and includes one or more of a USB interface, an SD card interface, a push-button interface, and the like.

The I/O controller 1006 is configured to control data exchange between various input/output devices of the terminal device 100, especially, data exchange between the processor 1001, the I/O interface 1005, and the display 1007.

The display 1007 is a display screen and a touchscreen of the terminal device 100. The display 1007 is configured to display a software running status, a power status, time, a user configuration interface, and a configuration result of the terminal device 100. The touchscreen is configured to: receive a user touch operation and convert the user touch operation into a user operation instruction.

The sensor 1008 is various sensor devices, including one or more of a GPS module, a gravity sensor, an acceleration sensor, a distance sensor, a camera, an optical sensor, and the like.

The power module 1009 supplies power to the modules of the terminal device 100.

In this embodiment of the present invention, the processor 1001 is mainly configured to: invoke the program stored in the memory 1002 and perform the following operations: receiving, by the processor 1001 by using the communications module 1003, uplink scheduling information sent by an access network device; determining, by the processor 1001 based on aperiodic channel state indication information and feedback indication information that are included in the uplink scheduling information, uplink information to be transmitted on an uplink resource indicated by the uplink scheduling information, where the uplink information includes at least one of the following: uplink data, aperiodic channel state information, and feedback information; and transmitting, by the processor 1001, the uplink information on the uplink resource by using the communications module 1003.

It should be noted that, functions of the function modules of the terminal device 100 described in this embodiment of the present invention may be implemented based on the related descriptions of the corresponding terminal device in the embodiment shown in FIG. 5. Details are not described herein again.

Figure 11:
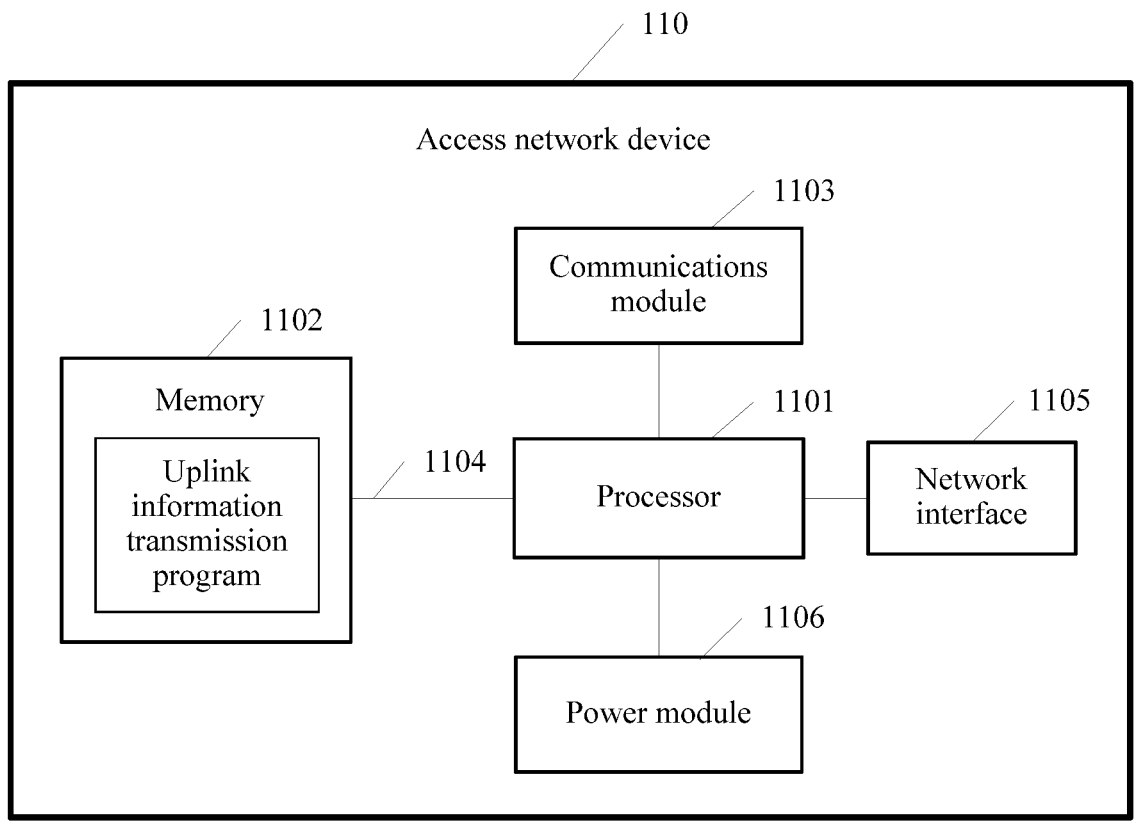
FIG. 11 is a schematic structural diagram of another access network device according to an embodiment of the present invention.

Referring to FIG. 11, FIG. 11 is a schematic structural diagram of an access network device according to an embodiment of the present invention. As shown in FIG. 11, the access network device 110 includes a processor 1101, a memory 1102, a communications module 1103, and a bus 1104. The processor 1101, the memory 1102, and the communications module 1103 may be connected to each other by using the bus or in another manner. For example, in FIG. 11, the connection is implemented by using the bus 1104.

Optionally, the access network device 110 may further include a network interface 1105 and a power module 1106.

The processor 1101 may be a DSP chip. The processor 1101 is configured to: manage a radio channel, control cross-zone handover of the terminal device in a local control zone, and so on. During specific implementation, the processor 1101 may include an AM/CM module (a center for speech channel exchange and information exchange), a BM module (configured to perform functions such as call processing, signaling processing, radio resource management, radio link management, and circuit maintenance), a TCSM module (configured to perform functions of multiplexing/demultiplexing and code conversion), and other modules. For detailed information, refer to knowledge about mobile communications.

The memory 1102 is configured to store feedback information transmission program code. During specific implementation, the memory 1102 may be a ROM or a RAM, and can be configured to store program code.

The communications module 1103 is configured to perform transmission processing on (for example, modulate) a mobile communication signal generated by the processor 1101, and is further configured to perform receiving processing on (for example, demodulate) a mobile communication signal received by an antenna.

The bus 1104 may be an ISA bus, a PCI bus, an EISA bus, an IIC bus, or the like.

The network interface 1105 is used by the access network device 110 to perform data communication with a terminal (a mobile station MS in 2G, or UE in 3G and 4G). During specific implementation, the network interface 1105 may include one or several of a GSM (2G) wireless network interface, a WCDMA (3G) wireless network interface, an LTE (4G) wireless network interface, and the like, or may be a wireless network interface in future 4.5G or 5G.

The power module 1106 is configured to supply power to the modules of the access network device 110.

In this embodiment of the present invention, the processor 1101 is further configured to: invoke the program code in the memory 1102 and perform the following operations: sending, by the processor 1101, uplink scheduling information to a terminal device by using the communications module 1103, where the uplink scheduling information includes aperiodic channel state indication information and feedback indication information, the aperiodic channel state indication information and the feedback indication information are used to instruct the terminal device to determine uplink information to be transmitted on an uplink resource indicated by the uplink scheduling information, and the uplink information includes at least one of the following: uplink data, aperiodic channel state information, and feedback information; and receiving, by the processor 1101 by using the communications module 1103, the uplink information transmitted by the terminal device on the uplink resource.

It should be noted that, the access network device 110 is applicable to a 2G communications system (for example, a GSM), a 3G communications system (for example, a UMTS), and a 4G communications system (for example, LTE), and is also applicable to a future 4.5G or 5G communications system.

It should be noted that, functions of the function modules of the access network device 110 described in this embodiment of the present invention may be implemented based on the related descriptions of the corresponding access network device in the embodiment shown in FIG. 5. Details are not described herein again.

Figure 12:
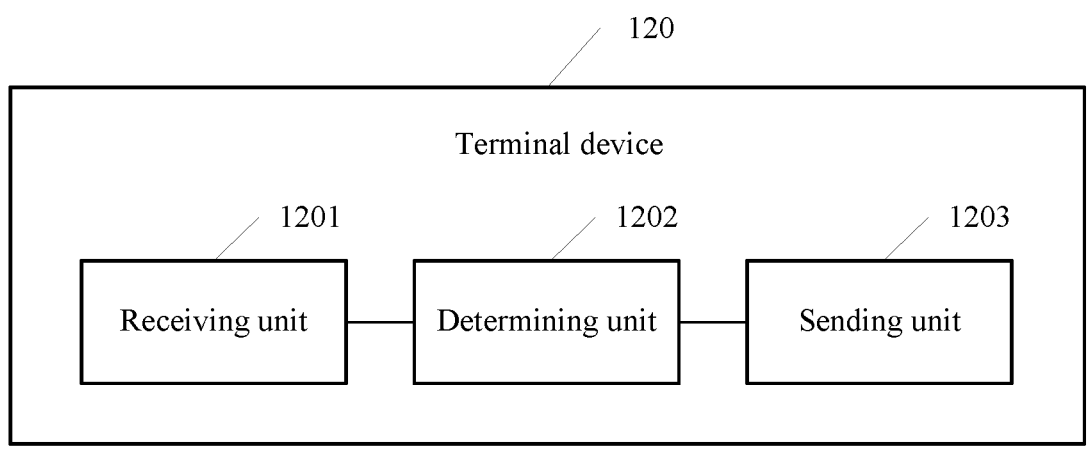
FIG. 12 is a schematic structural diagram of another terminal device according to an embodiment of the present invention.

Referring to FIG. 12, FIG. 12 is a schematic structural diagram of another terminal device according to an embodiment of the present invention. As shown in FIG. 12, the terminal device 120 includes a receiving unit 1201, a determining unit 1202, and a sending unit 1203.

The receiving unit 1201 is configured to receive uplink scheduling information sent by an access network device.

The determining unit 1202 is configured to determine, based on aperiodic channel state indication information and modulation and coding indication information that are included in the uplink scheduling information, whether to transmit feedback information on an uplink resource indicated by the uplink scheduling information.

The sending unit 1203 is configured to: if the determining unit 1202 determines to transmit the feedback information on the uplink resource, transmit the feedback information on the uplink resource.

In this embodiment, the terminal device 120 is presented in a form of a function unit. The "unit" herein may be an application-specific integrated circuit (ASIC), a processor and a memory that execute one or more software or firmware programs, an integrated logic circuit, and/or another component that can provide the foregoing functions. The terminal device 120 may use a form shown in FIG. 6. The receiving unit 1201, the determining unit 1202, and the sending unit 1203 may be implemented by using the processor 601 in FIG. 6.

Optionally, the sending unit 1203 is further configured to: when transmitting the feedback information on the uplink resource, further transmit at least one of uplink data and aperiodic channel state information on the uplink resource.

Optionally, the determining unit 1202 is specifically configured to: when the aperiodic channel state indication information included in the uplink scheduling information instructs the terminal device to feed back the aperiodic channel state information and a modulation and coding scheme index number corresponding to the modulation and coding indication information included in the uplink scheduling information is set to 30 or 31, determine to transmit the feedback information on the uplink resource indicated by the uplink scheduling information; and/or when the aperiodic channel state indication information included in the uplink scheduling information instructs the terminal device not to feed back the aperiodic channel state information and a modulation and coding scheme index number corresponding to the modulation and coding indication information included in the uplink scheduling information is set to any value in 29 to 31, determine to transmit the feedback information on the uplink resource indicated by the uplink scheduling information.

It should be noted that, functions of the function units of the terminal device 120 described in this embodiment of the present invention may be implemented based on the related descriptions of the terminal device in the embodiment shown in FIG. 3. Details are not described herein again.

Figure 13:
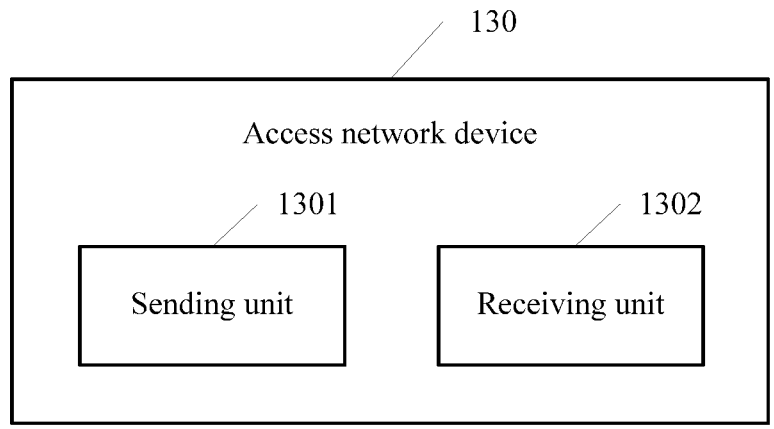
FIG. 13 is a schematic structural diagram of another access network device according to an embodiment of the present invention.

Referring to FIG. 13, FIG. 13 is a schematic structural diagram of another access network device according to an embodiment of the present invention. As shown in FIG. 13, the access network device 130 includes a sending unit 1301 and a receiving unit 1302.

The sending unit 1301 is configured to send uplink scheduling information to a terminal device, where the uplink scheduling information includes aperiodic channel state indication information and modulation and coding indication information, and the aperiodic channel state indication information and the modulation and coding indication information are used to instruct the terminal device to determine whether to transmit feedback information on an uplink resource indicated by the uplink scheduling information.

The receiving unit 1302 is configured to: if the aperiodic channel state indication information and the modulation and coding indication information instruct the terminal device to transmit the feedback information on the uplink resource indicated by the uplink scheduling information, receive the feedback information transmitted by the terminal device on the uplink resource.

In this embodiment, the access network device 130 is presented in a form of a function unit. The "unit" herein may be an ASIC, a processor and a memory that execute one or more software or firmware programs, an integrated logic circuit, and/or another component that can provide the foregoing functions. The access network device 130 may use a form shown in FIG. 7. The sending unit 1301 and the receiving unit 1302 may be implemented by using the processor 701 in FIG. 7.

It should be noted that, functions of the function units of the access network device 130 described in this embodiment of the present invention may be implemented based on the related descriptions of the access network device in the embodiment shown in FIG. 3. Details are not described herein again.

Figure 14:
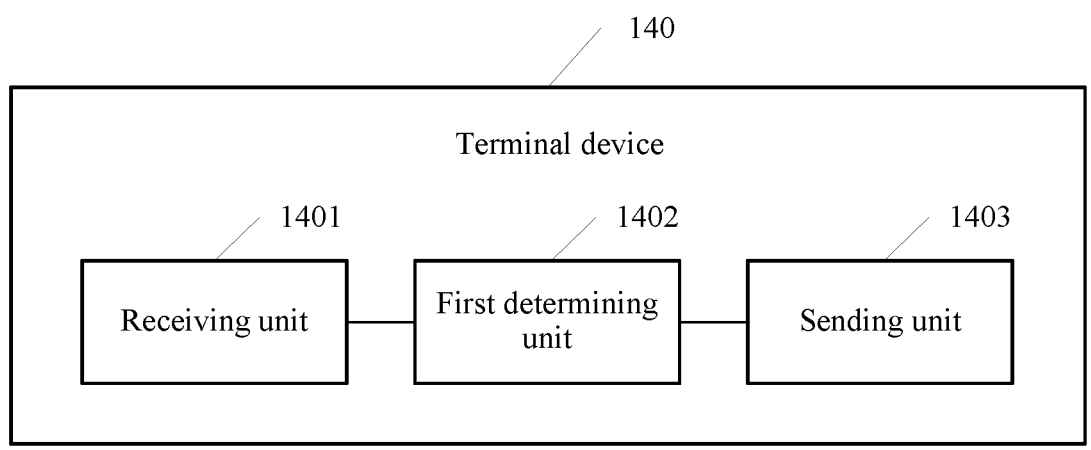
FIG. 14 is a schematic structural diagram of another terminal device according to an embodiment of the present invention.

Referring to FIG. 14, FIG. 14 is a schematic structural diagram of another terminal device according to an embodiment of the present invention. As shown in FIG. 14, the terminal device 140 includes a receiving unit 1401, a first determining unit 1402, and a sending unit 1403.

The receiving unit 1401 is configured to receive uplink scheduling information sent by an access network device.

The first determining unit 1402 is configured to determine, based on modulation and coding indication information included in the uplink scheduling information, whether to transmit uplink data on an uplink resource indicated by the uplink scheduling information.

The sending unit 1403 is configured to: if it is determined to transmit the uplink data on the uplink resource, transmit the uplink data on the uplink resource.

In this embodiment, the terminal device 140 is presented in a form of a function unit. The "unit" herein may be an ASIC, a processor and a memory that execute one or more software or firmware programs, an integrated logic circuit, and/or another component that can provide the foregoing functions. The terminal device 140 may use a form shown in FIG. 8. The receiving unit 1401, the first determining unit 1402, and the sending unit 1403 may be implemented by using the processor 801 in FIG. 8.

Optionally, the first determining unit 1402 is specifically configured to: when determining that an index number corresponding to the modulation and coding indication information included in the uplink scheduling information is any value in 0 to 28, determine to transmit the uplink data on the uplink resource indicated by the uplink scheduling information; and/or when determining that an index number corresponding to the modulation and coding indication information included in the uplink scheduling information is any value in 29 to 31, determine not to transmit the uplink data on the uplink resource indicated by the uplink scheduling information.

Optionally, that the first determining unit 1402 is configured to determine to transmit the uplink data on the uplink resource indicated by the uplink scheduling information is specifically: the first determining unit 1402 is configured to determine, based on aperiodic channel state indication information and feedback indication information that are included in the uplink scheduling information, to transmit the uplink data, the uplink data and aperiodic channel state information, the uplink data and feedback information, or the uplink data, aperiodic channel state information, and feedback information on the uplink resource indicated by the uplink scheduling information.

Optionally, that the first determining unit 1402 is configured to determine not to transmit the uplink data on the uplink resource indicated by the uplink scheduling information is specifically: the first determining unit 1402 is configured to determine, based on at least one of the modulation and coding indication information, aperiodic channel state indication information, and feedback indication information that are included in the uplink scheduling information, to transmit aperiodic channel state information, feedback information, or aperiodic channel state information and feedback information on the uplink resource indicated by the uplink scheduling information.

Optionally, the first determining unit 1402 is specifically configured to: when determining that the index number corresponding to the modulation and coding indication information is 29, determine to transmit the aperiodic channel state information on the uplink resource indicated by the uplink scheduling information; and/or when determining that the index number corresponding to the modulation and coding indication information is 30 or 31, determine to transmit the feedback information, or the aperiodic channel state information and the feedback information on the uplink resource indicated by the uplink scheduling information.

Optionally, the first determining unit 1402 is specifically configured to: when determining that the index number corresponding to the modulation and coding indication information is 29 and the aperiodic channel state indication information included in the uplink scheduling information is set to "true", determine to transmit the aperiodic channel state information on the uplink resource indicated by the uplink scheduling information; and/or when determining that the index number corresponding to the modulation and coding indication information is 29 and the aperiodic channel state indication information included in the uplink scheduling information is set to "false", determine to transmit the feedback information, or the aperiodic channel state information and the feedback information on the uplink resource indicated by the uplink scheduling information.

Optionally, that the first determining unit 1402 is configured to determine to transmit the feedback information, or the aperiodic channel state information and the feedback information on the uplink resource indicated by the uplink scheduling information is specifically: the first determining unit 1402 is configured to determine to transmit the feedback information on the uplink resource indicated by the uplink scheduling information.

The terminal device 140 further includes: a second determining unit, configured to: when the first determining unit 1402 determines that the index number corresponding to the modulation and coding indication information is 30 or 31, determine to transmit the aperiodic channel state information and the feedback information on the uplink resource indicated by the uplink scheduling information.

Optionally, that the first determining unit 1402 is configured to determine to transmit the feedback information, or the aperiodic channel state information and the feedback information on the uplink resource indicated by the uplink scheduling information is specifically: the first determining unit 1402 is configured to determine to transmit the aperiodic channel state information and the feedback information on the uplink resource indicated by the uplink scheduling information.

The terminal device 140 further includes: a third determining unit, configured to: when the first determining unit 1402 determines that the index number corresponding to the modulation and coding indication information is 30 or 31, determine to transmit the feedback information on the uplink resource indicated by the uplink scheduling information.

Optionally, the first determining unit 1402 is specifically configured to: determine, based on the aperiodic channel state indication information and the feedback indication information that are included in the uplink scheduling information, to transmit the aperiodic channel state information, the feedback information, or the aperiodic channel state information and the feedback information on the uplink resource indicated by the uplink scheduling information.

Optionally, the first determining unit 1402 is specifically configured to: determine, based on the modulation and coding indication information, the aperiodic channel state indication information, and the feedback indication information that are included in the uplink scheduling information, to transmit the aperiodic channel state information, the feedback information, or the aperiodic channel state information and the feedback information on the uplink resource indicated by the uplink scheduling information.

It should be noted that, functions of the function units of the terminal device 140 described in this embodiment of the present invention may be implemented based on the related descriptions of the terminal device in the embodiment shown in FIG. 4. Details are not described herein again.

Figure 15:
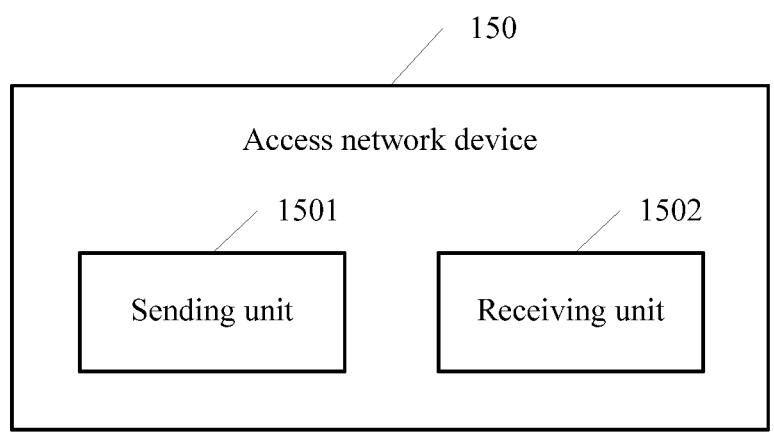
FIG. 15 is a schematic structural diagram of another access network device according to an embodiment of the present invention.

Referring to FIG. 15, FIG. 15 is a schematic structural diagram of another access network device according to an embodiment of the present invention. As shown in FIG. 15, the access network device 150 includes a sending unit 1501 and a receiving unit 1502.

The sending unit 1501 is configured to send uplink scheduling information to a terminal device, where the uplink scheduling information includes modulation and coding indication information, and the modulation and coding indication information is used by the terminal device to determine whether to transmit uplink data on an uplink resource indicated by the uplink scheduling information.

The receiving unit 1502 is configured to: if the modulation and coding indication information instructs the terminal device to transmit the uplink data on the uplink resource indicated by the uplink scheduling information, receive the uplink data transmitted by the terminal device on the uplink resource.

In this embodiment, the access network device 150 is presented in a form of a function unit. The "unit" herein may be an ASIC, a processor and a memory that execute one or more software or firmware programs, an integrated logic circuit, and/or another component that can provide the foregoing functions. The access network device 150 may use a form shown in FIG. 9. The sending unit 1501 and the receiving unit 1502 may be implemented by using the processor 901 in FIG. 9.

It should be noted that, functions of the function units of the access network device 150 described in this embodiment of the present invention may be implemented based on the related descriptions of the terminal device in the embodiment shown in FIG. 4. Details are not described herein again.

Figure 16:
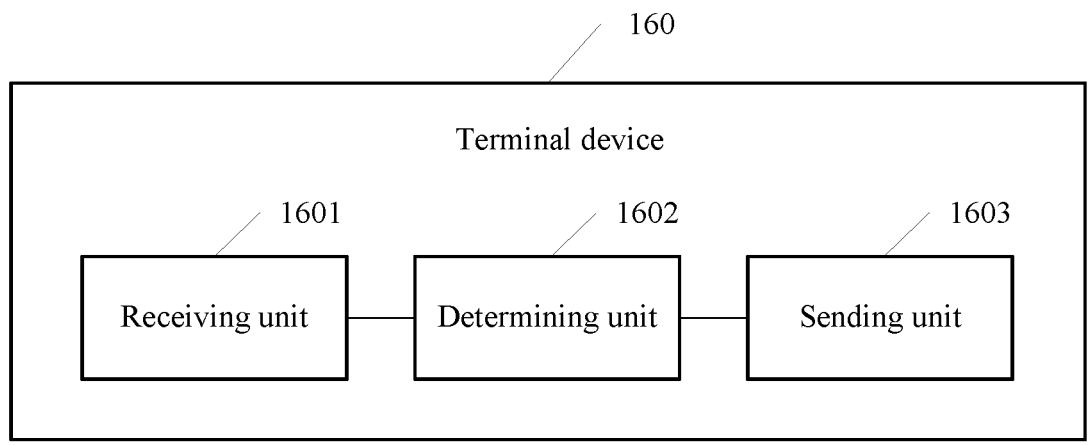
FIG. 16 is a schematic structural diagram of another terminal device according to an embodiment of the present invention.

Referring to FIG. 16, FIG. 16 is a schematic structural diagram of another terminal device according to an embodiment of the present invention. As shown in FIG. 16, the terminal device 160 includes a receiving unit 1601, a determining unit 1602, and a sending unit 1603.

The receiving unit 1601 is configured to receive uplink scheduling information sent by an access network device.

The determining unit 1602 is configured to determine, based on aperiodic channel state indication information and feedback indication information that are included in the uplink scheduling information, uplink information to be transmitted on an uplink resource indicated by the uplink scheduling information, where the uplink information includes at least one of the following: uplink data, aperiodic channel state information, and feedback information.

The sending unit 1603 is configured to transmit the uplink information on the uplink resource.

In this embodiment, the terminal device 160 is presented in a form of a function unit. The "unit" herein may be an ASIC, a processor and a memory that execute one or more software or firmware programs, an integrated logic circuit, and/or another component that can provide the foregoing functions. The terminal device 160 may use a form shown in FIG. 10. The receiving unit 1601, the determining unit 1602, and the sending unit 1603 may be implemented by using the processor 1001 in FIG. 10.

It should be noted that, functions of the function units of the terminal device 160 described in this embodiment of the present invention may be implemented based on the related descriptions of the terminal device in the embodiment shown in FIG. 5. Details are not described herein again.

Figure 17:
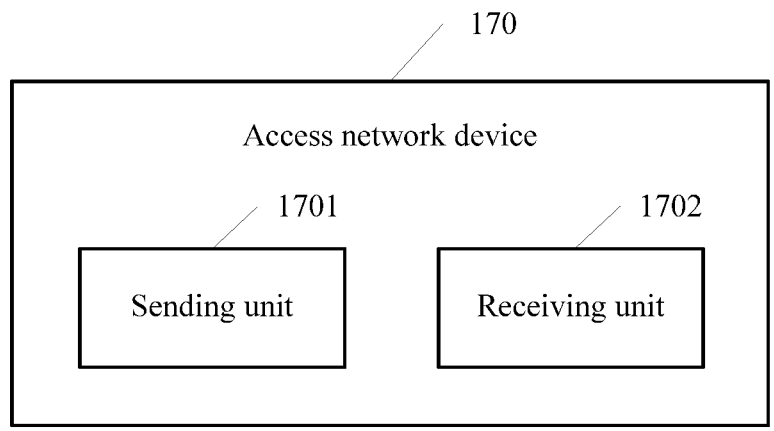
FIG. 17 is a schematic structural diagram of another access network device according to an embodiment of the present invention.

Referring to FIG. 17, FIG. 17 is a schematic structural diagram of another access network device according to an embodiment of the present invention. As shown in FIG. 17, the access network device 170 includes a sending unit 1701 and a receiving unit 1702.

The sending unit 1701 is configured to send uplink scheduling information to a terminal device, where the uplink scheduling information includes aperiodic channel state indication information and feedback indication information, the aperiodic channel state indication information and the feedback indication information are used to instruct the terminal device to determine uplink information to be transmitted on an uplink resource indicated by the uplink scheduling information, and the uplink information includes at least one of the following: uplink data, aperiodic channel state information, and feedback information.

The receiving unit 1702 is configured to receive the uplink information transmitted by the terminal device on the uplink resource.

In this embodiment, the access network device 170 is presented in a form of a function unit. The "unit" herein may be an ASIC, a processor and a memory that execute one or more software or firmware programs, an integrated logic circuit, and/or another component that can provide the foregoing functions. The access network device 170 may use a form shown in FIG. 11. The sending unit 1701 and the receiving unit 1702 may be implemented by using the processor 1101 in FIG. 11.

It should be noted that, functions of the function units of the access network device 170 described in this embodiment of the present invention may be implemented based on the related descriptions of the access network device in the embodiment shown in FIG. 5. Details are not described herein again.

To facilitate better implementation of the embodiments of the present invention, an embodiment of the present invention further provides a computer readable storage medium. The computer readable storage medium stores one or more computer programs. The computer readable storage medium may be a magnetic disk, a compact disc, a ROM, or a RAM. The one or more computer programs run on one or more processors of the terminal device. When the computer programs are running, a procedure of the foregoing method embodiment shown in FIG. 3, FIG. 4, or FIG. 5 may be implemented.

In conclusion, by implementing the embodiments of the present invention, when using an unlicensed frequency band resource, a terminal device can effectively identify a type of uplink information that needs to be fed back, to ensure data transmission efficiency.

Although the present invention is described herein with reference to the embodiments, the scope of the claims of the present invention should not be limited. In a process of implementing the present invention that claims protection, a person skilled in the art may understand and implement all or some procedures in the foregoing embodiments by viewing the accompanying drawings, disclosed content, and the accompanying claims. Equivalent variations made in accordance with the claims of the present invention shall fall within the scope of the present invention. In the claims, "comprise" does not exclude another component or another step, and "a" or "one" does not exclude a case of "a plurality of". A single controller or another unit may implement several functions enumerated in the claims. Some wordings are recorded in dependent claims that are different from each other, but this does not mean that these wordings cannot be combined to produce a better effect. A computer program may be stored/distributed in an appropriate medium such as an optical storage medium or a solid-state medium and be provided together with other hardware or be used as a part of hardware, or may be distributed in another manner, for example, by using the Internet, or another wired or wireless system.

What is claimed is:

1. An uplink information transmission method, comprising:
   receiving, by a terminal device, uplink scheduling information sent by an access network device;
   determining, by the terminal device based on modulation and coding indication information comprised in the uplink scheduling information, whether to transmit uplink data on an uplink resource indicated by the uplink scheduling information;
   transmitting, by the terminal device, the uplink data on a physical uplink shared channel indicated by the uplink scheduling information, when it is determined based on the modulation and coding indication information to transmit the uplink data on the uplink resource; and
   transmitting, by the terminal device, aperiodic channel state information or feedback information without the uplink data on a physical uplink control channel indicated by the uplink scheduling information, when it is determined based on the modulation and coding indication information not to transmit the uplink data on the uplink resource.

2. The method according to claim 1, wherein the determining comprises:
   when the terminal device determines that an index number corresponding to the modulation and coding indication information comprised in the uplink scheduling information is any value from 0 to 28, determining, by the terminal device, to transmit the uplink data on the physical uplink shared channel; and
   when the terminal device determines that the index number corresponding to the modulation and coding indication information comprised in the uplink scheduling information is any value from 29 to 31, determining, by the terminal device, to transmit the aperiodic channel state information or the feedback information on the physical uplink control channel, and not to transmit the uplink data on the physical uplink control channel.

3. The method according to claim 2, wherein determining to transmit the uplink data on the uplink resource indicated by the uplink scheduling information comprises:
   determining, by the terminal device based on aperiodic channel state indication information and feedback indication information that are comprised in the uplink scheduling information, to transmit the uplink data, the uplink data and aperiodic channel state information, the uplink data and feedback information, or the uplink data, aperiodic channel state information, and feedback information on the uplink resource indicated by the uplink scheduling information.

4. The method according to claim 2, wherein determining not to transmit the uplink data on the uplink resource indicated by the uplink scheduling information comprises:
   determining, by the terminal device based on at least one of the modulation and coding indication information, aperiodic channel state indication information, and feedback indication information that are comprised in the uplink scheduling information, to transmit aperiodic channel state information or feedback information on the uplink resource indicated by the uplink scheduling information.

5. The method according to claim 4, wherein determining not to transmit the uplink data on the uplink resource indicated by the uplink scheduling information comprises:
determining, by the terminal device based on the aperiodic channel state indication information and the feedback indication information that are comprised in the uplink scheduling information, to transmit the aperiodic channel state information or the feedback information on the uplink resource indicated by the uplink scheduling information.

6. The method according to claim 1, wherein the modulation and coding indication information comprises information to distinguish whether the uplink scheduling information is corresponding to a physical uplink control channel or a physical uplink shared channel.

7. An uplink information transmission method, comprising:
sending, by an access network device, uplink scheduling information to a terminal device, wherein the uplink scheduling information comprises modulation and coding indication information for use by the terminal device to determine whether to transmit uplink data on an uplink resource indicated by the uplink scheduling information; and
receiving, by the access network device, the uplink data transmitted by the terminal device on a physical uplink shared channel indicated by the uplink scheduling information when the modulation and coding indication information indicates the terminal device to transmit the uplink data on the uplink resource indicated by the uplink scheduling information; and
receiving, by the access network device, aperiodic channel state information or feedback information without the uplink data on a physical uplink control channel indicated by the uplink scheduling information, when the modulation and coding indication information does not indicate the terminal device to transmit the uplink data.

8. The method according to claim 7, wherein:
when an index number corresponding to the modulation and coding indication information included in the uplink scheduling information is any value from 0 to 28, the modulation and coding indication information indicates the terminal device to transmit the uplink data on the physical uplink shared channel; and
when the index number corresponding to the modulation and coding indication information included in the uplink scheduling information is any value from 29 to 31, the modulation and coding indication information indicates the terminal device to transmit the aperiodic channel state information or the feedback information on the physical uplink control channel, and not to transmit the uplink data on the physical uplink control channel.

9. The method according to claim 8, wherein:
the uplink scheduling information further includes aperiodic channel state indication information and feedback indication information; and
when the index number corresponding to the modulation and coding indication information included in the uplink scheduling information is any value from 0 to 28, the aperiodic channel state indication information and the feedback indication information indicates the terminal device to determine to transmit uplink data, or transmit uplink data and aperiodic channel state information, or transmit uplink data and feedback information, or transmit uplink data, aperiodic channel state information and feedback information, on the uplink resource indicated by the uplink scheduling information.

10. The method according to claim 8, wherein:
the uplink scheduling information further includes aperiodic channel state indication information and feedback indication information; and
when the index number corresponding to the modulation and coding indication information included in the uplink scheduling information is any value from 29 to 31, at least one of the modulation and coding indication information, the aperiodic channel state indication information, and the feedback indication information is used by the terminal device to determine to transmit aperiodic channel state information or feedback information on the uplink resource indicated by the uplink scheduling information.

11. The method according to claim 10, wherein the modulation and coding indication information, the aperiodic channel state indication information, and the feedback indication information that are included in the uplink scheduling information are used by the terminal device to determine to transmit the aperiodic channel state information, the feedback information, or the aperiodic channel state information and the feedback information on the uplink resource indicated by the uplink scheduling information.

12. The method according to claim 7, wherein the modulation and coding indication information comprises information to distinguish whether the uplink scheduling information is corresponding to a physical uplink control channel or a physical uplink shared channel.

13. A terminal device comprising:
a processor, a memory, and a communications module, wherein the memory is configured to store uplink information transmission program code, and the processor is configured to execute the uplink information transmission program code to:
receive, at the communication module, uplink scheduling information sent by an access network device;
determine whether to transmit uplink data on an uplink resource indicated by the uplink scheduling information based on modulation and coding indication information comprised in the uplink scheduling information;
transmit, by the communications module, the uplink data on a physical uplink shared channel indicated by the uplink scheduling information when it is determined based on the modulation and coding indication information to transmit the uplink data on the uplink resource; and
transmit, by the communications module, aperiodic channel state information or feedback information without the uplink data on a physical uplink control channel indicated by the uplink scheduling information when it is determined based on the modulation and coding indication information not to transmit the uplink data on the uplink resource.

14. The terminal device according to claim 13, wherein determining whether to transmit the uplink data on the uplink resource indicated by the uplink scheduling information comprises:

when it is determined that an index number corresponding to the modulation and coding indication information comprised in the uplink scheduling information is any value from 0 to 28, determining to transmit the uplink data on the physical uplink shared channel; and when it is determined that the index number corresponding to the modulation and coding indication information comprised in the uplink scheduling information is any value from 29 to 31, determining to transmit the aperiodic channel state information or the feedback information on the physical uplink control channel, and not to transmit the uplink data on the physical uplink control channel.

15. The terminal device according to claim 14, wherein determining to transmit the uplink data on the uplink resource indicated by the uplink scheduling information comprises:

determining, based on aperiodic channel state indication information and feedback indication information that are comprised in the uplink scheduling information, to transmit the uplink data, the uplink data and aperiodic channel state information, the uplink data and feedback information, or the uplink data, aperiodic channel state information, and feedback information on the uplink resource indicated by the uplink scheduling information.

16. The terminal device according to claim 14, wherein determining, not to transmit the uplink data on the uplink resource indicated by the uplink scheduling information comprises:

determining, based on at least one of the modulation and coding indication information, aperiodic channel state indication information, and feedback indication information that are comprised in the uplink scheduling information, to transmit aperiodic channel state information or feedback information on the uplink resource indicated by the uplink scheduling information.

17. The terminal device according to claim 13, wherein the modulation and coding indication information comprises information to distinguish whether the uplink scheduling information is corresponding to a physical uplink control channel or a physical uplink shared channel.

18. An access network device, comprising a processor, a memory, and a communications module, wherein the memory is configured to store uplink information transmission program code, and the processor is configured to execute the uplink information transmission program code to:

send, by the communications module, uplink scheduling information to a terminal device, wherein the uplink scheduling information comprises modulation and coding indication information, and the modulation and coding indication information is to be used by the terminal device to determine whether to transmit uplink data on an uplink resource indicated by the uplink scheduling information;

receive, by the communications module, the uplink data transmitted by the terminal device on a physical uplink shared channel indicated by the uplink scheduling information when the modulation and coding indication information indicates the terminal device to transmit the uplink data on the uplink resource indicated by the uplink scheduling information; and receive, by the access network device, aperiodic channel state information or feedback information without the uplink data on a physical uplink control channel indicated by the uplink scheduling information, when the modulation and coding indication information does not indicate the terminal device to transmit the uplink data.

19. The access network device according to claim 18, wherein:

when an index number corresponding to the modulation and coding indication information included in the uplink scheduling information is any value from 0 to 28, the modulation and coding indication information indicates the terminal device to transmit the uplink data on the physical uplink shared channel; or when the index number corresponding to the modulation and coding indication information included in the uplink scheduling information is any value from 29 to 31, the modulation and coding indication information indicates the terminal device to transmit the aperiodic channel state information or the feedback information on the physical uplink control channel, and not to transmit the uplink data on the physical uplink control channel.

20. The access network device according to claim 19, wherein:

the uplink scheduling information further includes aperiodic channel state indication information and feedback indication information; and when the index number corresponding to the modulation and coding indication information included in the uplink scheduling information is any value from 0 to 28, the aperiodic channel state indication information and the feedback indication information indicates the terminal device to determine to transmit uplink data, or transmit uplink data and aperiodic channel state information, or transmit uplink data and feedback information, or transmit uplink data, aperiodic channel state information and feedback information, on the uplink resource indicated by the uplink scheduling information.

21. The access network device according to claim 19, wherein:

the uplink scheduling information further includes aperiodic channel state indication information and feedback indication information; and when the index number corresponding to the modulation and coding indication information included in the uplink scheduling information is any value from 29 to 31, at least one of the modulation and coding indication information, the aperiodic channel state indication information, and the feedback indication information is used by the terminal device to determine to transmit aperiodic channel state information or feedback information on the uplink resource indicated by the uplink scheduling information.

22. The access network device according to claim 21, wherein the modulation and coding indication information, the aperiodic channel state indication information, and the feedback indication information that are included in the uplink scheduling information are used by the terminal device to determine to transmit the aperiodic channel state information, the feedback information, or the aperiodic channel state information and the feedback information on the uplink resource indicated by the uplink scheduling information.

23. The access network device according to claim 18, wherein the modulation and coding indication information comprises information to distinguish whether the uplink scheduling information is corresponding to a physical uplink control channel or a physical uplink shared channel.

* * * * *